US012208531B2

(12) United States Patent
Johnson et al.

(10) Patent No.: US 12,208,531 B2
(45) Date of Patent: Jan. 28, 2025

(54) RAZOR HANDLE WITH A RIGID MEMBER

(71) Applicant: The Gillette Company LLC, Boston, MA (US)

(72) Inventors: Robert Harold Johnson, Hingham, MA (US); Matthew Stephen Bauer, Loveland, OH (US); Jessy Lee Cusack, Attleboro, MA (US); Jack Anthony Washington, Mendon, MA (US); Charles James Bassett, North Reading, MA (US); Christopher Ramm, North Attleboro, MA (US); Steven Michael Bourque, Billerica, MA (US); Ashok Bakul Patel, Needam, MA (US); Christian Arnold Litterst, Frankfurt (DE); Christoph Zegula, Frankfurt (DE)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 16/367,767

(22) Filed: Mar. 28, 2019

(65) Prior Publication Data

US 2019/0299473 A1 Oct. 3, 2019

Related U.S. Application Data

(60) Provisional application No. 62/650,938, filed on Mar. 30, 2018.

(51) Int. Cl.
*B26B 21/52* (2006.01)
*B26B 21/22* (2006.01)
(Continued)

(52) U.S. Cl.
CPC ........ *B26B 21/521* (2013.01); *B26B 21/4068* (2013.01); *B26B 21/225* (2013.01);
(Continued)

(58) Field of Classification Search
CPC . B26B 21/521; B26B 21/225; B26B 21/4068; B26B 21/4062; B26B 21/446;
(Continued)

(56) References Cited

U.S. PATENT DOCUMENTS

| | | | |
|---|---|---|---|
| 1,505,578 | A | 8/1924 | Charles |
| 1,552,026 | A | 9/1925 | Charles |

(Continued)

FOREIGN PATENT DOCUMENTS

| | | | |
|---|---|---|---|
| AU | 654696 | B2 | 11/1994 |
| AU | 1135700 | A | 11/2000 |

(Continued)

OTHER PUBLICATIONS

U.S. Appl. No. 16/367,747, filed Mar. 28, 2019, Robert Harold Johnson et. al.

(Continued)

*Primary Examiner* — Evan H MacFarlane
*Assistant Examiner* — Fernando A Ayala
(74) *Attorney, Agent, or Firm* — Andres E. Velarde; Kevin C. Johnson; Joanne N. Pappas

(57) ABSTRACT

A handle for a shaving razor in which the handle comprises a frame and a movable member assembly operably coupled to the frame such that the frame is disposed between the movable member assembly and where the movable member assembly portions are configured to move both above and below the frame. The movement can be linear or rotational. The movable member assembly comprises one or more springs. The first member and the second member are coupled together through said rigid member. The rigid member can include a rigid member platform which has a width to thickness ratio from about 7 to about 60.

19 Claims, 59 Drawing Sheets

(51) Int. Cl.
*B26B 21/40* (2006.01)
*B26B 21/44* (2006.01)
*B26B 21/48* (2006.01)

(52) U.S. Cl.
CPC ......... *B26B 21/4062* (2013.01); *B26B 21/446* (2013.01); *B26B 21/48* (2013.01); *B26B 21/522* (2013.01); *B26B 21/526* (2013.01); *B26B 21/528* (2013.01)

(58) Field of Classification Search
CPC ..... B26B 21/48; B26B 51/522; B26B 51/526; B26B 51/528
See application file for complete search history.

(56) References Cited

U.S. PATENT DOCUMENTS

| | | | | |
|---|---|---|---|---|
| 1,675,128 | A | | 6/1928 | Harry |
| 1,821,574 | A | | 9/1931 | Nicholas |
| 1,892,836 | A | | 1/1933 | Harvey |
| 2,018,147 | A | | 10/1935 | Emil |
| 2,063,808 | A | | 12/1936 | Henderson et al. |
| 2,134,973 | A | | 11/1938 | Harwell |
| 2,164,581 | A | | 7/1939 | Ewald |
| 2,225,257 | A | | 12/1940 | Conill |
| 2,231,219 | A | | 2/1941 | Payson |
| 2,324,148 | A | | 7/1943 | Gravin |
| 2,327,192 | A | | 8/1943 | Keene |
| 2,414,482 | A | | 1/1947 | Kelso |
| 2,536,844 | A | | 1/1951 | Carlton et al. |
| 2,622,319 | A | | 12/1952 | Russell |
| 2,714,651 | A | | 8/1955 | Richard |
| 3,325,627 | A | | 6/1967 | Adler et al. |
| 3,364,568 | A | | 1/1968 | Nathaniel |
| 3,454,745 | A | | 7/1969 | Stone |
| 3,591,923 | A | * | 7/1971 | Rose ....................... A47J 17/02 30/340 |
| 3,593,416 | A | | 7/1971 | Edson |
| 3,600,804 | A | * | 8/1971 | Brown .................... B26B 21/06 30/32 |
| 3,611,568 | A | | 10/1971 | Alexander et al. |
| 3,644,992 | A | | 2/1972 | Bennett et al. |
| 3,648,368 | A | | 3/1972 | Douglass et al. |
| 3,713,184 | A | | 1/1973 | Leland |
| 3,748,730 | A | | 7/1973 | Bartram et al. |
| 3,768,162 | A | | 10/1973 | Perry |
| 3,786,563 | A | | 1/1974 | Dorion et al. |
| 3,795,979 | A | * | 3/1974 | Perry .................... B26B 21/521 30/526 |
| 3,876,858 | A | | 4/1975 | Davis et al. |
| 3,878,605 | A | * | 4/1975 | Braginetz ............ B26B 21/521 30/526 |
| 3,896,364 | A | | 7/1975 | Reister |
| 3,934,115 | A | | 1/1976 | Peterson |
| 3,935,639 | A | | 2/1976 | Terry et al. |
| 3,950,848 | A | | 4/1976 | Goldstein |
| 4,026,016 | A | | 5/1977 | Nissen |
| 4,077,119 | A | | 3/1978 | Sellera |
| 4,083,104 | A | | 4/1978 | Nissen et al. |
| 4,094,063 | A | | 6/1978 | Trotta |
| 4,148,236 | A | | 4/1979 | Holoyen et al. |
| 4,253,013 | A | | 2/1981 | Mabuchi |
| 4,253,235 | A | | 3/1981 | Jacobson |
| 4,258,471 | A | | 3/1981 | Jacobson |
| 4,266,340 | A | | 5/1981 | Bowman |
| 4,281,455 | A | | 8/1981 | Dixon et al. |
| 4,281,456 | A | | 8/1981 | Douglass et al. |
| 4,377,034 | A | | 3/1983 | Druash et al. |
| 4,403,414 | A | | 9/1983 | Kiraly et al. |
| 4,413,411 | A | | 11/1983 | Trotta |
| 4,422,237 | A | | 12/1983 | Trotta |
| 4,475,286 | A | | 10/1984 | Saito |
| 4,502,216 | A | | 3/1985 | Furnari |
| 4,514,904 | A | | 5/1985 | Bond |
| 4,561,526 | A | | 12/1985 | Winter et al. |
| 4,562,644 | A | | 1/1986 | Hitchens |
| 4,587,968 | A | | 5/1986 | Price |
| 4,598,192 | A | | 7/1986 | Garrett |
| 4,658,505 | A | | 4/1987 | Williams |
| 4,716,652 | A | | 1/1988 | Cataudella |
| 4,791,724 | A | | 12/1988 | Dumas |
| 4,797,998 | A | | 1/1989 | Motta |
| 4,809,432 | A | | 3/1989 | Schauble |
| 4,833,779 | A | | 5/1989 | Iten |
| 4,837,930 | A | * | 6/1989 | Righi .................... B26B 21/523 30/47 |
| 4,864,735 | A | | 9/1989 | Chung |
| 4,879,811 | A | | 11/1989 | Cooney |
| 4,888,868 | A | | 12/1989 | Pritchard |
| 4,918,818 | A | | 4/1990 | Hsieh |
| 4,944,090 | A | | 7/1990 | Sumnall |
| 4,970,784 | A | | 11/1990 | Althaus et al. |
| 4,985,995 | A | | 1/1991 | Coffin |
| 5,010,905 | A | | 4/1991 | Snyder et al. |
| 5,016,352 | A | | 5/1991 | Metcalf |
| 5,029,391 | A | | 7/1991 | Althaus et al. |
| 5,031,319 | A | | 7/1991 | Althaus et al. |
| 5,033,152 | A | | 7/1991 | Althaus |
| 5,038,472 | A | | 8/1991 | Iderosa |
| 5,044,077 | A | | 9/1991 | Ferraro et al. |
| 5,046,249 | A | | 9/1991 | Kawara et al. |
| 5,065,515 | A | | 11/1991 | Iderosa |
| 5,092,041 | A | | 3/1992 | Podolsky |
| 5,093,991 | A | * | 3/1992 | Hendrickson ......... B26B 21/521 30/531 |
| 5,098,414 | A | | 3/1992 | Walker |
| 5,113,585 | A | | 5/1992 | Rogers |
| 5,121,541 | A | | 6/1992 | Patrakis |
| 5,157,834 | A | | 10/1992 | Chen et al. |
| 5,168,628 | A | | 12/1992 | Mock et al. |
| 5,182,858 | A | | 2/1993 | Chen |
| 5,191,172 | A | | 3/1993 | Garganese |
| 5,191,712 | A | | 3/1993 | Crook et al. |
| 5,270,493 | A | | 12/1993 | Inobe et al. |
| 5,299,354 | A | | 4/1994 | Metcalf et al. |
| 5,307,564 | A | | 5/1994 | Schoenberg |
| 5,309,640 | A | | 5/1994 | Caron |
| 5,319,822 | A | | 6/1994 | Shaw |
| 5,331,740 | A | | 7/1994 | Carson, III et al. |
| 5,333,382 | A | * | 8/1994 | Buchbinder ............ B26B 21/22 30/32 |
| 5,333,383 | A | | 8/1994 | Ferraro |
| 5,337,478 | A | | 8/1994 | Cohen et al. |
| 5,347,717 | A | | 9/1994 | Ts |
| 5,394,777 | A | | 3/1995 | Kozikowski |
| 5,402,573 | A | | 4/1995 | Laniado |
| 5,438,759 | A | | 8/1995 | Dieringer |
| 5,454,164 | A | | 10/1995 | Yin et al. |
| 5,497,551 | A | * | 3/1996 | Apprille, Jr. .......... B26B 21/522 30/526 |
| 5,533,263 | A | | 7/1996 | Gilder |
| 5,560,106 | A | | 10/1996 | Armbruster et al. |
| 5,575,068 | A | | 11/1996 | Pedersen |
| 5,600,887 | A | | 2/1997 | Olson |
| 5,626,154 | A | | 5/1997 | Rogers et al. |
| 5,636,442 | A | | 6/1997 | Wain |
| 5,653,025 | A | | 8/1997 | Cheng et al. |
| 5,661,907 | A | | 9/1997 | Apprille, Jr. |
| 5,673,485 | A | | 10/1997 | Hill |
| 5,687,485 | A | | 11/1997 | Shurtleff et al. |
| 5,743,017 | A | | 4/1998 | Dreher et al. |
| 5,761,814 | A | | 6/1998 | Anderson et al. |
| 5,780,819 | A | | 7/1998 | Fabrikant et al. |
| 5,782,346 | A | | 7/1998 | Gray et al. |
| 5,784,790 | A | | 7/1998 | Carson, III et al. |
| 5,786,573 | A | | 7/1998 | Fabrikant et al. |
| 5,787,586 | A | | 8/1998 | Apprille, Jr. et al. |
| 5,787,593 | A | | 8/1998 | Althaus |
| 5,787,594 | A | * | 8/1998 | Estrada ............... B26B 21/4062 30/527 |
| 5,794,342 | A | | 8/1998 | Davey |
| 5,794,343 | A | | 8/1998 | Lee et al. |
| 5,822,869 | A | * | 10/1998 | Metcalf ................. B26B 21/521 30/526 |

(56) References Cited

U.S. PATENT DOCUMENTS 5,911,480 A 6/1999 Morgan
5,933,960 A 8/1999 Avidor
5,953,824 A 9/1999 Ferraro et al.
5,953,825 A 9/1999 Christman et al.
5,956,851 A 9/1999 Apprille, Jr. et al.
6,026,577 A 2/2000 Ferraro
6,035,537 A 3/2000 Apprille, Jr. et al.
6,052,903 A 4/2000 Metcalf et al.
6,061,912 A 5/2000 Gazaway
6,115,924 A 9/2000 Oldroyd
6,122,826 A 9/2000 Coffin et al.
6,138,361 A 10/2000 Richard et al.
6,141,875 A 11/2000 Andrews
6,158,125 A 12/2000 Dolev
6,161,287 A 12/2000 Swanson et al.
6,161,288 A 12/2000 Andrews
6,189,222 B1 * 2/2001 Doyle .................. B26B 21/523 30/526
D446,884 S 8/2001 Kohring et al.
6,276,061 B1 8/2001 Rozenkranc
6,276,062 B1 8/2001 Prochaska
6,301,792 B1 10/2001 Speer
6,308,415 B1 10/2001 Sablatschan et al.
6,311,400 B1 11/2001 Hawes et al.
6,421,918 B1 7/2002 Dato et al.
6,430,813 B2 8/2002 Muraguchi et al.
6,434,839 B1 8/2002 Lee et al.
6,442,850 B1 9/2002 Coffin
6,481,104 B1 11/2002 Parker et al.
6,526,660 B1 3/2003 Macneil
6,574,866 B2 6/2003 Pragt et al.
6,598,303 B2 7/2003 Bosy et al.
6,615,498 B1 9/2003 King et al.
6,655,028 B2 12/2003 Coffin
6,675,479 B1 1/2004 Walker, Jr. et al.
6,736,997 B2 5/2004 Olding et al.
6,754,958 B2 6/2004 Haws et al.
6,763,590 B2 7/2004 Guimont et al.
6,789,321 B2 9/2004 Simms
6,807,739 B2 10/2004 Follo
6,817,101 B1 11/2004 Bohmer
6,836,966 B2 1/2005 Patrick
6,868,610 B2 3/2005 Brandt et al.
6,880,253 B1 4/2005 Gyllerstrom
6,910,274 B1 6/2005 Pennella et al.
6,941,659 B2 9/2005 Gilder
6,946,624 B1 9/2005 Tomassetti
6,966,400 B1 11/2005 Rollins et al.
6,973,730 B2 12/2005 Tomassetti et al.
7,000,282 B2 2/2006 Cox et al.
D524,482 S 7/2006 Fischer
D524,483 S 7/2006 Bunnell et al.
7,093,363 B1 8/2006 Kuo
7,111,400 B2 9/2006 Guimont et al.
7,137,203 B2 11/2006 Bressler et al.
7,168,173 B2 1/2007 Worrick, III
7,197,825 B2 4/2007 Walker et al.
7,200,938 B2 4/2007 Lembke
7,219,430 B2 5/2007 Fandrey et al.
7,520,408 B1 4/2009 Smith et al.
7,681,320 B2 3/2010 Szczepanowski et al.
7,743,506 B2 6/2010 Szczepanowski et al.
7,770,294 B2 8/2010 Bruno et al.
7,877,879 B2 2/2011 Nakasuka
7,913,399 B2 3/2011 Lau
D643,977 S 8/2011 Wonderley et al.
8,015,711 B2 * 9/2011 Psimadas .............. B26B 21/225 30/34.1
8,033,023 B2 10/2011 Johnson et al.
8,104,184 B2 1/2012 Walker
8,183,940 B2 5/2012 Koyama et al.
8,186,063 B2 5/2012 Clarke
8,191,263 B2 6/2012 Follo et al.
8,205,344 B2 6/2012 Stevens
8,429,826 B2 4/2013 Clarke
8,434,189 B2 5/2013 Wang
8,438,735 B2 5/2013 De Klerk
8,474,144 B2 7/2013 Royle
8,479,624 B2 7/2013 Flyash et al.
8,481,898 B2 7/2013 Parker
8,510,958 B2 8/2013 Hart et al.
8,516,706 B2 8/2013 Flyash et al.
8,615,886 B1 12/2013 Childers
8,615,891 B2 * 12/2013 Psimadas .............. B26B 21/523 30/526
8,621,758 B2 1/2014 Quintiliani et al.
8,650,763 B2 2/2014 Howell et al.
8,661,688 B2 3/2014 Shigeta et al.
8,713,801 B2 5/2014 Bohmer et al.
8,732,955 B2 5/2014 Howell et al.
D707,885 S 6/2014 Cataudella
8,745,877 B2 6/2014 Szczepanowski
8,745,883 B2 6/2014 Murgida et al.
8,769,825 B2 7/2014 Howell et al.
8,772,679 B2 7/2014 Novikov
8,793,879 B2 8/2014 Jessemey et al.
8,826,543 B2 9/2014 Szczepanowski et al.
8,887,369 B2 11/2014 Burrowes et al.
8,938,885 B2 * 1/2015 Stevens ................. B26B 21/521 30/527
8,978,258 B2 3/2015 Patel et al.
9,071,073 B2 6/2015 Bourilkov et al.
D741,008 S 10/2015 Bruno et al.
D741,010 S 10/2015 Wang et al.
9,149,945 B2 10/2015 Tomassetti et al.
9,193,077 B2 11/2015 Worrick
D749,265 S 2/2016 Cataudella
9,259,846 B1 2/2016 Robertson
9,283,685 B2 3/2016 Griffin et al.
9,381,657 B2 7/2016 Xu et al.
D764,101 S 8/2016 Cataudella
9,434,080 B2 9/2016 Bozikis
9,440,367 B2 9/2016 Zakuskin
9,469,038 B2 10/2016 Iaccarino et al.
9,469,039 B2 10/2016 Hodgson et al.
9,475,202 B2 10/2016 Griffin et al.
D772,484 S 11/2016 Otsuka
9,486,930 B2 11/2016 Provost et al.
9,498,892 B2 11/2016 Nakasuka et al.
9,511,501 B2 12/2016 Carneiro et al.
9,517,570 B2 12/2016 Tucker et al.
9,539,734 B1 1/2017 Bozikis et al.
9,545,729 B2 1/2017 Buck, Jr. et al.
9,604,375 B2 3/2017 Bohmer et al.
D785,248 S 4/2017 Bruno et al.
9,623,575 B2 4/2017 Griffin et al.
9,630,331 B2 4/2017 Griffin
9,636,830 B2 5/2017 Hodgson et al.
9,669,555 B2 6/2017 Griffin et al.
9,694,503 B2 7/2017 Papadopoulos-papageorgis et al.
9,707,690 B2 7/2017 Hodgson
9,751,229 B2 9/2017 Hodgson
9,789,620 B2 10/2017 Wain et al.
9,833,917 B2 12/2017 Hodgson et al.
9,868,220 B2 1/2018 Moffat
D811,658 S 2/2018 Cataudella et al.
9,889,572 B2 2/2018 Bucco
9,902,077 B2 2/2018 Park et al.
9,975,262 B2 5/2018 Safar
9,993,931 B1 6/2018 Zucker
D829,991 S 10/2018 Zucker
10,099,393 B2 10/2018 Gester et al.
D843,059 S 3/2019 Lettenberger
10,406,704 B2 9/2019 Barrett et al.
10,427,312 B2 10/2019 Gratsias et al.
D867,661 S 11/2019 Ovvadias
D874,061 S 1/2020 Verasamy et al.
10,538,006 B2 1/2020 Bridges et al.
D877,983 S 3/2020 Walker, Jr. et al.
10,583,576 B2 3/2020 Broemse et al.
10,652,956 B2 5/2020 Heubach et al.
10,667,892 B2 6/2020 Bärtschi et al.
10,759,069 B2 9/2020 Johnson et al.
10,766,155 B2 9/2020 Broemse

(56) References Cited

U.S. PATENT DOCUMENTS

| | | | |
|---|---|---|---|
| 10,773,406 | B2 | 9/2020 | Broemse |
| 10,773,407 | B2 | 9/2020 | Washington et al. |
| 10,773,408 | B2 | 9/2020 | Johnson et al. |
| 10,786,917 | B1 | 9/2020 | Walton |
| D905,339 | S | 12/2020 | Roche |
| 10,850,412 | B2 * | 12/2020 | Harris, II .............. B26B 21/522 |
| 10,864,646 | B2 | 12/2020 | Long et al. |
| D908,285 | S | 1/2021 | Cataudella et al. |
| 10,894,330 | B2 | 1/2021 | Goeder et al. |
| D912,326 | S | 3/2021 | Goeder et al. |
| D913,591 | S | 3/2021 | Ramm et al. |
| 10,940,597 | B2 | 3/2021 | Park et al. |
| 10,974,403 | B2 | 4/2021 | Chang |
| D921,984 | S | 6/2021 | Brissett et al. |
| 11,117,278 | B2 | 9/2021 | Walker, Jr. |
| D933,295 | S | 10/2021 | Washington et al. |
| 11,148,310 | B2 | 10/2021 | Maimone et al. |
| 11,154,999 | B2 | 10/2021 | Johnson et al. |
| D936,287 | S | 11/2021 | Huang et al. |
| 11,325,270 | B2 | 5/2022 | Griffin et al. |
| 11,358,294 | B2 | 6/2022 | Johnson et al. |
| D961,847 | S | 8/2022 | Walker, Jr. et al. |
| D961,849 | S | 8/2022 | Brissett et al. |
| D965,221 | S | 9/2022 | Verasamy et al. |
| D965,887 | S | 10/2022 | Lettenberger et al. |
| D967,529 | S | 10/2022 | Goeder et al. |
| D972,776 | S | 12/2022 | Lin |
| 11,826,924 | B2 | 11/2023 | Washington |
| 2001/0003869 | A1 | 6/2001 | Rocha |
| 2001/0023538 | A1 | 9/2001 | Muraguchi et al. |
| 2002/0014010 | A1 | 2/2002 | Beutel et al. |
| 2002/0029478 | A1 | 3/2002 | Haws et al. |
| 2002/0035786 | A1 | 3/2002 | Gilder et al. |
| 2002/0096512 | A1 | 7/2002 | Abbott et al. |
| 2002/0116822 | A1 | 8/2002 | Coffin |
| 2002/0120278 | A1 | 8/2002 | Cense et al. |
| 2002/0189102 | A1 | 12/2002 | Orloff |
| 2003/0046816 | A1 | 3/2003 | Kanzer |
| 2003/0070309 | A1 | 4/2003 | Brown et al. |
| 2003/0088984 | A1 | 5/2003 | Brandt et al. |
| 2003/0101589 | A1 | 6/2003 | Barish |
| 2003/0115762 | A1 | 6/2003 | Follo et al. |
| 2003/0154832 | A1 | 8/2003 | Guimont et al. |
| 2003/0155887 | A1 | 8/2003 | Bourilkov et al. |
| 2003/0226258 | A1 | 12/2003 | Patrick |
| 2003/0231001 | A1 | 12/2003 | Bruning |
| 2004/0045948 | A1 | 3/2004 | Shalev et al. |
| 2004/0074097 | A1 | 4/2004 | Guimont et al. |
| 2004/0098863 | A1 | 5/2004 | Shalev et al. |
| 2004/0181953 | A1 * | 9/2004 | Follo ..................... B26B 21/521 30/527 |
| 2004/0216311 | A1 | 11/2004 | Follo |
| 2005/0000100 | A1 | 1/2005 | Coffin |
| 2005/0189338 | A1 | 9/2005 | Sukeforth |
| 2005/0198840 | A1 | 9/2005 | Worrick et al. |
| 2005/0198841 | A1 | 9/2005 | Worrick, III |
| 2005/0218513 | A1 | 10/2005 | Seko |
| 2005/0223568 | A1 | 10/2005 | Walker et al. |
| 2005/0268472 | A1 | 12/2005 | Bourilkov et al. |
| 2006/0026841 | A1 | 2/2006 | Freund |
| 2006/0032053 | A1 | 2/2006 | Saker et al. |
| 2006/0032054 | A1 | 2/2006 | Simms et al. |
| 2006/0032055 | A1 | 2/2006 | Simms et al. |
| 2006/0037197 | A1 | 2/2006 | Hawes et al. |
| 2006/0070242 | A1 | 4/2006 | Szczepanowski et al. |
| 2006/0080838 | A1 | 4/2006 | Johnson et al. |
| 2006/0080839 | A1 | 4/2006 | Hesketh |
| 2006/0117568 | A1 | 6/2006 | Tomassetti |
| 2006/0123631 | A1 | 6/2006 | Szczepanowski et al. |
| 2006/0138121 | A1 | 6/2006 | Werkman et al. |
| 2006/0260142 | A1 | 11/2006 | Dombrowski et al. |
| 2007/0028449 | A1 | 2/2007 | King |
| 2007/0044313 | A1 | 3/2007 | Rozenkranc |
| 2007/0056167 | A1 | 3/2007 | Richard et al. |
| 2007/0068010 | A1 | 3/2007 | Annoura |
| 2007/0084058 | A1 | 4/2007 | Szczepanowski et al. |
| 2007/0145031 | A1 | 6/2007 | Shalev et al. |
| 2007/0163123 | A1 | 7/2007 | Gratsias et al. |
| 2007/0168302 | A1 | 7/2007 | Giovinazzo et al. |
| 2007/0180699 | A1 | 8/2007 | Psimadas et al. |
| 2007/0220752 | A1 | 9/2007 | Psimadas et al. |
| 2007/0256276 | A1 * | 11/2007 | Holland-Letz ........... B25G 1/01 16/111.1 |
| 2007/0271714 | A1 | 11/2007 | Adam et al. |
| 2007/0283565 | A1 | 12/2007 | Ho |
| 2008/0016692 | A1 | 1/2008 | Noble |
| 2008/0034591 | A1 | 2/2008 | Fung |
| 2008/0155831 | A1 | 7/2008 | Royle |
| 2008/0189953 | A1 | 8/2008 | Jessemey et al. |
| 2008/0271319 | A1 | 11/2008 | Saker et al. |
| 2009/0007432 | A1 | 1/2009 | Chou |
| 2009/0056140 | A1 | 3/2009 | Bruno et al. |
| 2009/0070947 | A1 | 3/2009 | Baertschi et al. |
| 2009/0071010 | A1 | 3/2009 | Hart |
| 2009/0119923 | A1 | 5/2009 | Hart et al. |
| 2009/0178281 | A1 | 7/2009 | Moore |
| 2009/0183371 | A1 | 7/2009 | Mileti et al. |
| 2009/0217531 | A1 | 9/2009 | Muraguchi |
| 2009/0255123 | A1 | 10/2009 | Tomassetti et al. |
| 2009/0313837 | A1 | 12/2009 | Winter et al. |
| 2010/0000093 | A1 | 1/2010 | Hwang |
| 2010/0024615 | A1 | 2/2010 | Rebaudieres et al. |
| 2010/0031510 | A1 | 2/2010 | Gester et al. |
| 2010/0043242 | A1 | 2/2010 | Stevens |
| 2010/0107416 | A1 | 5/2010 | Follo |
| 2010/0115774 | A1 | 5/2010 | De Klerk |
| 2010/0122464 | A1 | 5/2010 | Ndou et al. |
| 2010/0132204 | A1 | 6/2010 | Brown |
| 2010/0198134 | A1 | 8/2010 | Eckhouse et al. |
| 2010/0205808 | A1 | 8/2010 | King |
| 2010/0212939 | A1 | 8/2010 | Ito et al. |
| 2010/0236071 | A1 | 9/2010 | Szczepanowski et al. |
| 2010/0236072 | A1 | 9/2010 | Szczepanowski |
| 2010/0269352 | A1 | 10/2010 | Curtin |
| 2010/0287784 | A1 | 11/2010 | Qiu |
| 2010/0292546 | A1 | 11/2010 | Gonopolskiy et al. |
| 2010/0319204 | A1 | 12/2010 | Peterson et al. |
| 2011/0005082 | A1 | 1/2011 | Larscheid et al. |
| 2011/0016721 | A1 | 1/2011 | Schnak et al. |
| 2011/0023310 | A1 | 2/2011 | Psimadas et al. |
| 2011/0041340 | A1 | 2/2011 | Sherman et al. |
| 2011/0126413 | A1 | 6/2011 | Szczepanowski et al. |
| 2011/0138637 | A1 | 6/2011 | Bucco |
| 2011/0146015 | A1 * | 6/2011 | Moskovich .............. A46B 5/02 15/167.1 |
| 2011/0146080 | A1 | 6/2011 | Pauw |
| 2011/0167640 | A1 | 7/2011 | Flyash et al. |
| 2011/0174328 | A1 * | 7/2011 | Cerutti ..................... A46B 5/02 132/200 |
| 2011/0219624 | A1 | 9/2011 | Rockell et al. |
| 2011/0289776 | A1 | 12/2011 | Hawes et al. |
| 2011/0314677 | A1 * | 12/2011 | Meier ................ A46B 15/0002 30/41.8 |
| 2012/0030945 | A1 | 2/2012 | Clarke et al. |
| 2012/0060382 | A1 | 3/2012 | Beugels et al. |
| 2012/0096718 | A1 | 4/2012 | Howell et al. |
| 2012/0102745 | A1 * | 5/2012 | Jessemey .............. B26B 21/521 30/41 |
| 2012/0102761 | A1 | 5/2012 | Jessemey et al. |
| 2012/0124840 | A1 | 5/2012 | Iaccarino et al. |
| 2012/0125489 | A1 | 5/2012 | Hashimura et al. |
| 2012/0167392 | A1 | 7/2012 | Cherian et al. |
| 2012/0187261 | A1 | 7/2012 | Cicero |
| 2012/0205362 | A1 | 8/2012 | Etzkorn et al. |
| 2012/0210586 | A1 | 8/2012 | Lelieveld et al. |
| 2012/0227554 | A1 | 9/2012 | Beech |
| 2012/0233864 | A1 | 9/2012 | Flyash et al. |
| 2012/0234658 | A1 | 9/2012 | Schnak et al. |
| 2012/0246947 | A1 | 10/2012 | Fang et al. |
| 2012/0255185 | A1 | 10/2012 | Patel et al. |
| 2012/0255942 | A1 | 10/2012 | Vodvarka |
| 2012/0260509 | A1 | 10/2012 | Fang et al. |
| 2012/0266465 | A1 | 10/2012 | Hart et al. |
| 2012/0279070 | A1 | 11/2012 | Seo |

(56) References Cited

U.S. PATENT DOCUMENTS

2012/0279073 A1 11/2012 Snow et al.
2012/0279075 A1 11/2012 Amsel
2012/0291288 A1 11/2012 Bohmer et al.
2012/0291295 A1* 11/2012 Braun .................. B26B 21/523 30/531
2012/0297625 A1 11/2012 Madden
2012/0311865 A1 12/2012 Hamilton et al.
2012/0330234 A1 12/2012 Balluff et al.
2013/0081276 A1 4/2013 Wain et al.
2013/0081289 A1 4/2013 Wain et al.
2013/0081290 A1 4/2013 Murgida et al.
2013/0097868 A1 4/2013 Jessemey et al.
2013/0144280 A1 6/2013 Eckhouse et al.
2013/0145623 A1 6/2013 Wain
2013/0145624 A1 6/2013 Jessemey et al.
2013/0145625 A1 6/2013 Xu et al.
2013/0145626 A1 6/2013 Xu et al.
2013/0160306 A1 6/2013 Howell et al.
2013/0199346 A1 8/2013 Psimadas et al.
2013/0199348 A1 8/2013 Aberizk
2013/0205959 A1 8/2013 Jones et al.
2013/0247395 A1 9/2013 Szczepanowski et al.
2013/0291390 A1 11/2013 Gajria et al.
2013/0291391 A1 11/2013 Stevens
2013/0312272 A1 11/2013 Wilson et al.
2013/0326881 A1 12/2013 Blatter
2014/0026423 A1 1/2014 Schnak et al.
2014/0026726 A1 1/2014 Griffin et al.
2014/0048310 A1 2/2014 Montevirgen et al.
2014/0083265 A1 3/2014 Provost et al.
2014/0096396 A1 4/2014 Pauw
2014/0096402 A1 4/2014 Nakasuka et al.
2014/0109735 A1 4/2014 Shepperson
2014/0114301 A1 4/2014 Solomon et al.
2014/0116211 A1 5/2014 Griffin et al.
2014/0116737 A1 5/2014 Iwata et al.
2014/0165800 A1 6/2014 Griffin et al.
2014/0216210 A1* 8/2014 Near ........................ B25D 1/02 29/434
2014/0245611 A1 9/2014 Bohmer et al.
2015/0032128 A1 1/2015 Tavlin et al.
2015/0068043 A1 3/2015 Gester et al.
2015/0122899 A1 5/2015 Kaneko et al.
2015/0135538 A1 5/2015 Tomassetti et al.
2015/0174773 A1 6/2015 Hodgson
2015/0174774 A1 6/2015 Hodgson
2015/0174775 A1 6/2015 Hodgson
2015/0174776 A1 6/2015 Hawes
2015/0190935 A1 7/2015 Griffin et al.
2015/0190936 A1 7/2015 Griffin et al.
2015/0197018 A1 7/2015 Heubach et al.
2015/0197019 A1 7/2015 Hodgson et al.
2015/0197020 A1 7/2015 Hodgson et al.
2015/0197021 A1 7/2015 Hodgson et al.
2015/0266190 A1 9/2015 Bohmer et al.
2015/0266191 A1 9/2015 Maimone et al.
2015/0273708 A1 10/2015 Haba
2015/0283716 A1 10/2015 Kim et al.
2015/0290819 A1 10/2015 Giannopoulos et al.
2015/0296622 A1 10/2015 Jiang et al.
2015/0298326 A1 10/2015 Tomassetti et al.
2015/0298327 A1 10/2015 Tomassetti et al.
2015/0306777 A1 10/2015 Georgakis et al.
2015/0314466 A1 11/2015 Papadopoulos-papageorgis et al.
2015/0321366 A1 11/2015 Papadopoulos-papageorgis et al.
2015/0328788 A1 11/2015 Ren et al.
2016/0001455 A1 1/2016 Swenson
2016/0046028 A1 2/2016 Meier et al.
2016/0046029 A1 2/2016 Samuels et al.
2016/0096280 A1 4/2016 Robertson
2016/0101531 A1 4/2016 Bunnell
2016/0107324 A1 4/2016 Robertson et al.
2016/0121495 A1 5/2016 Johnson
2016/0121496 A1 5/2016 Johnson
2016/0121497 A1 5/2016 Johnson
2016/0144519 A1 5/2016 Hahn et al.
2016/0144520 A1 5/2016 Lee
2016/0250764 A1 9/2016 Hashimoto
2016/0250765 A1 9/2016 Gratsias et al.
2016/0250766 A1 9/2016 Gratsias et al.
2016/0288348 A1 10/2016 Molema et al.
2016/0375596 A1 12/2016 Broemse et al.
2016/0375597 A1 12/2016 Broemse
2017/0001323 A1 1/2017 Furuta
2017/0021513 A1 1/2017 Liberatore
2017/0036363 A1 2/2017 Efthimiadis et al.
2017/0043492 A1 2/2017 Robertson et al.
2017/0066148 A1 3/2017 Hodgson et al.
2017/0066149 A1 3/2017 Hodgson et al.
2017/0080585 A1 3/2017 Griffin et al.
2017/0112002 A1 4/2017 Behrendt et al.
2017/0173806 A1 6/2017 Lee
2017/0173809 A1 6/2017 Psimadas et al.
2017/0203453 A1 7/2017 Hodgson et al.
2017/0225345 A1 8/2017 Burrowes et al.
2017/0259440 A1 9/2017 Broemse et al.
2017/0266825 A1 9/2017 Bozikis et al.
2017/0274543 A1 9/2017 Quarantello
2017/0282390 A1 10/2017 Hodgson
2017/0282391 A1 10/2017 Provost et al.
2017/0282392 A1 10/2017 Maimone et al.
2017/0319310 A1* 11/2017 Gengyo ............ B29C 45/14622
2017/0326741 A1 11/2017 Liberatore
2017/0326743 A1 11/2017 Hodgson
2017/0326744 A1 11/2017 Liberatore
2017/0334083 A1 11/2017 Gratsias et al.
2017/0341248 A1 11/2017 Lee et al.
2017/0341249 A1 11/2017 Lee et al.
2018/0043553 A1 2/2018 Lu et al.
2018/0079095 A1 3/2018 Robertson et al.
2018/0093384 A1 4/2018 Moffat
2018/0141225 A1 5/2018 Zucker
2018/0200899 A1 7/2018 Eagleton et al.
2018/0272549 A1* 9/2018 Son ....................... B26B 21/521
2018/0297222 A1 10/2018 Hodgson
2018/0297224 A1 10/2018 Bozikis et al.
2018/0370052 A1 12/2018 Zaremba et al.
2019/0117356 A1* 4/2019 Bartschi ............... A46B 13/023
2019/0152077 A1* 5/2019 Kim ...................... B26B 21/225
2019/0152079 A1* 5/2019 Chang ................... B26B 21/225
2019/0176355 A1 6/2019 Mazarakis et al.
2019/0224874 A1 7/2019 Blatter et al.
2019/0255721 A1 8/2019 Psimadas et al.
2019/0299440 A1 10/2019 Fontecchio et al.
2019/0299441 A1 10/2019 Mcnally et al.
2019/0299442 A1 10/2019 Mcnally et al.
2019/0299443 A1 10/2019 Bourque et al.
2019/0299444 A1 10/2019 Bassett et al.
2019/0299445 A1 10/2019 Bassett et al.
2019/0299447 A1 10/2019 Johnson et al.
2019/0299448 A1 10/2019 Siegmann et al.
2019/0299449 A1 10/2019 Patel et al.
2019/0299450 A1 10/2019 Johnson et al.
2019/0299451 A1 10/2019 Long et al.
2019/0299452 A1 10/2019 Johnson et al.
2019/0299455 A1 10/2019 Patel et al.
2019/0299461 A1 10/2019 Johnson et al.
2019/0299462 A1 10/2019 Washington et al.
2019/0299463 A1 10/2019 Patel et al.
2019/0299464 A1 10/2019 Washington et al.
2019/0299465 A1 10/2019 Gester et al.
2019/0299467 A1 10/2019 Bassett et al.
2019/0299468 A1 10/2019 Bassett et al.
2019/0299469 A1 10/2019 Bassett et al.
2019/0299470 A1 10/2019 Verasamy et al.
2019/0299471 A1 10/2019 Verasamy et al.
2019/0299472 A1 10/2019 Johnson et al.
2019/0337174 A1 11/2019 Kopelas et al.
2019/0358836 A1 11/2019 Maimone et al.
2019/0358837 A1 11/2019 Broemse et al.
2019/0366570 A1 12/2019 Kopelas et al.
2020/0023531 A1 1/2020 Hitchcock
2020/0039098 A1 2/2020 Kopelas et al.
2020/0130208 A1 4/2020 Anjum et al.

(56) References Cited

U.S. PATENT DOCUMENTS

| | | | |
|---|---|---|---|
| 2020/0130209 | A1 | 4/2020 | Maurer et al. |
| 2020/0180178 | A1 | 6/2020 | Park et al. |
| 2020/0223080 | A1 | 7/2020 | Tucker et al. |
| 2020/0236738 | A1 | 7/2020 | Heubach et al. |
| 2020/0361105 | A1 | 11/2020 | Park et al. |
| 2020/0361106 | A1 | 11/2020 | Broemse |
| 2020/0368927 | A1 | 11/2020 | O'connor et al. |
| 2020/0398449 | A1 | 12/2020 | Claus et al. |
| 2021/0016458 | A1 | 1/2021 | Peterson et al. |
| 2021/0323180 | A1 | 10/2021 | Shen et al. |
| 2021/0323181 | A1 | 10/2021 | Shen et al. |
| 2021/0379780 | A1 | 12/2021 | Patel et al. |
| 2022/0152855 | A1 | 5/2022 | Noh et al. |
| 2022/0241994 | A1 | 8/2022 | Washington |
| 2022/0258366 | A1 | 8/2022 | Johnson et al. |
| 2022/0258367 | A1 | 8/2022 | Johnson et al. |
| 2022/0329246 | A1 | 10/2022 | Von Dahlen et al. |
| 2022/0347875 | A1 | 11/2022 | Hamelin et al. |

FOREIGN PATENT DOCUMENTS

| | | | |
|---|---|---|---|
| CA | 2261421 | A1 | 10/1999 |
| CN | 1462103 | A | 12/2003 |
| CN | 2848496 | Y | 12/2006 |
| CN | 101014452 | A | 8/2007 |
| CN | 200977659 | Y | 11/2007 |
| CN | 101306537 | A | 11/2008 |
| CN | 201253863 | Y | 6/2009 |
| CN | 101612740 | A | 12/2009 |
| CN | 101790444 | A | 7/2010 |
| CN | 101842199 | A | 9/2010 |
| CN | 102133756 | A | 7/2011 |
| CN | 202085323 | U | 12/2011 |
| CN | 101795832 | B | 7/2012 |
| CN | 103208780 | A | 7/2013 |
| CN | 203031634 | U | 7/2013 |
| CN | 103235614 | A | 8/2013 |
| CN | 203210412 | U | 9/2013 |
| CN | 103909531 | A | 7/2014 |
| CN | 103998190 | A | 8/2014 |
| CN | 203818169 | U | 9/2014 |
| CN | 107107359 | A | 8/2017 |
| CN | 206795896 | U | 12/2017 |
| DE | 575523 | C | 4/1933 |
| DE | 2620813 | A1 | 11/1976 |
| DE | 2520959 | A1 | 12/1976 |
| DE | 2801845 | A1 | 7/1979 |
| DE | 3141361 | A1 | 8/1982 |
| DE | 202009003889 | U1 | 5/2009 |
| DE | 102008032389 | A1 | 1/2010 |
| EP | 0020816 | A1 | 1/1981 |
| EP | 0885697 | A1 | 12/1998 |
| EP | 0903205 | A1 | 3/1999 |
| EP | 0987088 | A1 | 3/2000 |
| EP | 1535708 | A1 | 6/2005 |
| EP | 1671761 | A1 | 6/2006 |
| EP | 1363517 | B1 | 2/2008 |
| EP | 2338652 | A1 | 6/2011 |
| EP | 3166760 | B1 | 3/2018 |
| FR | 520234 | A | 6/1921 |
| FR | 749861 | A | 8/1933 |
| FR | 840502 | A | 4/1939 |
| FR | 985030 | A | 7/1951 |
| FR | 2703290 | A1 | 10/1994 |
| FR | 2716402 | A1 | 8/1995 |
| GB | 541723 | A | 12/1941 |
| GB | 875618 | A | 8/1961 |
| GB | 1056038 | A | 1/1967 |
| GB | 1075139 | A | 7/1967 |
| GB | 2078589 | A | 1/1982 |
| GB | 2093750 | A | 9/1982 |
| GB | 2116470 | A | 9/1983 |
| GB | 2323224 | A | 9/1998 |
| GB | 2452411 | B | 5/2010 |
| JP | S5416091 | U | 2/1979 |
| JP | S5566396 | U | 5/1980 |
| JP | S56128188 | A | 10/1981 |
| JP | S5838581 | A | 3/1983 |
| JP | S60194333 | U | 12/1985 |
| JP | H06137960 | A | 5/1994 |
| JP | H06216532 | A | 8/1994 |
| JP | H0720172 | U | 4/1995 |
| JP | H08202459 | A | 8/1996 |
| JP | H10165521 | A | 6/1998 |
| JP | H10207288 | A | 8/1998 |
| JP | H11059591 | | 3/1999 |
| JP | 3066524 | B2 | 5/2000 |
| JP | 2001510720 | A | 8/2001 |
| JP | 2002023805 | A | 1/2002 |
| JP | 2002066172 | A | 3/2002 |
| JP | 2004186072 | A | 7/2004 |
| JP | 2005246044 | A | 9/2005 |
| JP | 2006520212 | A | 9/2006 |
| JP | 2007068922 | A | 3/2007 |
| JP | 2007512928 | A | 5/2007 |
| JP | 2007525309 | A | 9/2007 |
| JP | 2008059842 | A | 3/2008 |
| JP | 2008063187 | A | 3/2008 |
| JP | 2008515510 | A | 5/2008 |
| JP | 2009506858 | A | 2/2009 |
| JP | 2009178400 | A | 8/2009 |
| JP | 2010124875 | A | 6/2010 |
| JP | 2010193758 | A | 9/2010 |
| JP | 2010532220 | A | 10/2010 |
| JP | 2011019558 | A | 2/2011 |
| JP | 2011152345 | A | 8/2011 |
| JP | 2011523882 | A | 8/2011 |
| JP | 2013523407 | A | 6/2013 |
| JP | 5753310 | B1 | 5/2015 |
| JP | 2015515884 | A | 6/2015 |
| JP | 2015195869 | A | 11/2015 |
| JP | 2016168276 | A | 9/2016 |
| JP | 2017500115 | A | 1/2017 |
| JP | 2017501852 | A | 1/2017 |
| JP | 2017502778 | A | 1/2017 |
| JP | 2017502781 | A | 1/2017 |
| JP | 2017086606 | A | 5/2017 |
| JP | 2017531513 | A | 10/2017 |
| KR | 920000490 | Y1 | 7/1991 |
| KR | 20070089345 | A | 8/2007 |
| KR | 20100108753 | A | 10/2010 |
| KR | 20140040880 | A | 4/2014 |
| KR | 20140042230 | A | 4/2014 |
| KR | 20140069811 | A | 6/2014 |
| KR | 200473990 | Y1 | 8/2014 |
| WO | 9213684 | A2 | 8/1992 |
| WO | 9404106 | A1 | 3/1994 |
| WO | 9708804 | A1 | 3/1997 |
| WO | 9737819 | A2 | 10/1997 |
| WO | 2010068070 | A2 | 6/2010 |
| WO | 2010078564 | A2 | 7/2010 |
| WO | 2013070995 | A1 | 5/2013 |
| WO | 2015108805 | A1 | 7/2015 |
| WO | 2015108806 | A1 | 7/2015 |
| WO | 2015108801 | A4 | 9/2015 |
| WO | 2017024156 | A1 | 2/2017 |
| WO | 2019191231 | A1 | 10/2019 |

OTHER PUBLICATIONS

U.S. Appl. No. 16/367,811, filed Mar. 28, 2019, Steven Michael Bourque et al.

U.S. Appl. No. 16/367,828, filed Mar. 28, 2019, Steven Michael Bourque et al.

All Office Actions, U.S. Appl. No. 16/367,811.

All Office Actions, U.S. Appl. No. 16/367,747.

All Office Actions, U.S. Appl. No. 16/367,828.

International Search Report and Written Opinion; Application Ser. No. PCT/US2019/024215; dated Jun. 7, 2019, 14 pages.

3B Certified Silicones in 50, 60, and 70 Durometer, Testa, Dominic, available on Sep. 25, 2020 at https://v www .sspi nc.com/si li cones that_ work/88/3 B-Certi fied-Si l icones-i n-50-60-and-70-Du rometer/?

(56) References Cited

OTHER PUBLICATIONS vsrefdom =adwords&gclid=EAlalQobChMIOYrO_oyF7AIVk-DICh08_QaFEAAYAiAAEgKAnvD_Bw, dated Feb. 27, 2017, 1-6 pages.
Amazon product review, Shaving razor handle dated Mar. 23, 2016,2 pages.
https://en.wikipedia.org/wiki/Yield_(engineering)#:-:text=The%20yield%20strength%20or%20yield,material%20begins%20to%20deform%20plastically., dated 2020 ; 1 page.
https://www.merriam-webster.com/dictionary/handle; dated 2020; 2 pages.
Low Compression Set Gaskets—Silicone, Urethane Foam, New England Die Cutting, available on Sep. 25, 2020 athttps://www.nedc.com/low-compression-set-gaskets-silicone-urethane-foam/ dated Mar. 22, 2020, 1-5 pages.
All Office Actions; U.S. Appl. No. 17/739,254, filed May 9, 2022.
All Office Actions; U.S. Appl. No. 17/739,257, filed May 9, 2022.
U.S. Appl. No. 17/739,254, filed May 9, 2022, to Robert Harold Johnson et al.
U.S. Appl. No. 17/739,257, filed May 9, 2022, to Robert Harold Johnson et al.
"Practical Design Guidelines for Flex", dated 2016, pp. 75-116, available on Sep. 12, 2023 at: https://fliphtmls.com/izxs/irex/basic.

* cited by examiner

RAZOR HANDLE WITH A RIGID MEMBER

FIELD OF THE INVENTION

The invention generally relates to handles for razors, more particularly to handles with movable portions.

BACKGROUND OF THE INVENTION

Since the invention of the safety razor in the 1850's, four main design architectures of razors—the safety razor, the disposable edge safety razor, the modern cartridge system razor, and the disposable razor—have dominated the market. During this time, both the razor handle and the razor cartridge/blade provide benefits to the shaver.

In the last fifty years, the premium wet shave market has been dominated razors using replaceable cartridges, which are the only component that touches the skin during shaving. The consumer benefits of these cartridge razors have been limited to mainly safety, convenience, ergonomics, and/or control of blade geometry and have been driven mainly by improvement to the cartridges.

Handles for razors that use replaceable cartridges have improved by better ergonomics of handle grips, better cartridge attachment and detachment mechanisms, and the utilization of multiple axes of rotation of the cartridge relative to the handle. Typically, these improvements require additional components, including some of them that have prescribed motion. These additional components often require tight tolerances with little room for error. As a result, current approaches introduce complexities, costs, and durability issues for manufacturing, assembling, and using such razors.

Additionally, recent advances in shaving razor handles that use replaceable cartridges have enabled the delivery of other consumer experiential benefits from the handle close to or onto the shaved surface. Such razor handles include liquid dispensing razors and heated razors. Most of these razor handles have been adapted to fit cartridges like those currently manufactured for existing premium system handles. These handle and cartridge systems have many disadvantages, including being expensive to manufacture—e.g. need heating elements in the cartridge and having poor handle ergonomics and shave performance due to the interfaces between handle and cartridge and the large contact area of shaving surfaces.

What is needed, then, is a better design or architecture of a cartridge and a razor handle system that enables good core shaving performance, good product integrity and safety, multiple axes of cartridge motion relative to the handle, easy attachment and detachment of cartridge from the razor handle, and simple, reliable, and cost-effective manufacturing when compared to existing razors. Such a design architecture would apply to both powered and unpowered razors suitable for wet or dry shaving and to both durable and disposable razor handles. Such a design may also apply to razors that delivery of benefits from the handle close to or onto the skin.

SUMMARY OF THE INVENTION

The present invention is directed to a first member having one or more movable elements, a second member, a rigid member extending between said first member and said second member wherein said first member and said second member are coupled together through said rigid member.

The present invention is also directed to a razor handle including a first member, a rigid member disposed below said first movable member, said rigid member comprising a rigid member platform, said rigid member platform having a width to thickness ratio from about 7 to about 60, and a second member disposed below said first member.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

Figure 1A:
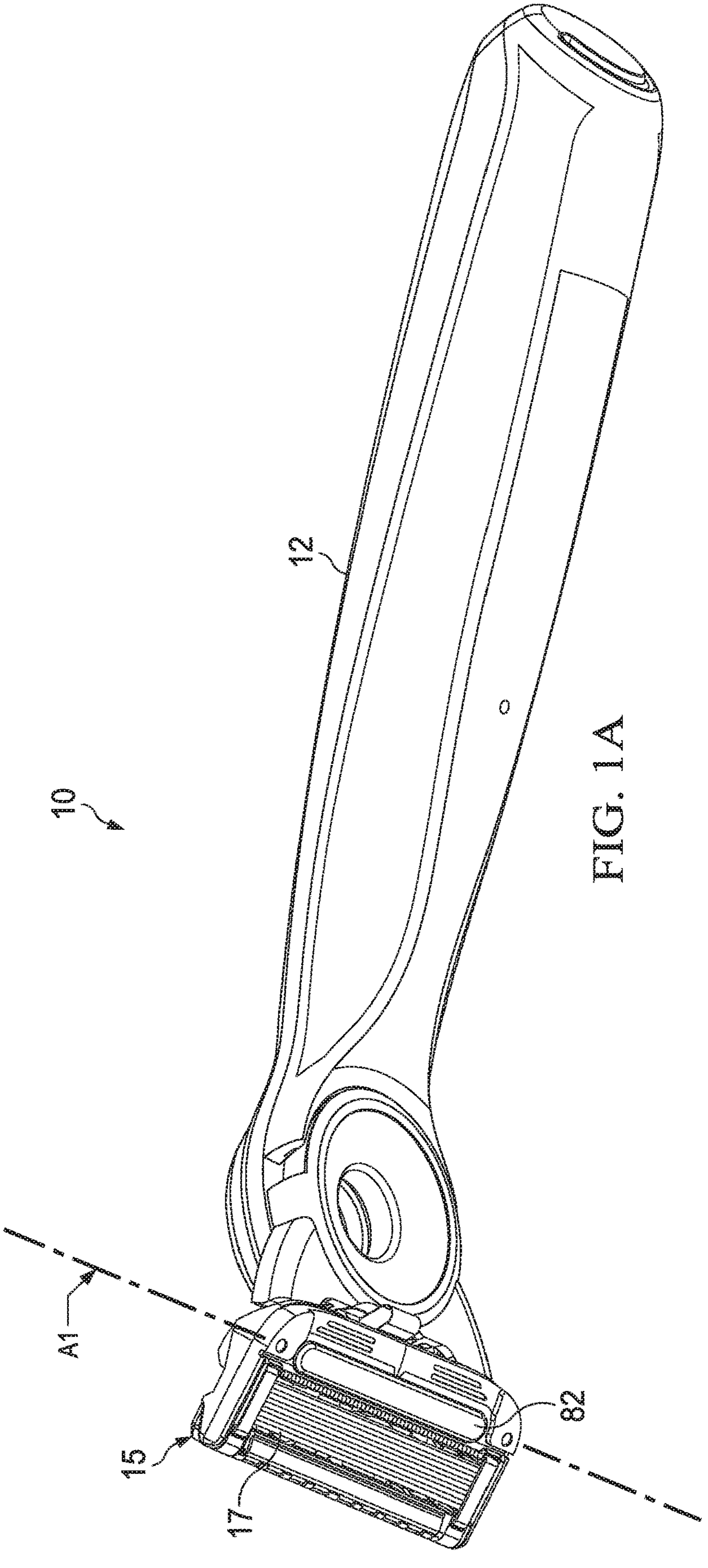
FIG. 1A is a perspective bottom view of a shaving razor in accordance with an embodiment of the invention.

Except as otherwise noted, the articles "a," "an," and "the" mean "one or more."

The present invention described herein involves a novel razor structure and method of manufacturing such structure. The razor structure relates to the layering of functional components, and the layering of one or movable members and assemblies, above and below, a member of the handle that is made from a more rigid material than other portions of the handle. Preferably, this rigid member forms a relatively thin and wide section of the handle at least one or more of the functional assemblies above the rigid member are connected directly to the member below through holes, openings or o a thin and relatively wide section of the razor handle. This thin and relatively wide section of the razor handle is typically more rigid than other large components in the handle through choice of material and design. Functional assemblies of components such as cartridge eject mechanisms and pivot mechanism can be attached above and below this rigid member.

Existing razor designs place functional components within an internal cavity of a rigid component of the razor handle. The advantage of the present invention's layering of functional components and assemblies above and below a relatively wide and relatively thin rigid member over existing razors includes the ability to incorporate large and more complex functional components within those functional components and to manufacture razors with a larger variety of improved consumer benefits in a simple, reliable, and cost-effective manner.

This razor structure is also advantageous in providing consumers with a safe product with good product integrity in case of accidental drops. Most existing handles weight less than 56 grams and the majority weight less than 40 grams. As handles become more complex and more premium in market tier, they tend to weigh more. The razor structure of the present invention is well suited for handles that are two to three times heavier than most razors commonly found on the market, specifically handles from about 57 grams to about 150 grams and preferably about 80 grams. Such a handle is considered a "heavy" handle in the present invention.

The razor structure and methods of manufacturing the razor structure of the present invention are also advantageous for non-limiting embodiments of razors described herein that can provide benefits to a consumer's skin using a razor handle, where the razor handle has a skin interconnect member through which benefits can be provided and such that the skin interconnect member is in a pivotal relationship to the main body of the handle. This skin interconnect member can be joined or fixed to the razor cartridge.

Other embodiments of razor structures and methods of manufacturing are contemplated in the present invention such as those without skin interconnect members or pivoting mechanisms.

The movable member or portion of the present invention is desirably disposed on a razor structure or a component of a razor, preferably a handle.

Figure 2:
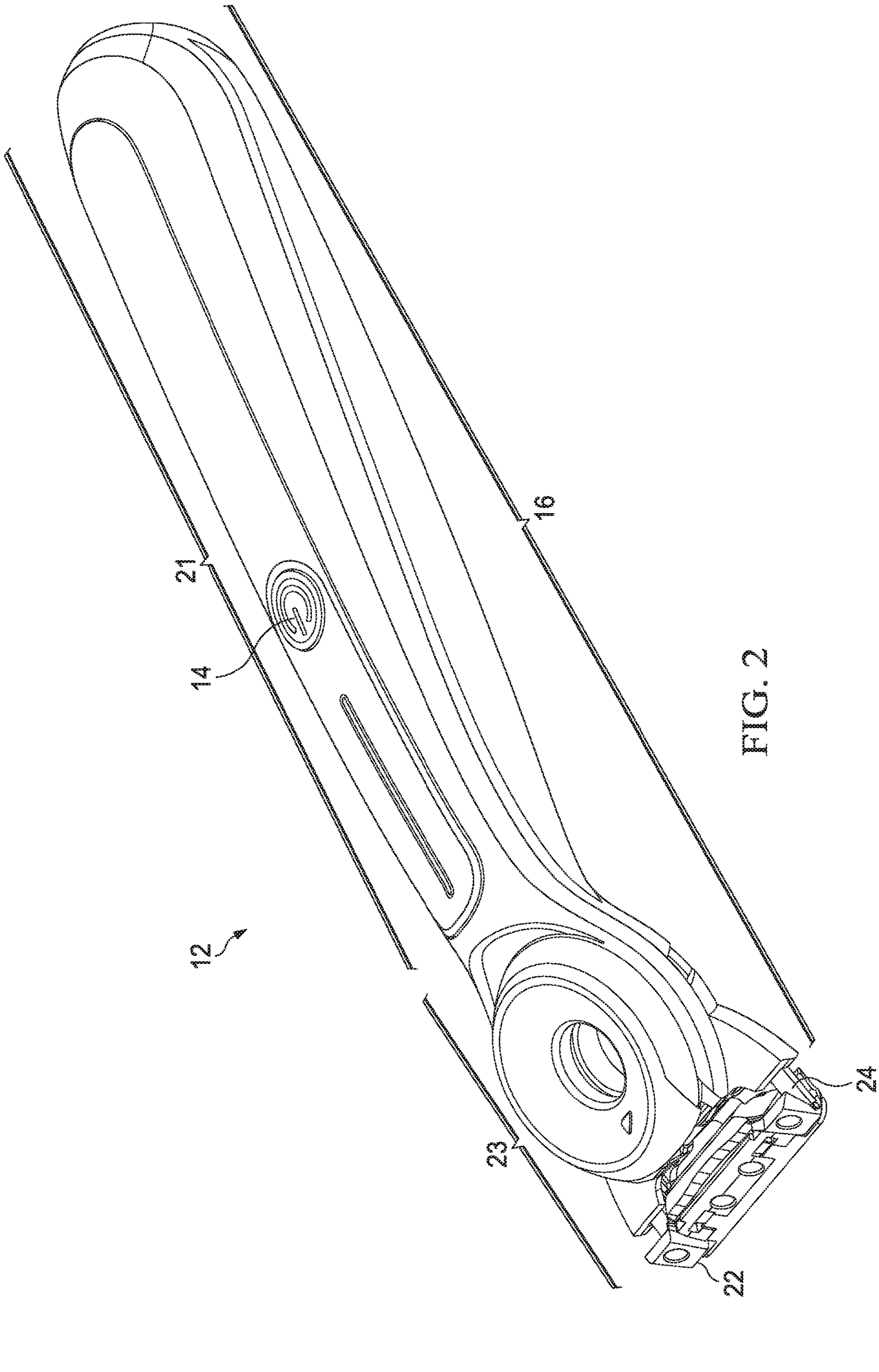
FIG. 2 is a perspective top view of an embodiment of a handle of the present invention.

The "main body" of the handle as used herein signifies the razor handle of the present invention without the skin interconnect member 22. As shown in FIG. 2, the main body 16 includes a handle main section 21 and a handle transition section 23. The handle transition section and a handle main section are coupled together to form a majority of the main body of the handle. The handle transition section 23 can include a skin interconnect member 22 which may not be part of the main body. The handle main section can comprise a longitudinal section of the handle.

A "movable member" or "movable member assembly" as used herein signifies a member comprised of one or more portions on the razor which are capable of moving or providing a motion functionality for the razor. For instance, the movable member of the present invention may preferably comprise portions which provide a pivot mechanism or a release or ejection mechanism.

The term "spring", "spring mechanism", or "spring member" as used herein, signifies any type of mechanical spring, such as a compression spring, a leaf spring, or any feasible spring or combination thereof. A spring member of the present invention generally has a loop shape. The term "loop" as used herein signifies a generally curved, circular shape, which may form a loop. Non-limiting loops of the present invention comprise oval, circular, elliptical, ring shape, substantially a V-shape, tear drop shape, or any modification or combination thereof. The loop may be split and the loop itself, the end portions or distal ends of the loop can be unconnected or free, unsupported, connected or mounted, or overlap each other. The distal ends can be facing towards each other or can be facing away from each other. A loop spring member of the present invention, when straightened, desirably has an overall length of about 30 mm to about 90 mm.

The spring mechanism of the present invention is based on an interaction between the portions of the movable member assembly (whether disposed on the cartridge or the handle of the razor) and the spring member. During the pivot or eject functions, the spring member offers a resistance that is a function of its preload compression, its geometry and material, and the geometry of the carrier structure, and depending on the intensiveness of that resistance, the effect will be larger or smaller.

The term "rigid member" as used herein signifies a member comprised of a hard metal that can include a rigid member platform. The terms frame and rigid member of the present invention can be used interchangeably herein. However, a secondary frame is generally not a part of the rigid member of the present invention. The rigid member can be a longitudinal portion in a handle main section. The rigid member platform can accommodate a movable member assembly with one or more movable members disposed thereon or therethrough. The frame 18 is desirably comprised of a hard metal. The hard metal may be comprised of a diecast material. A nonlimiting example of a diecast material of the present invention is zinc. Die-cast zinc materials include ZAMACK3, ZAMACK5, and ZA8. Other suitable materials include glass fiber reinforced plastics such as IXEF, stainless steel, aluminum, aluminum diecast, and magnesium diecast. The rigid member or frame may be comprised of one material, preferably a strong metal, but may be formed as two bodies that are then connected. In this case, it is preferable that the rigid member platform is made of hard metal that is necessarily harder than that of the rest of the frame.

The rigid member platform of the present invention can be a section of the rigid member having a wide and thin profile relative to the overall rigid member. The movable member assembly can be mounted above and below the rigid member platform. In the present invention, a maximum width to median thickness ratio of the platform itself is about 7 to 60, and preferably about 20. The median thickness of the platform ranges from about 0.5 mm to about 2.5 mm, and preferably about 1 mm. The area of the rigid member platform including the area from features such as openings and pockets ranges from about 50 $mm^2$ to about 700 $mm^2$, and is preferably about 300 $mm^2$. The rigid member platform has a hydraulic diameter, (e.g., in standard engineering this diameter can be defined as about four times the area divided by the perimeter) from about 8 mm to about 50 mm, and preferably about 20 mm. The width of the rigid member platform ranges from about 10 mm to about 50 mm. The length to thickness ratio of the rigid member platform itself is 7 to 60, and preferably about 20.

Rigid members and rigid member platforms of the present invention are shown and described with respect to FIGS. 13-15.

The term "location feature" as used herein signifies a feature such as an aperture or opening, a slot, one or more protrusions, or any combination thereof. These features provide a structure that enables travel of movable assemblies, to attach movable assemblies or secondary frames to the rigid member or the rigid member platform, and they provide attachment points for other rigid features to the rigid frame enhancing integrity.

In one embodiment of the present invention, the location feature is an aperture. The feature may be disposed in a part of the frame (or rigid member), such as in the rigid member platform, or in one or more, or all of the portions of the movable member assembly of the razor structure present invention. In another embodiment of the present invention, the location features are protrusions and apertures. The frame may be part of a handle or may be part of a razor cartridge. The location feature is utilized for aligning and coupling portions of the razor structure together by utilizing the location feature in the frame and portions.

The term "benefit" or "benefit delivery assembly" or "benefit delivery system" as used herein signifies something delivered to a user that is perceived to be advantageous. In the case of a razor or hair removal device, the term benefit refers to a skin benefit. Such a skin benefit cane be a heating or cooling of the skin. Another benefit to the user is fluids (e.g., liquids) or waxes to the skin. Further, benefits may be provided in combination, such as a benefit of heat and fluids. These may be advantageous to a user by enhancing their shaving experience.

Figure 1B:
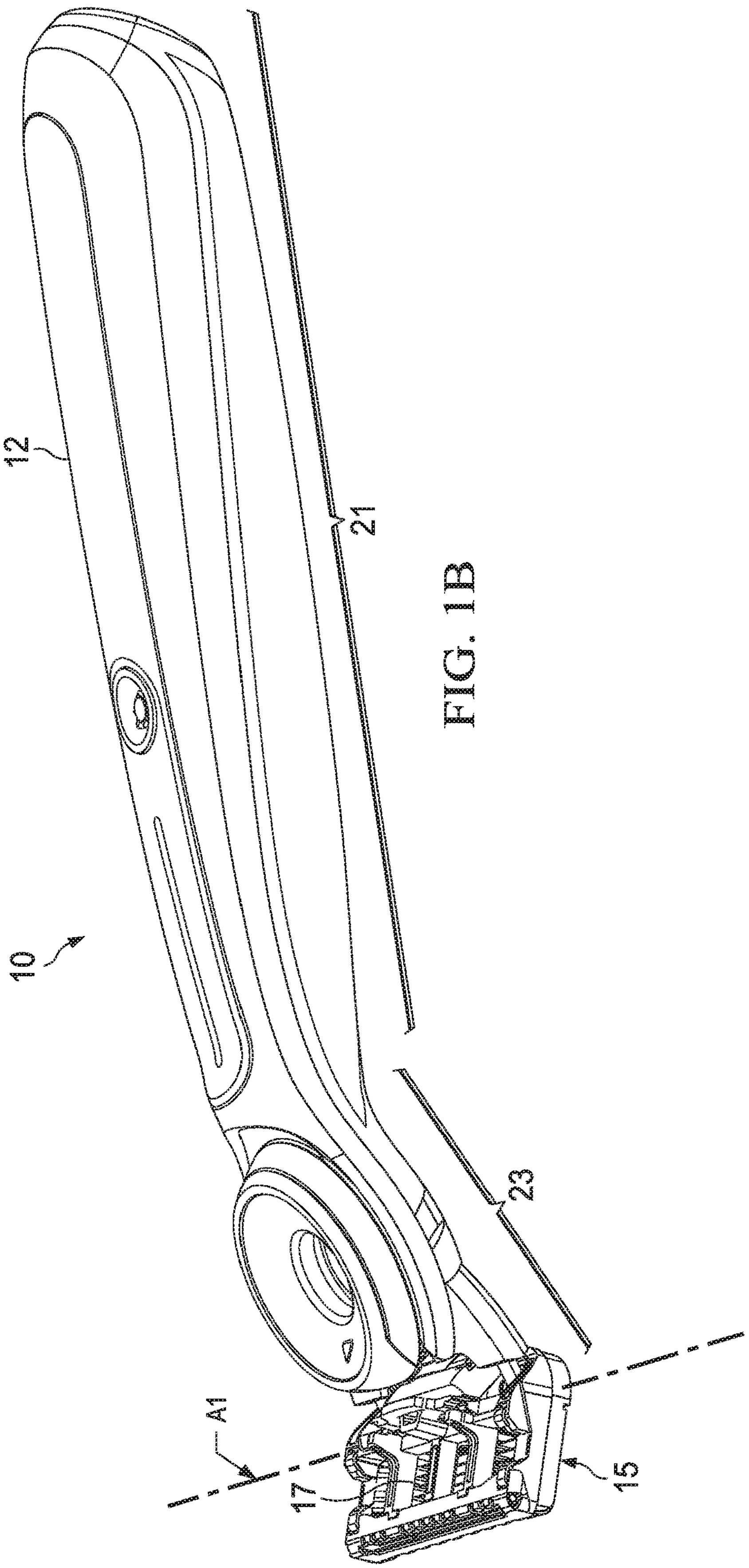
FIG. 1B is a perspective top view of a front of the shaving razor of FIG. 1A.
Figure 1C:
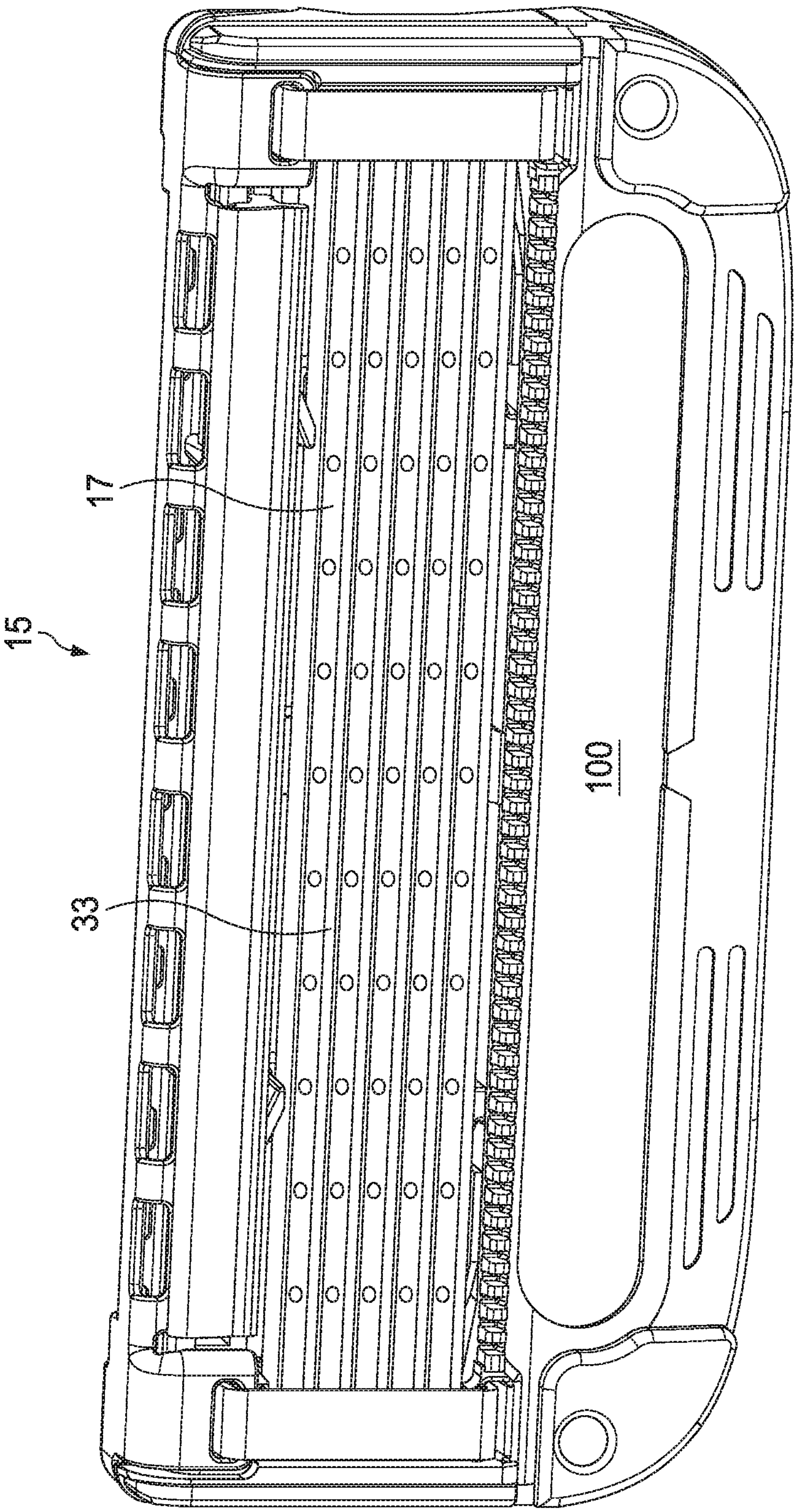
FIG. 1C is a front view of a blade cartridge unit shown in FIGS. 1A and 1B.

Referring to FIGS. 1A-1C, a shaving razor 10 of the present invention comprises a handle 12 and a blade cartridge unit 15, which removably connects or releasably attaches to the handle 12 and contains one or more blades 17 having cutting edges 33. The handle 12 can comprise a handle main section 21 that is used to grip the handle. The handle 12 can comprise a handle transition section 23 that connects the handle main section 21 to the blade cartridge unit 15. The blade cartridge unit 15 can be configured to rotate about an axis of rotation A1 that is substantially parallel to the blades 17 and substantially perpendicular to the handle 12. As shown in the illustrated embodiments, the razor can be configured to deliver benefits to the skin of the user by extending the handle 12 through an opening 100 in the blade cartridge unit 15 to enable handle benefit delivery components to be close to the skin.

Figure 1D:
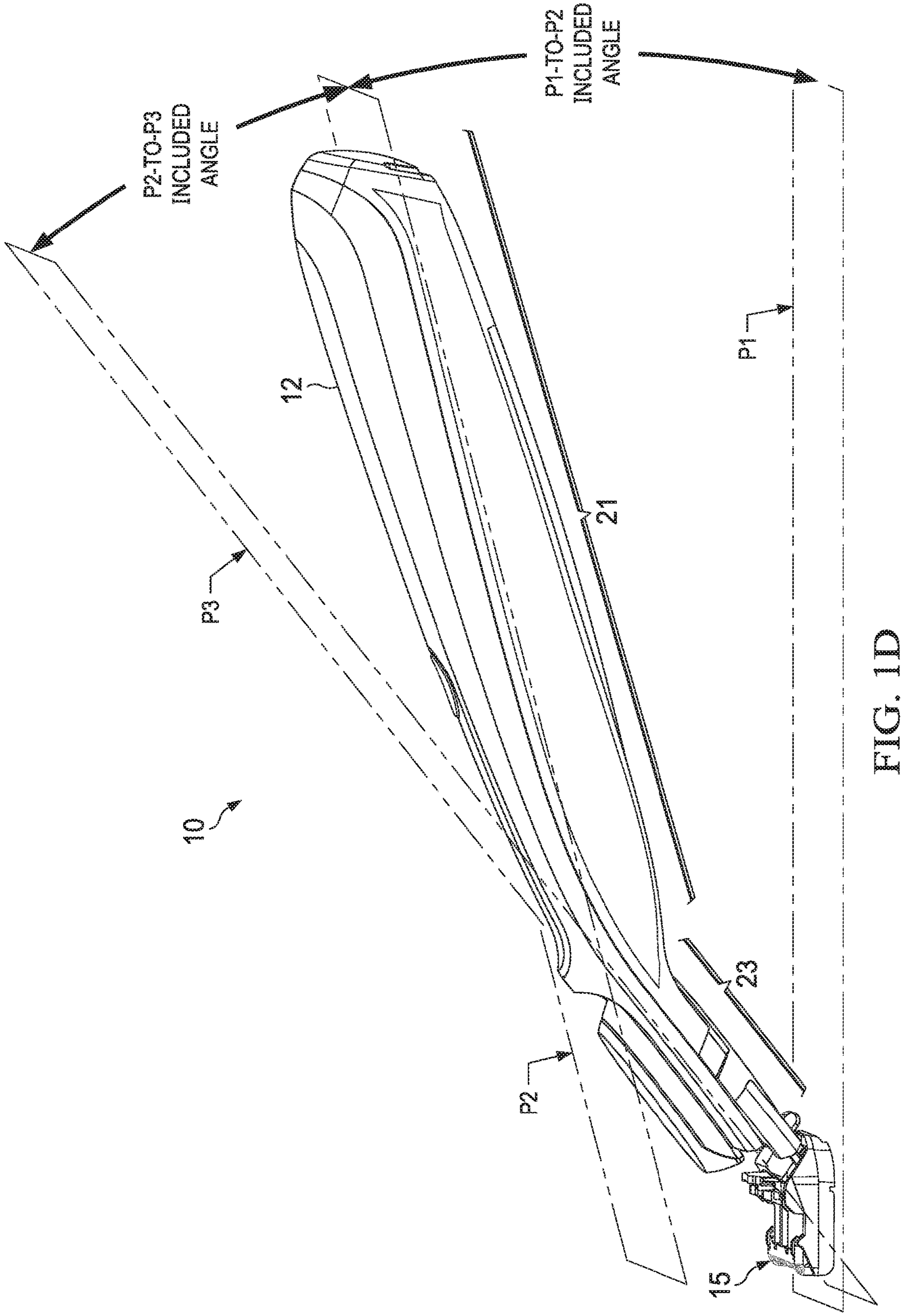
FIGS. 1D-1E are graphical schematics of the handle and the blade cartridge unit of the present invention.
Figure 1E:
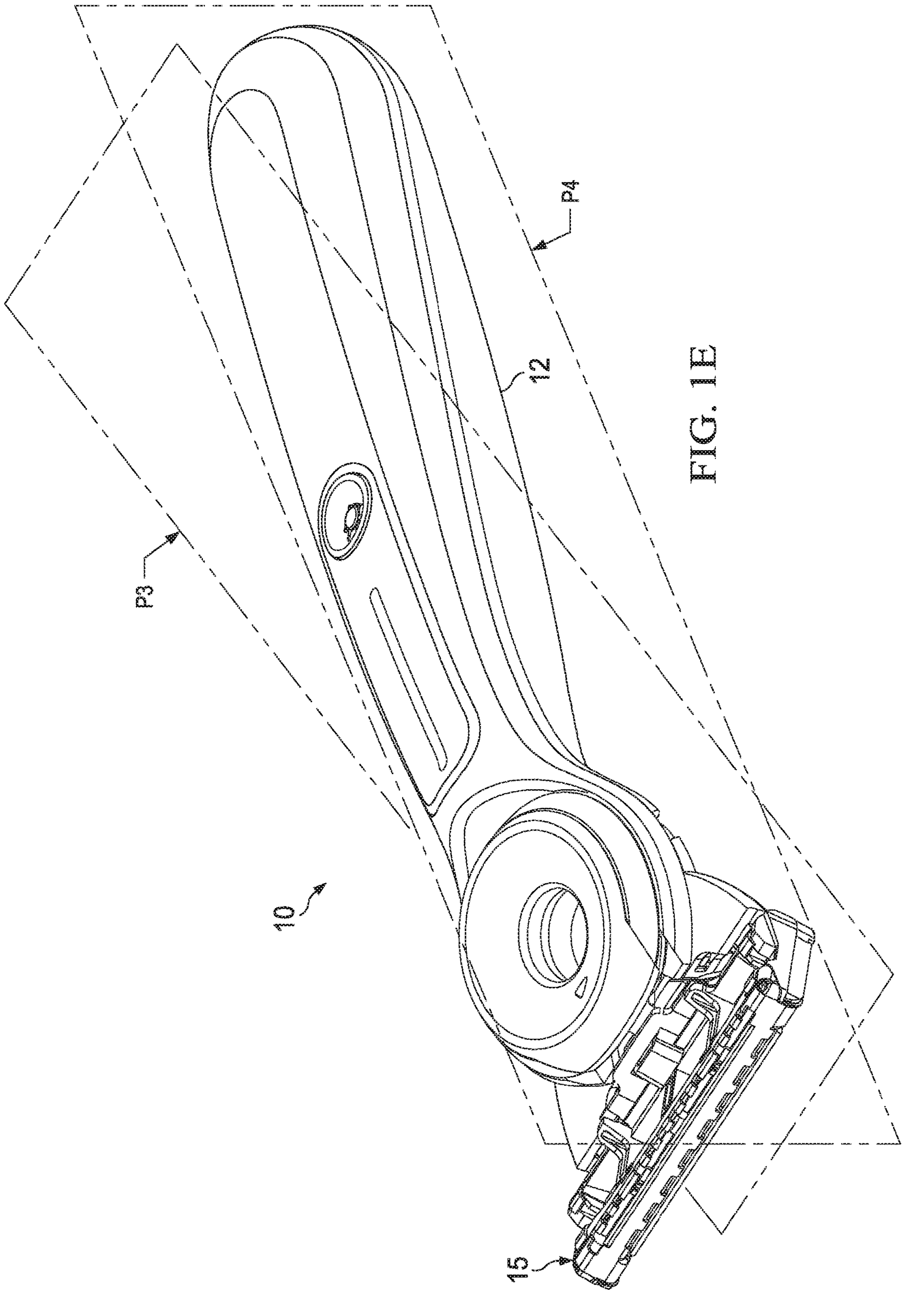

In FIGS. 1D-1E, a graphical layout of the handle 12 and the blade cartridge unit 15 of the present invention is shown in a rest, undeflected, unloaded rest position. In general, the skin contacting surface of the blade cartridge unit 15 usually lie on or within a few millimeters of a cartridge plane P1 when the blade cartridge unit 15 is at its rest position. In general, a plane P2 may be oriented at an angle to the cartridge plane P1 that lies along an approximate mid-plane of the handle main section 21. This P1-to-P2 included angle between planes P1 and P2 may range from −60 degrees to +90 degrees. A narrower preferential range of the P1-to-P2 included angle is −25 degrees to +25 degrees. The figures of the present invention show a P1-to-P2 included angle around +16 degrees. In general, a plane P3 may be oriented at an angle to the main handle section midplane P2 that lies along an approximate mid-plane of the handle transition section 21. This P2-to-P3 included angle between planes P2 and P3 may range from −90 degrees to +90 degrees. A narrower preferential range of the P2-P3 included angle is −90 degrees to +45 degrees. The figures of the present invention show a P2-to-P3 included angle of +21 degrees. In general, a plane P4 can be defined perpendicular to planes P1, P2, and P3 that lies longitudinally along the handle 12 at the approximate mid-plane of the handle 12 and the blade cartridge unit 15.

Figure 1F:
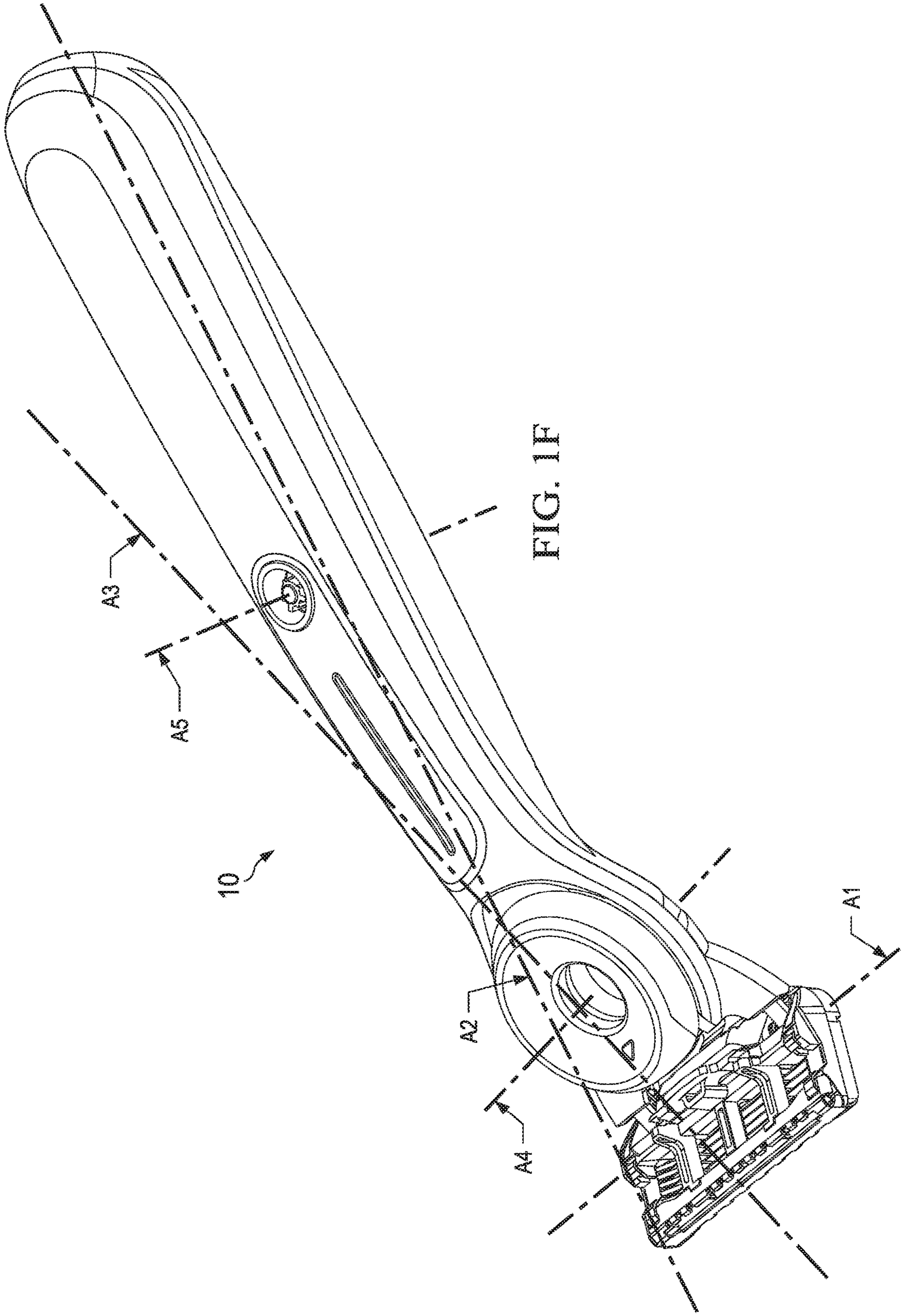
FIGS. 1F-1H are schematic layouts of axes of motion in a perspective view of a razor of the present invention.
Figure 1G:
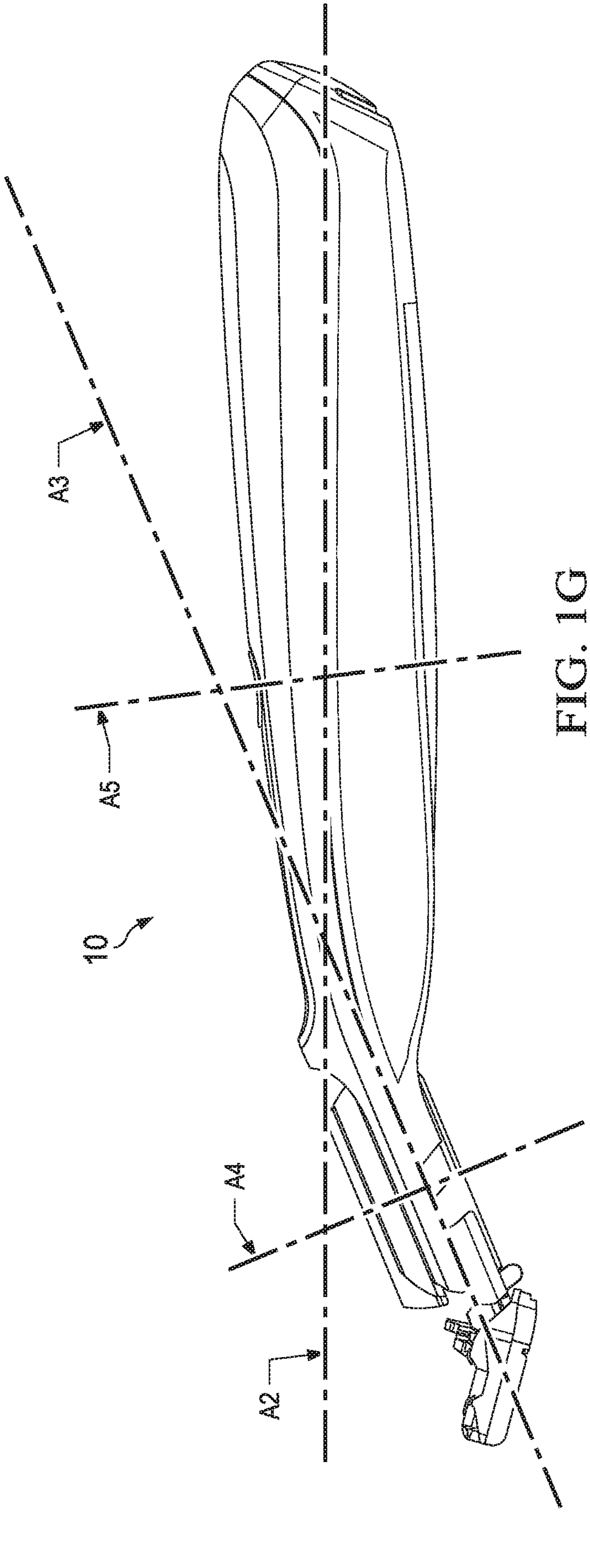
Figure 1H:
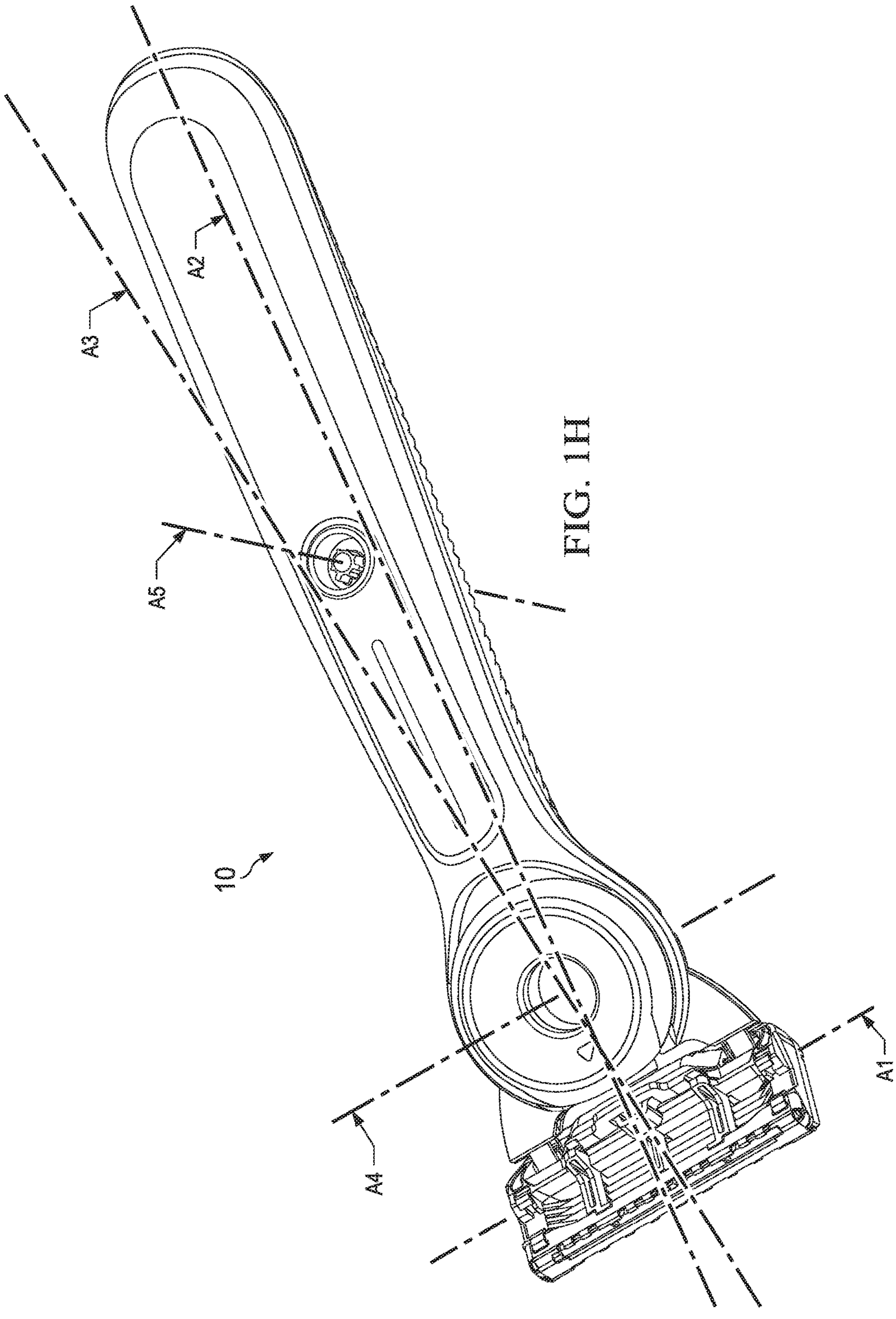

Referring to FIGS. 1F, 1G, and 1H, additional axes of rotation or directions of linear motion for various components of the handle can be generally defined using planes P2, P3, and P4 as described in FIGS. 1D and 1E. An axis A2 along the handle main section 21 can be defined as the intersection of planes P2 and P4; and an axis A3 along the handle transition section 23 can be defined as the intersection of planes P3 and P4. Another axis A4 within the handle transition section 23 can be defined perpendicular to plane P3 and laying upon plane P4. Another axis A5 within the handle main section 21 can be defined perpendicular to plane P1 and laying upon plane P4.

Two types of non-limiting embodiments of razors providing for a skin benefit are disclosed herein. The first razor embodiment provides a benefit to the user by heating or cooling the skin. The second razor embodiment provides a benefit to the user by fluids (e.g., liquids) or waxes to the skin. It should be noted that many of the components described in relation to the razor providing a benefit by heating and cooling the skin can also be incorporated into a razor providing benefits by delivering fluids and waxes to the skin. Both embodiments share common problems and have similar solutions including the structural elements of the handle 12, the handle main section 21, the handle transition section 23, and the skin interconnect member 22, the mechanisms that enable skin interconnect member 22 to rotate about different combinations of axes A1-A5, and the manufacturing of these components.

Figure 3:
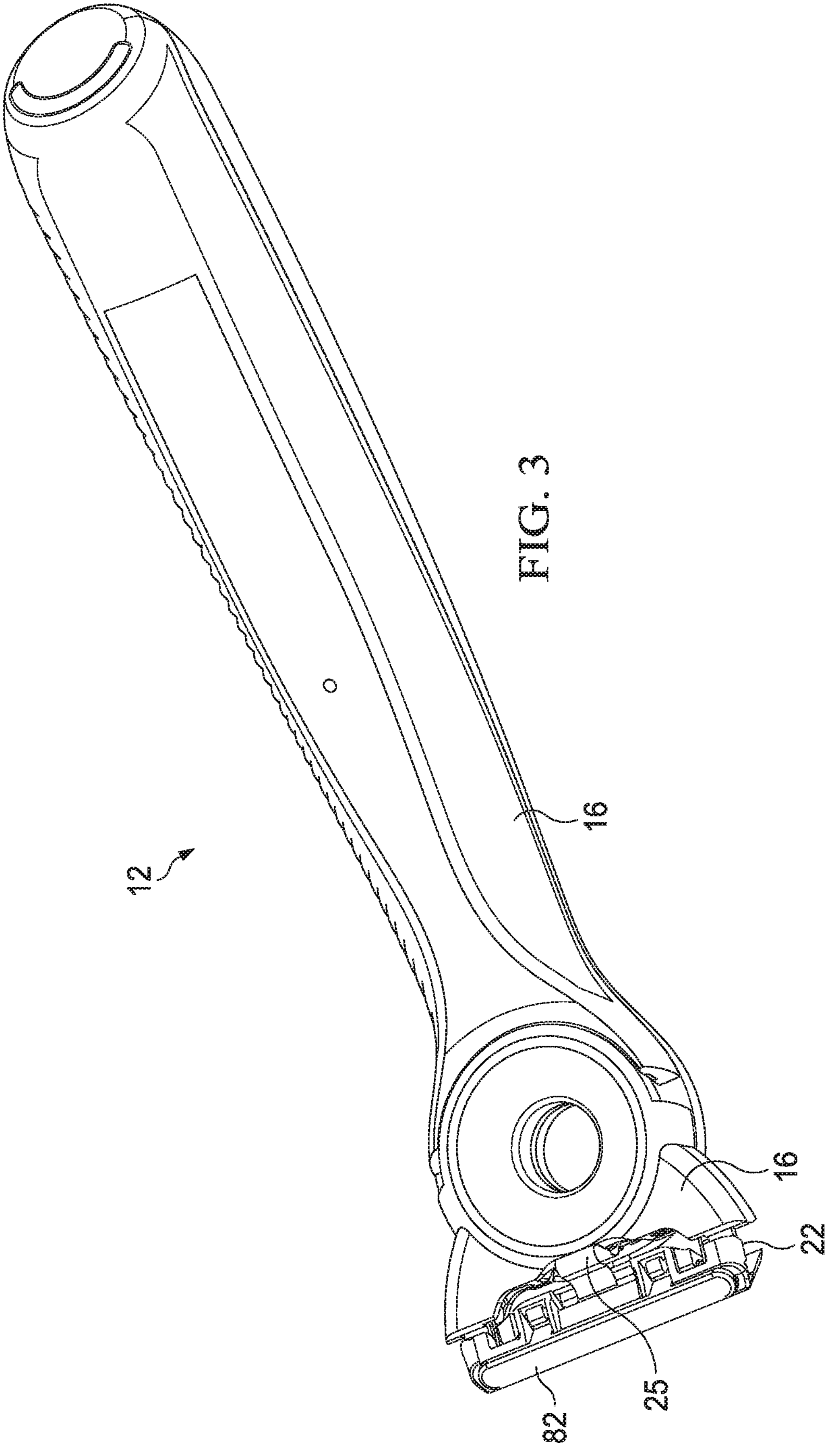
FIG. 3 is a perspective bottom view of the handle of FIG. 2.

As shown in FIGS. 1A, 1B, and 1C, this first razor embodiment can have a handle 12, a blade cartridge unit 15 that can releasably attach to the handle 12 and can contain one or more blades 17, and a heat delivery element which can deliver a heat skin benefit. A portion of the handle 12 can extend through blade cartridge unit 15 and be exposed as heating surface 82, discussed more fully below. As shown in FIGS. 1A and 1*n* more details in FIGS. 2 and 3 in which the blade cartridge unit 15 has been removed, thermal surface 82 is a surface of a skin interconnect member 22 and can be used to deliver a cooling or heating benefit to the user during shaving. Heating or cooling of the skin interconnect member 22 can be achieved by pressing the skin benefit actuator 14, which can be a depressible button, a touch sensitive button, or a sliding button, and which closes a powered circuit inside handle 12 to a circuit inside the skin interconnect member 22. The handle 12 may hold a power source, such as one or more batteries (not shown) that supply power to the handle skin interconnect member 22. Heating or cooling of the skin interconnect member 22 can also be achieved passively such as by dipping the skin interconnect member 22 into water at a different temperature than ambient. In certain embodiments, the heat delivery element can comprise a metal such as aluminum or stainless steel. In certain embodiments, the heat delivery element can comprise a high capacity material such as metal or phase change materials. In certain embodiments, the heat delivery element can comprise high thermal conductivity materials such as copper, aluminum, or thermally conductive plastics such as COOLPOLY® (trademark symbol). The razor handle disclosed herein can include the heat delivery element disclosed co-owned, co-pending US application having a Docket No. 14532FQ, which is hereby incorporated herein by reference.

In the illustrated embodiments, skin interconnect member 22 is configured to pivot about axes A1 and A4. Other embodiments may be configured to move skin interconnect member 22 about axes A1, A2, A3, A4, A5 or any combination thereof. The bearings, which enable these rotary motions, may lie directly along an axis such as pin bearing or a shaft, or they may offset from the axis of rotation, creating by a virtual pivot. Virtual pivot bearings include shell bearings and linkages.

Figure 4:
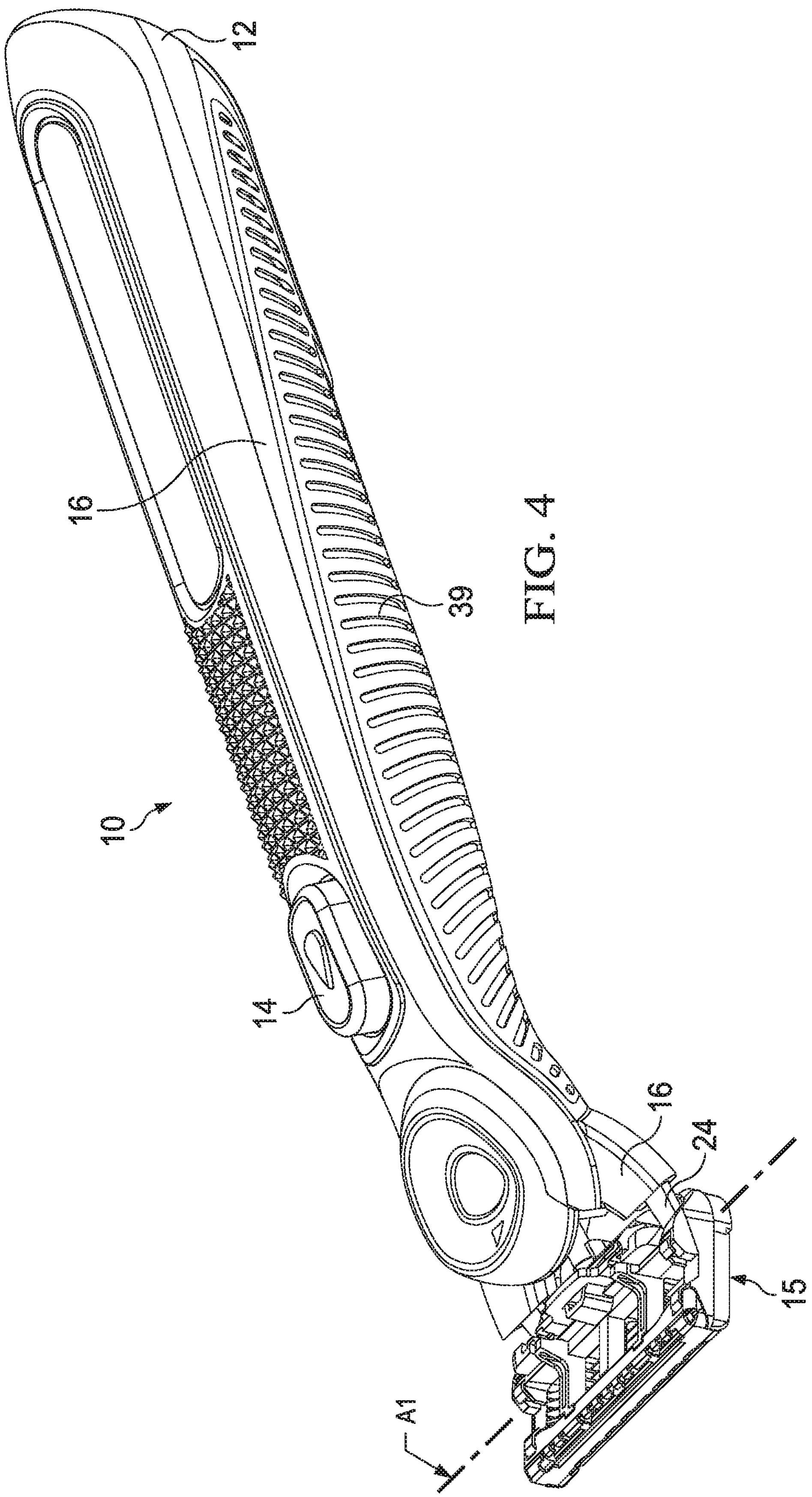
FIG. 4 is a perspective top view of an alternate embodiment of a razor of the present invention.
Figure 5:
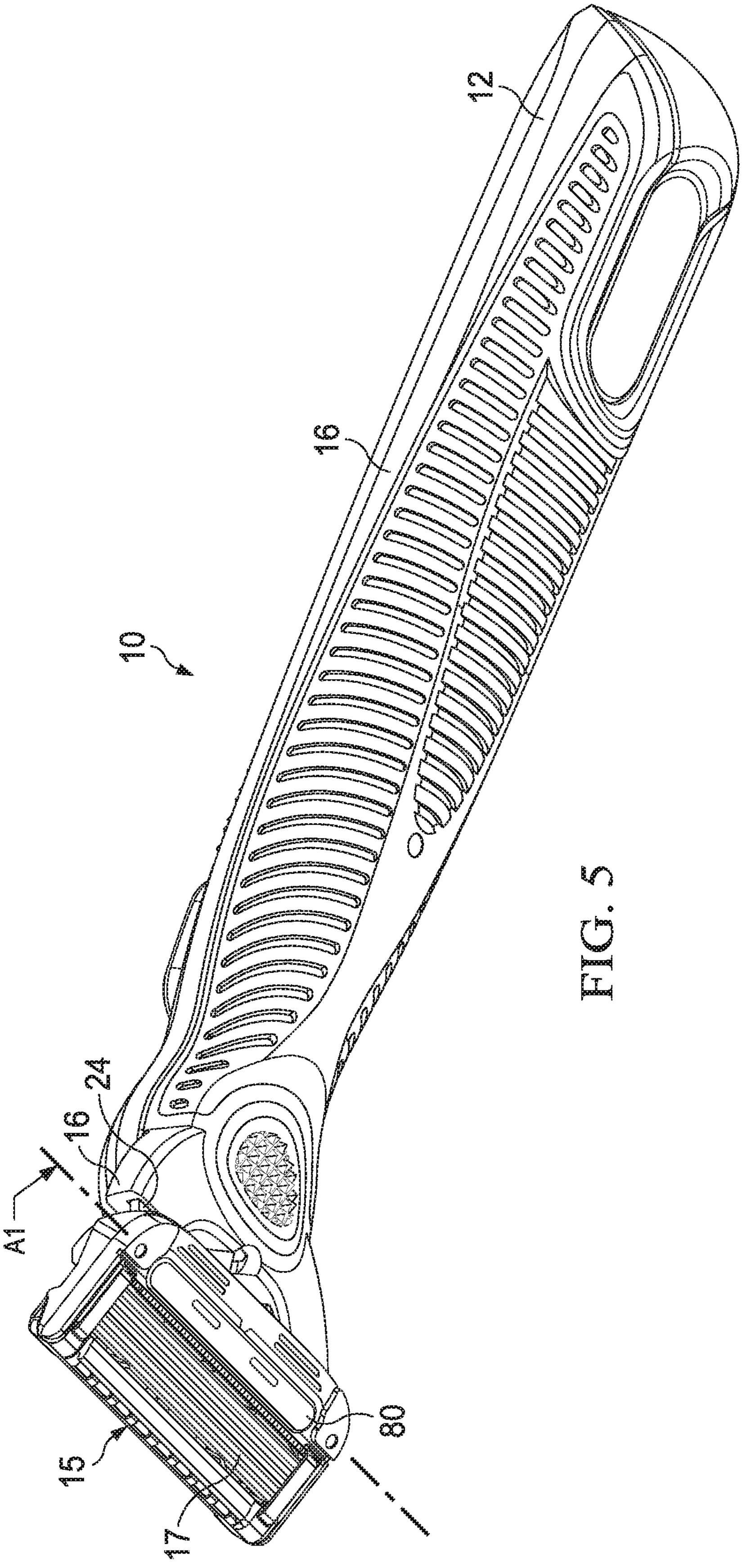
FIG. 5 is a perspective bottom view of the razor of FIG. 4.

In a like manner, FIG. 4 shows another embodiment of a shaving razor that can deliver a benefit by delivering a fluid or wax to the skin of the user. As shown in FIG. 5, which shows the underside of the razor depicted in FIG. 4, a portion of the handle 12 can extend through blade cartridge unit 15 and be exposed as face 80, discussed more fully below. As shown in FIGS. 4 and 5 and in more detail in FIG. 6 in which the blade cartridge unit 15 has been removed, face 80 is a surface of a skin interconnect member 22 and can have openings 78 through which a fluid can be dispensed for skin comfort during shaving. Fluid flow from the reservoir in handle 12 can be achieved by pressing the skin benefit actuator 14, which can be a depressible button, a touch sensitive button, or a sliding button which activates a pumping mechanism 72 (shown in FIG. 7B) to push fluid towards and through the skin interconnect member 22. The pumping mechanism can include the compression of a flexible fluid reservoir, actuation of a manual pump, or activation of a powered pump.

Figure 6:
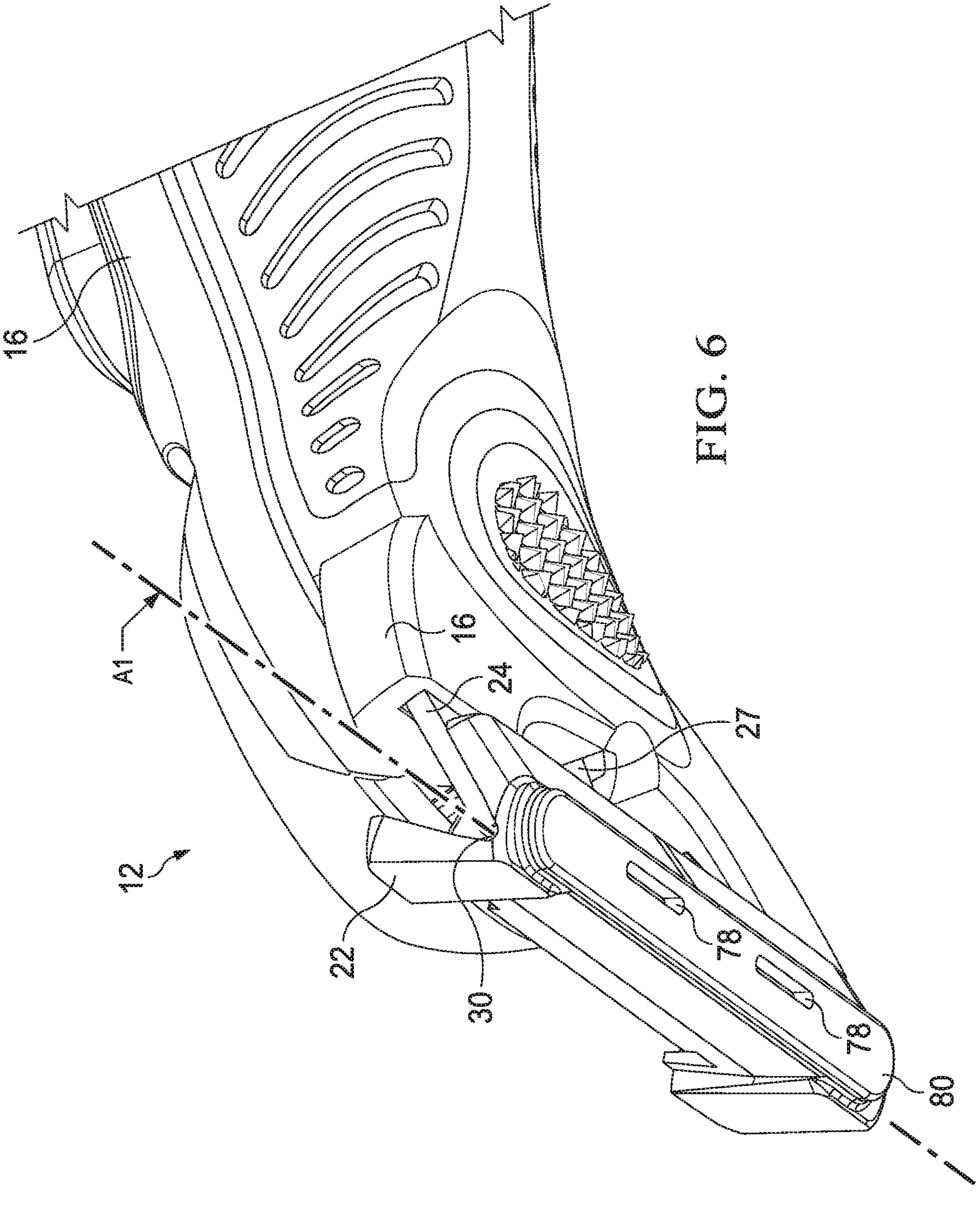
FIG. 6 is a close-up view of a proximal end of a handle of the present invention.
Figure 7A:
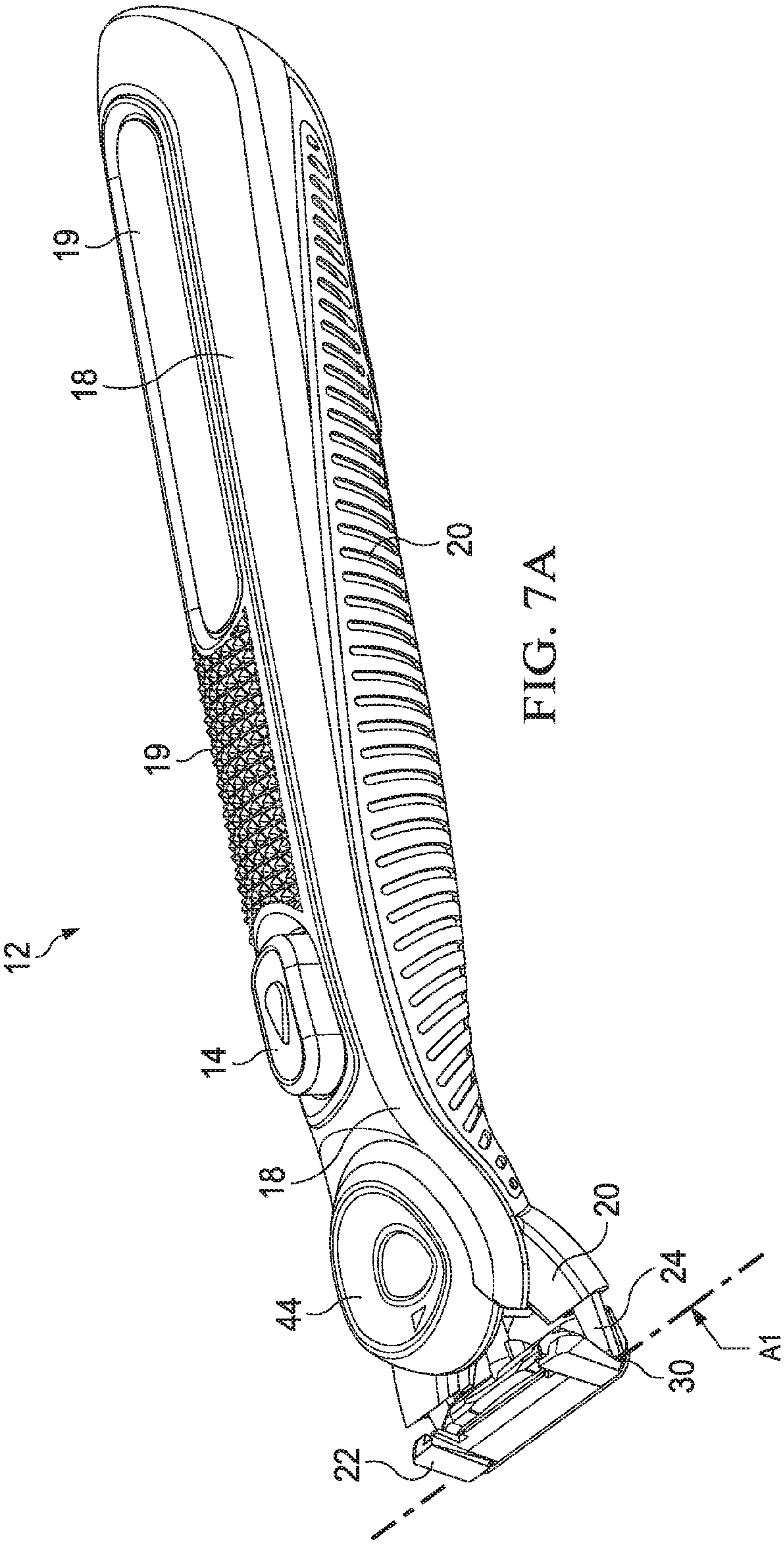
FIG. 7A is a perspective top view of an embodiment of a handle of the present invention.
Figure 7B:
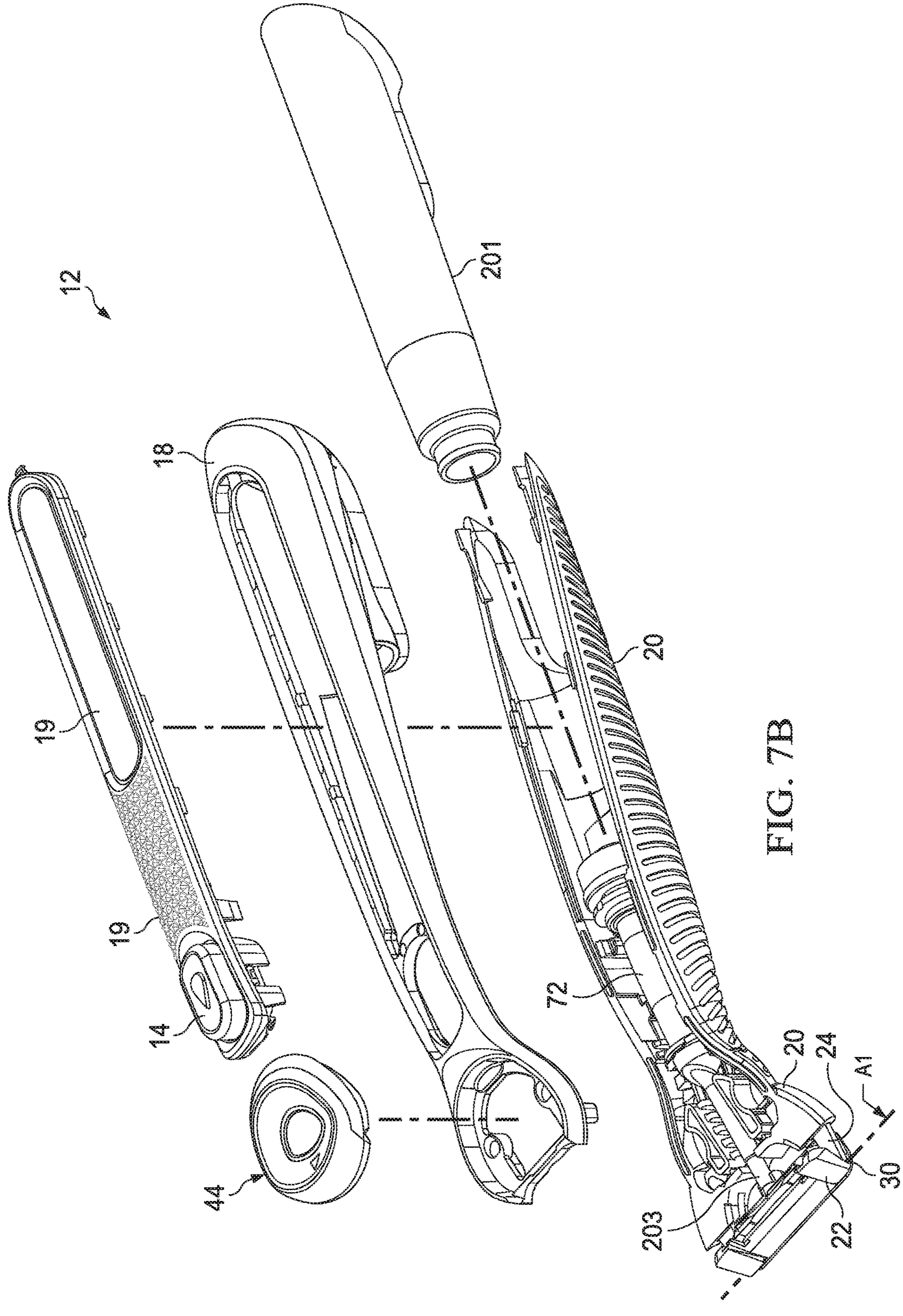
FIG. 7B is an exploded view of a razor of FIG. 7A.

As shown in the illustrated embodiment of FIGS. 4-6, skin interconnect member 22 is configured to pivot about axis A1 as described in FIGS. 1F-1H. Alternate embodiments can be configured to pivot about both axes A1 and A2 in a manner similar to the preceding thermal benefit razor. Alternate embodiments can be configured to rotate about any combination of axes A1, A2, A3, A4, and A5 using either virtual pivots or bearings that lie directly along the axes.

The embodiments in FIGS. 1-6 show that the handle 12 can be configured to comprise of a main body 16 and a skin interconnect member 22. As shown in FIG. 6, the main body 16 and the skin interconnect member 22 may be connected by multiple components including arms 24, bearings 30, springs (not shown), circuits, wires, and tubes 27. When the skin interconnect member 22 pivots relative to the main body 16, these connecting components may be configured to be flexible.

Referring now to FIGS. 7A-7B and 8A-8B respectively, an embodiment of a razor handle which provides a benefit to the user by delivering fluids or waxes close to the skin and an embodiment of a razor handle which provides a heat or cooling benefit is described in more detail. It should be noted that many of the components described in relation to the razor 10 providing a benefit from delivering fluids or waxes to the skin can also be incorporated into a razor 10 providing for heating and cooling to the skin, as they relate to the handle 12, the handle main section 21, the handle transition section 23, and the skin interconnect member 22 pivoting about axis A1, described herein, including their structural features, their connection features, their product safety and integrity features, their manufacturing, their pivot motions, the spring mechanisms that urge the pivots into a rest position and limit the range of motion, and the shape of the pivoting handle head.

In FIGS. 7A-7B and 8A-8B, the handle 12 can comprise a main body 16 that can include a main frame 18 and a secondary frame 20. The main body 16 including its component main frame 18, an upper secondary frame 19, and lower secondary frame 20 members can comprise durable materials such as metal, cast metal, plastic, impact-resistant plastic, and composite materials.

The main frame 18 can be made of metal and can provide a significant portion of the structural integrity of the handle. Preferably, the component main frame is made from a light, stiff (high elastic modulus) and impact resistance material to minimize its volume and maximize volume for other components while still providing product integrity and safety. In an embodiment the frame 18 is made of zinc. In an embodiment the main frame 18 is made of die-cast zinc. Die-cast zinc materials include ZAMACK3, ZAMACK5, and ZA8. Other suitable materials include glass fiber reinforced plastics such as IXEF, stainless steel, aluminum, aluminum diecast, and magnesium diecast. The secondary frame 20 can be made of a plastic material and can overlie most of the main frame 18 and provide for a significant portion of the size and comfort of the handle 12.

As shown in FIGS. 7A-7B and 8A-8B, the handle 12 can also comprise one or more movable elements of a movable member assembly 44*a* mounted on the frame 18 that serve as a cartridge eject mechanism. To enhance product integrity and safety of both the handle and the cartridge during accidental drops, this cartridge eject mechanism is designed to move in more than one direction from an initial rest position. Preferentially, this movement type is a linear motion along an axis A2 or A3 towards the razor cartridge to eject the cartridge and a linear motion along the same axis away from the cartridge to mitigate damage and absorb energy during an accidental drop.

Continuing to refer to FIGS. 7A-7B and 8A-8B, a skin interconnect member 22 can be connected to the main body 16 by one or more arms 24. Skin interconnect member 22 can pivot about an axis of rotation A4 that is defined by the connection of the skin interconnect member 22 to pins 30 disposed at distal portions of arms 24. Blade cartridge unit 15 attaches to the skin interconnect member 22 such that the blade cartridge unit 15 can pivot on handle 12 to provide more skin contact area on the skin of a user during shaving.

A benefit delivery system may be disposed above, below or through the frame. As shown for instance in FIGS. 7B and 8B the benefit delivery systems 72, 201, and 14, 301 respectively are disposed in sections below the rigid member or frame 18. Advantageously, the benefit delivery system is disposed between the rigid member and the secondary frame. The secondary frame can be mounted to the frame.

The skin interconnect member 22 can have a shape beneficially conducive to both attaching to the blade cartridge unit 15 and facilitating the delivery of a skin comfort benefit from the handle 12 to and through the blade cartridge unit 15 attached to the handle 12.

The shape of the skin interconnect member 22 can alternatively be described as a "funnel," or as "tapered," or a "trapezoidal prism-shaped." As understood from the description herein, the description "trapezoidal prism" is general with respect to an overall visual impression the skin interconnect member. For example, a schematic representation of a trapezoidal prism-shaped element is shown and described in more detail below with respect to FIG. 25.

The description "trapezoidal prism" is used herein as the best description for the overall visual appearance of the skin interconnect member 22, but the description does not imply any particular geometric or dimensional requirements beyond what is described herein. That is, the skin interconnect member 22 need not have complete edges or surfaces. Further, edges need not be unbroken and straight, and sides need not be unbroken and flat.

The skin interconnect member 22 can have a shape beneficially conducive to both attaching to the blade cartridge unit 15 and facilitating the delivery of a skin comfort benefit from the handle 12 to and through the blade cartridge unit 15 attached to the handle 12.

Figure 9A:
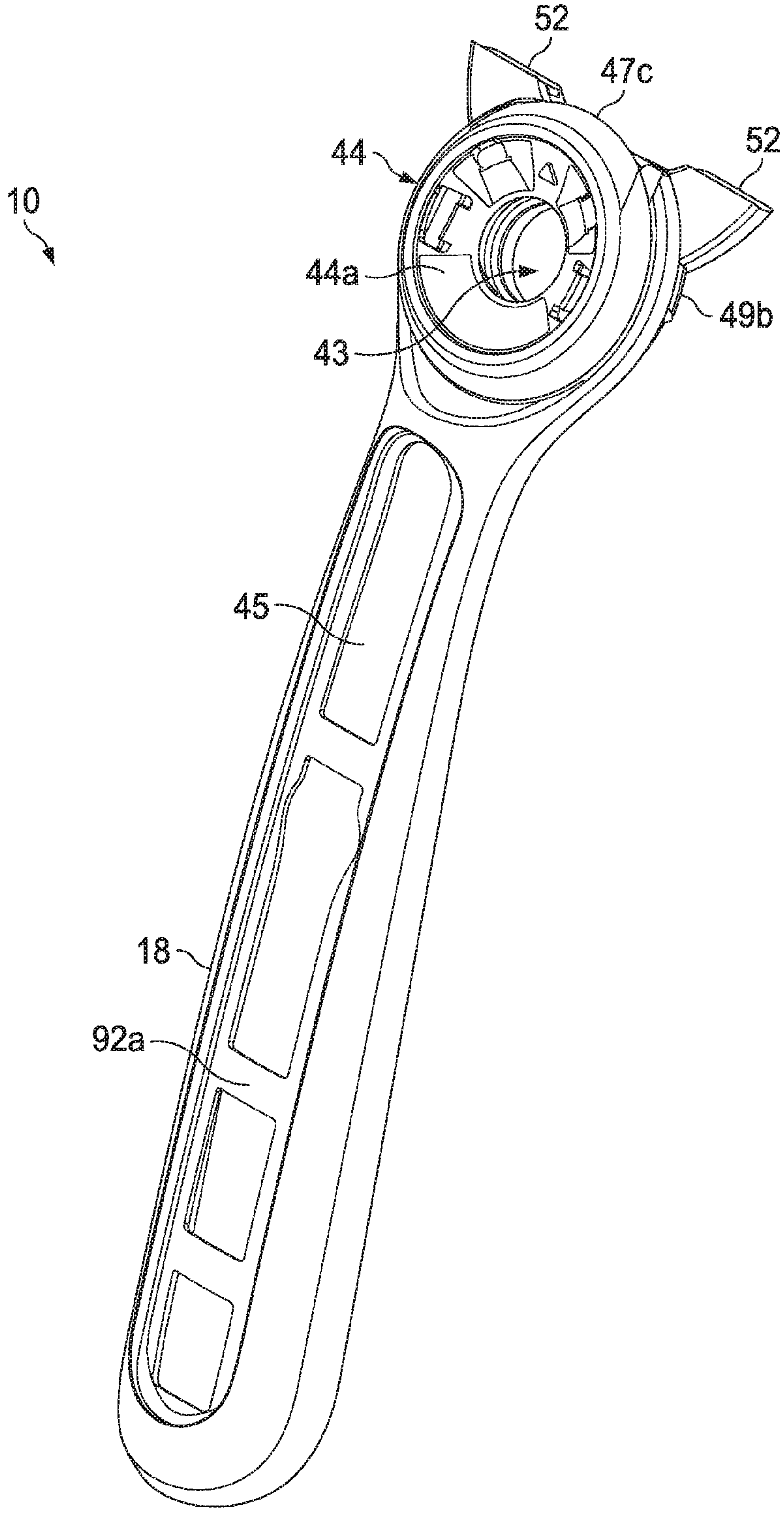
FIG. 9A is a perspective top view of a portion of a frame of a handle according to an embodiment of the invention.
Figure 9B:
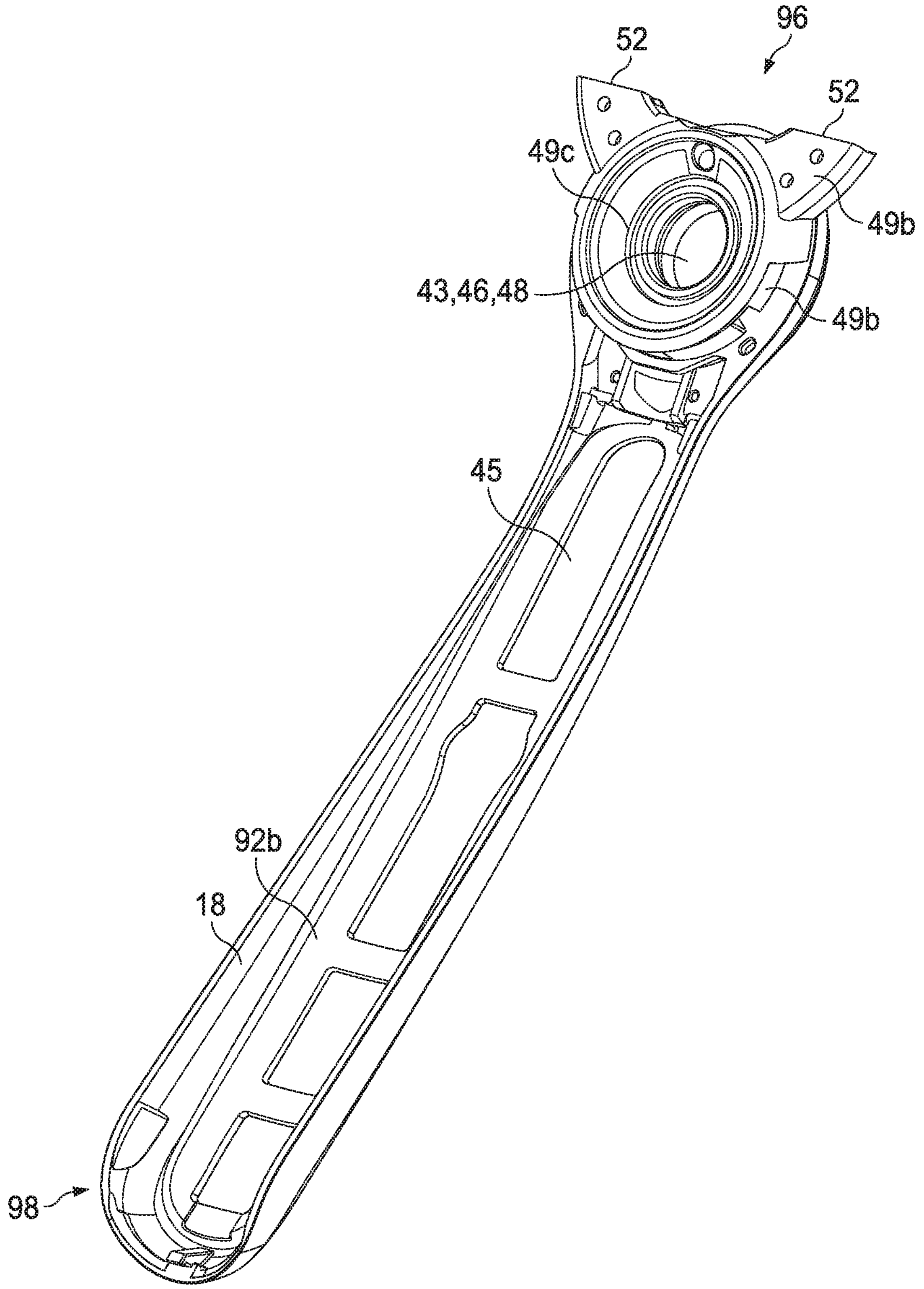
FIG. 9B is a perspective bottom view of FIG. 9A.

As shown in FIGS. 9A-9B, a frame 18 and a fully assembled movable member assembly 44 operably coupled thereto are shown.

Various elements such as the grip members 39 and other features are removed from the frame and/or handle, showing the frame 18 as a skeleton-like structure upon which the movable member assembly 44 is disposed.

The frame desirably provides a base upon which other elements of a razor may be disposed. The frame may be located substantially in the center of the handle 12. As shown in the figures herein, ergonomic elements such as grip portions 39, protrusions or buttons, and benefit-dispensing structures such as electronics, fluids, thermal elements, and the like, may all be disposed on any side of the frame or within the frame 18 or within the handle transition section 23.

The movable member assembly 44 is configured to have a rotational movement about an axis of rotation A4 that is substantially perpendicular to the axis of rotation A1 and substantially perpendicular to a longitudinal axes A2 or A3 of the razor 10. The movable member assembly 44 or a portion thereof may be configured to have a linear motion substantially parallel to the longitudinal or linear axes of movement A2 or A3 that are substantially parallel to the frame 18. Linear axis of movement A3 is substantially parallel to the handle transition section 23 and linear axis of movement A2 is substantially parallel to the handle main section 21.

When the blade cartridge unit 15 is attached to the handle 12, the blade cartridge unit 15 is configured to rotate about multiple axes of rotation, for example, a first axis of rotation A1 and a second axis of rotation A4.

The movable member assembly 44 is configured to move in a first movement type and/or a second movement type. A first movement type of the present invention comprises a rotational movement and a second movement type comprises a non-rotational or linear movement. Preferably, the rotational movement is about an axis of rotation A4 or axis of rotation A1 or both (as shown in FIGS. 1F-1H), that is substantially perpendicular to the frame 18 and the linear movement is along axes of movement A2 or A3 (as shown in FIGS. 1F-1H) that is along a substantially straight or linear path which is substantially parallel to the frame 18.

The frame 18 may be of any suitable size, shape, or configuration. Though shown as being a part of the razor handle, the frame of the present invention may or may not be part of the razor handle. If the frame 18 is part of the razor handle as shown for instance in FIG. 1B, the frame 18 can desirably comprise a longitudinal member. If the frame 18 is part of the handle transition section 23, the frame 18 can comprise a member of any shape. If the frame 18 is a part of a razor cartridge or other component (not shown), the frame may or may not be longitudinal. The frame preferably comprises a rigid member and is preferably made of hard metal. The movable member assembly is substantially comprised of plastic though some elements (e.g., spring members) may be comprised of metal such as steel or stainless steel.

Figure 9C:
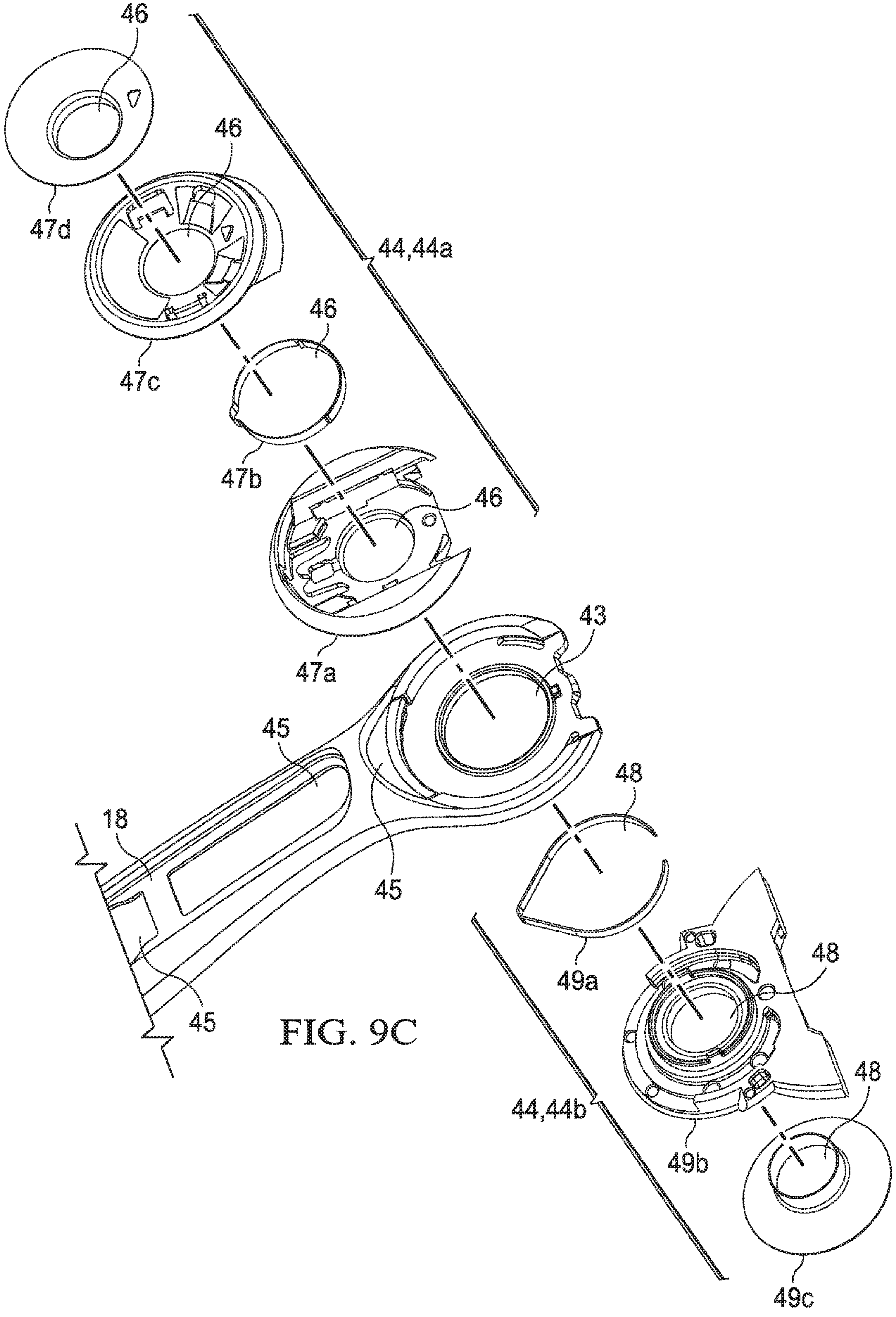
FIG. 9C is an exploded view of FIG. 9A.

In FIGS. 9A to 9C, it is noted that the frame has an upper side 92*a* and a lower side 92*b*, a proximal end 96 and a distal end 98. Frame 18 is disposed in a novel manner such that it extends between the movable member assembly 44 as will be described in more detail below. In a preferred embodiment, upper and lower portions of the movable member assembly are coupled to each other and within the frame.

FIG. 9A depicts a front perspective view showing the frame 18, frame upper side 92*a*, and the upper portion 44*a* (also referred to herein as a first member) of the movable member assembly 44 along with arm portions 52 of the second lower element 49*b*.

FIG. 9B depicts a rear perspective view showing the frame 18, the frame lower side 92*b* and the lower portion 44*b* (also referred to herein as a second member) of the movable member assembly 44 along with second and third lower elements, 49*a* and 49*b*, respectively, along with arm portions 52 of the second lower element 49*b*.

The frame 18 also comprises a frame location feature 43. The rigid member or frame location feature 43 of the present invention preferably comprises an aperture, though a slot or other feasible structure or configuration or combination thereof is contemplated.

Aperture 43 shown in FIG. 9C is disposed at a proximal end 96 of the frame 18 and serves as the location feature whose function will be described in further detail below. The aperture 43 desirably comprises a circular shape, though any shape is contemplated in the present invention. Accordingly, the aperture shape provides an aesthetic or design element in addition to its utility. Further, though other apertures 45 are present in the frame 18, the present invention describes the frame location feature aperture 43 towards the proximal end 96.

In FIG. 9C, the frame 18 and the movable member assembly 44 are splayed out or disassembled for purposes of showing various components and their arrangement together. The movable member assembly 44 comprises an upper portion (44*a*) and a lower portion (44*b*). Upper and lower portions may be an integral unit or they may be two or more units that are coupled together. An upper portion 44*a* of the movable member assembly 44 is substantially disposed on the upper side 92*a* of the frame and a lower portion 44*b* of the movable member assembly 44 is substantially disposed on the lower side 92*b*.

The upper portion 44*a* of the movable member assembly 44 may move in both a first movement type and a second movement type. In a second movement type (e.g., non-rotational, linear), the upper portion may be comprised of a button such as an eject button which serves to remove the blade cartridge unit 15 from the handle 12 when pushed.

In one embodiment, an upper portion 44*a* comprises a first upper element 47*a*, second upper element 47*b*, a third upper element 47*c* and a fourth upper element 47*d*, all of which are operably coupled to each other. The upper portion 44*a* may be comprised of more or fewer elements and may be of any suitable size, shape or configuration in accordance with the present invention.

Additionally, or alternatively the upper portion 44*a* includes upper portion location features 46 in one or more of each upper element, and preferably in each upper element where these features are all apertures, and more preferably these apertures are substantially similar to the rigid member location feature 43, and most preferably substantially circular shaped, though any feasible configuration of location features and shapes are contemplated.

The first upper element 47*a* functions as a base structure for the upper portion 44*a*. It preferably includes rails, tracks and/or projections. Desirably it is coupled to one or more of the upper elements such as the second and third upper elements but also one or more of the lower elements as will be described below. In one embodiment, the first upper element 47*a* is comprised of a material that is less expensive and more flexible to design with enabling more intricate features (e.g., snap fits, bearing surfaces, etc.) in smaller volumes than would be possible if a rigid member were used by itself without such an interface. Plastics or other flexible materials are contemplated in the present invention for any elements that are most proximal or contacting a metal rigid member. For instance, first upper element 47*a* can be made of plastic while the rigid member is made of die-cast zinc material.

The second upper element 47*b* is preferably a spring member disposed in between a first and third upper element 47*c*. The spring member is desirably disposed within one or both first and third upper elements. As shown, the spring member can be a loop or generally circular shape. This spring assists in providing a first or second movement type. Preferably, element 47*b* provides a second movement type (e.g., linear).

The spring member of the present invention can be attached to the frame or rigid member to provide for motion of the upper portion, lower portion, or a combination thereof.

A spring member can have points of attachment between any elements within the movable assembly 44—i.e. any elements of the upper portion, any element of the lower portion, and any combination thereof. At least one connection of the spring member is desirably connected to either the frame 18, the first upper element 47*a*, or the first lower element 49*a*. Connection to the rigid frame can provide a simpler design in smaller volumes while connection to the either the first upper element or the first lower can provide flexibility in design by allowing construction of complex mechanisms in less room and at less cost than mounting them directly onto the frame 18.

A connection of the spring member directly to the frame 18 can provide smoother motions and a less complex design when the upper portion 44*a* and the lower portion 44*b* are connected and move together relative to the frame 18. A preload of the spring member can be used to provide a better consumer experience by preventing the upper portion 44*a* and the lower portion 44*b* from rattling within the handle 12 and by either pushing either the upper portion, lower portion, or combination thereof against a bearing surface on the rigid member or by maintaining a clearance between the rigid member and the upper portion and lower portion.

The third upper element 47*c* is preferably an eject button which desirably, coupled with one or both of the second upper element 47*b* (e.g., spring member) and the first upper element 47*a* (e.g., base structure), desirably provides a second movement or a linear movement in a forward path along axes A2 or A3 (as shown in FIGS. 1F-1H) to eject or separate the blade cartridge unit (e.g., unit 15 in FIGS. 1F-1H) from the razor handle. A fourth upper element 47*d* comprises an outermost upper element, and may be a dome shaped feature. The fourth upper element 47*d* generally provides a finger pad area for comfortable placement of a user's finger for use with third upper element (e.g., eject button) 47*c*, along with an aesthetic outer décor enhancement. The fourth upper element may be a dome shape.

The lower portion 44*b* comprises a first lower element 49*a*, a second lower element 49*b*, and a third lower element 49*c*. The lower portion 44*b* may be comprised of more or fewer elements and may be of any suitable size, shape or configuration.

Additionally, or alternatively, the lower portion 44*b* includes lower portion location features 48 in one or more of each lower element, and preferably in each lower element where these features are all apertures, and more preferably these apertures are substantially similar to the rigid member location feature 43 and/or the upper portion location features 46 and most preferably substantially circularly shaped, though any feasible configuration of location features and shapes are contemplated.

First lower element 49*a* of the lower portion 44*b* is preferably comprised of a spring member which is disposed in between a lower side of said frame or a lower side of said first upper portion 47*a* and second lower element 49*b*. The spring member is desirably disposed on the underside 92*b* of the upper frame 18*a* and/or within any of the elements disposed on a lower side of said frame, such as the second lower element 49*b* but also may be disposed on the lower side of said first upper element 47*a* (not shown). As depicted, the spring member is comprised of a loop, V-shape, or a generally circular shape.

Second lower element 49*b* of the lower portion 44*b* is preferably comprised of a bottom base structure having tracks, rails, and/or projections and a pair of arms 52. The pair of arms are preferably connected to an interconnect member for connection to a blade cartridge unit or directly to a blade cartridge unit. When coupled with spring member of first lower element 49*a*, the arrangement assists in providing a first or second movement type, preferably, a first movement type (e.g., rotational). This first movement type allows the blade cartridge unit 15, when connected to the handle 12, to move or pivot in a rotational or side-to-side manner along axis of rotation A4.

Third lower element 49*c* comprises an outermost lower element, and may be a dome shaped feature similar to fourth upper element 47*d*. The third lower element 49*c* generally provides a bottom finger pad area for comfortable placement of a user's finger along with an aesthetic outer décor enhancement.

Figure 9D:
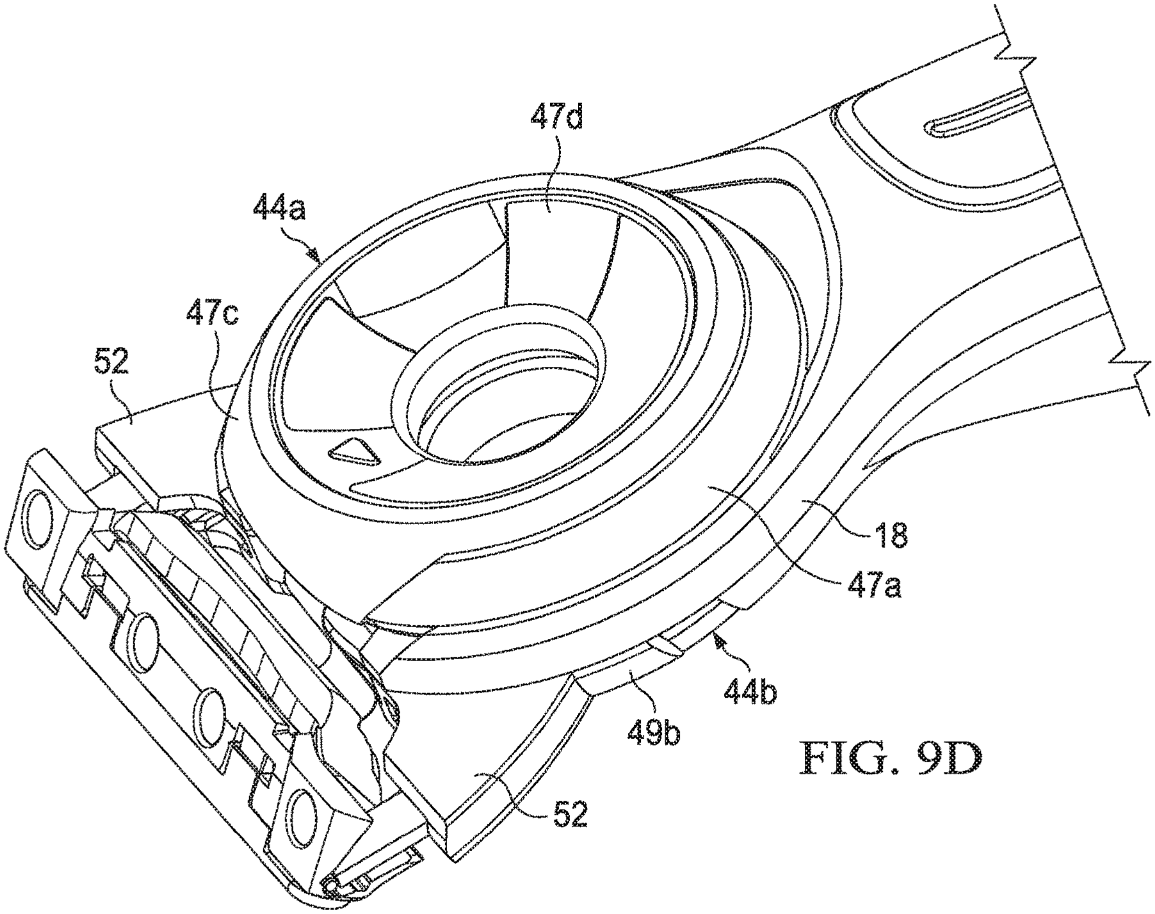
FIG. 9D is a close-up side view of a portion of the proximal end of a handle of the present invention.

FIG. 9D is a close-up side view showing the frame 18 disposed in between the movable member upper and lower portions. Upper portion 44*a* is shown having dome 47*d* and eject button 47*c* disposed on first upper element or a top pod 47*a*. First lower element 49*a* and second upper element 47*b* (e.g., spring members) are not shown but are disposed within lower and upper portions respectively. Second lower element 49*b* is disposed below the frame 18.

Figure 9E:
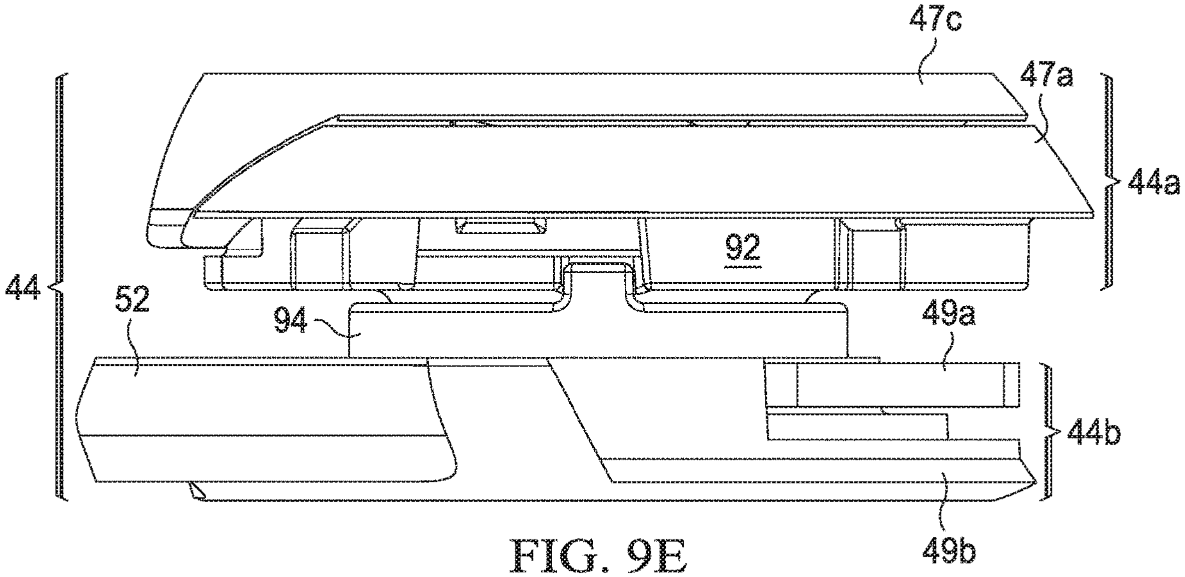
FIG. 9E is a close-up side view of a portion of the proximal end of a handle of the present invention.

FIG. 9E is a close-up perspective view of the movable member assembly 44 just prior to being coupled together. All the elements of the upper portion 44*a* and lower portion 44*b* of the movable member assembly 44 are depicted without the frame 18. The elements as they would be attached within the frame are shown clearly.

It should be noted that the bottom part 92 of first upper element 47*a* and the top part 94 of the second lower element 49*b* are generally encompassed or covered by a frame 18 towards proximal end 96 of the frame 18 as shown in FIG. 7.

Figure 9F:
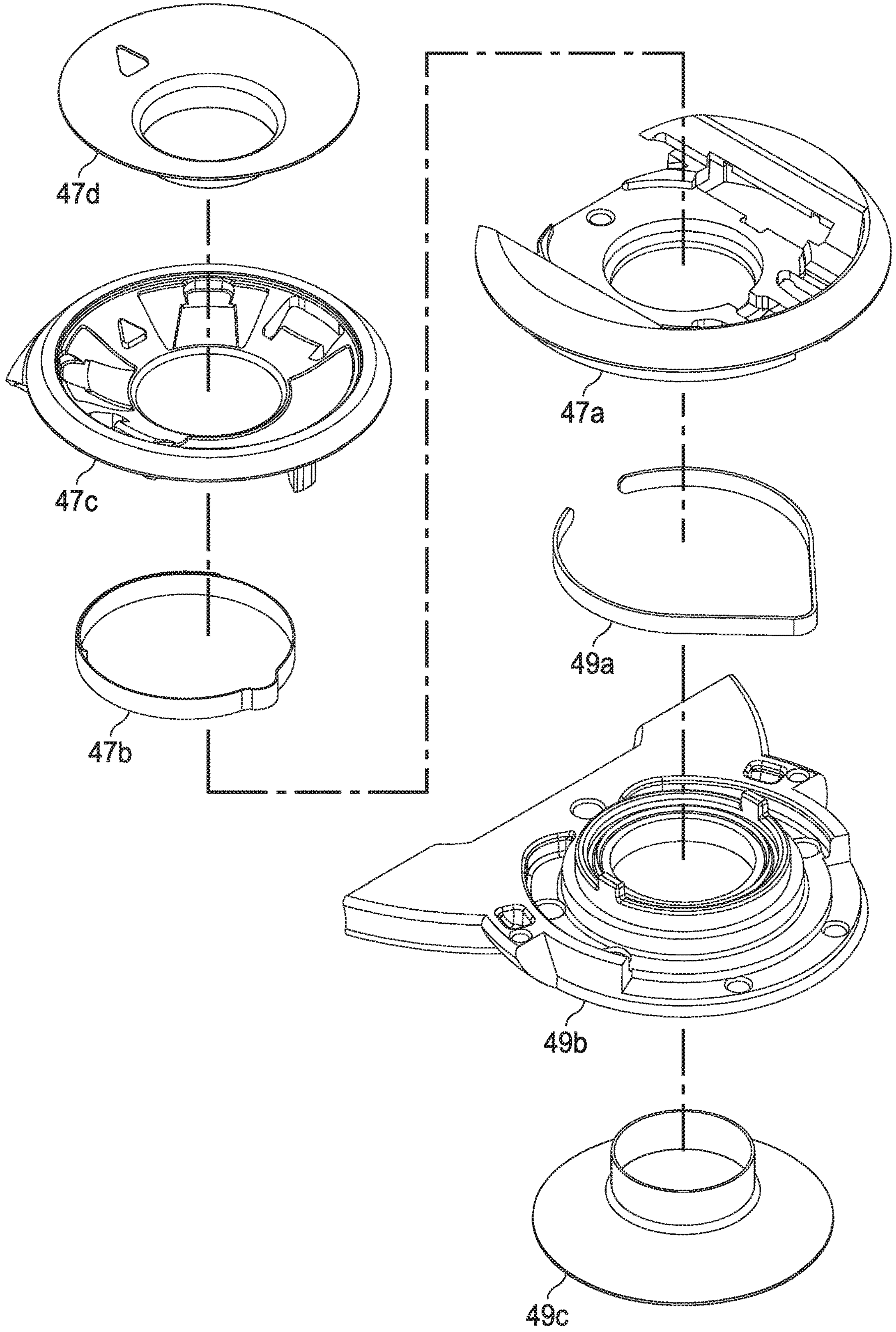
FIG. 9F is an exploded view of an embodiment of a movable member assembly of the present invention.

FIG. 9F is a close-up exploded side view of the movable member assembly 44 without the frame 18. The upper portion 44*a* is shown just as it would be coupled to the lower portion 44*b*. Lower portion 44*b* is shown having a first lower element 49*a*, second lower element 49*b* and arms 52 and upper portion 44*a* is shown having first upper element 47*a* and third upper element 47*b*. Second upper element 47*b* (e.g., spring member) and fourth upper element (e.g., outer dome) are not shown in this view but are disposed within the upper portion 44*a*.

Figure 10:
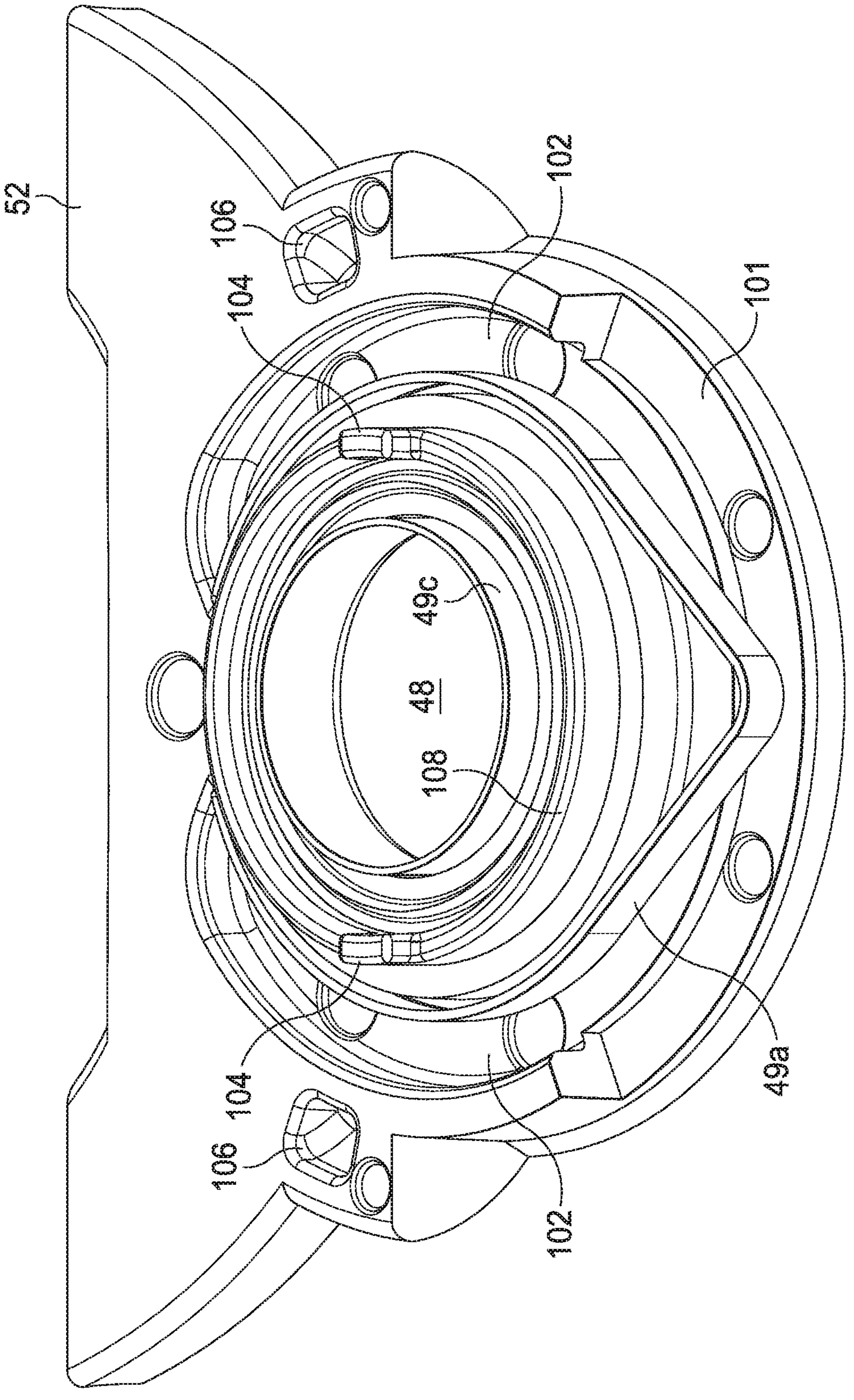
FIG. 10 depicts lower elements of the movable member assembly of FIG. 9F.

FIG. 10 shows a top view 100 of the upper surface 101 of the second lower element 49*b*. As shown, the upper surface 101 of the second lower element 49*b* comprises one or more tracks 102, projections 104, recesses 106, and rims 108. A first lower element 49*a*, which comprises a loop shaped spring member, is shown partially disposed within a pair of curved tracks 102 of second lower element 49*b*. Third lower element 49*c* is partly shown at the outer surface of the aperture 48.

Figure 11A:
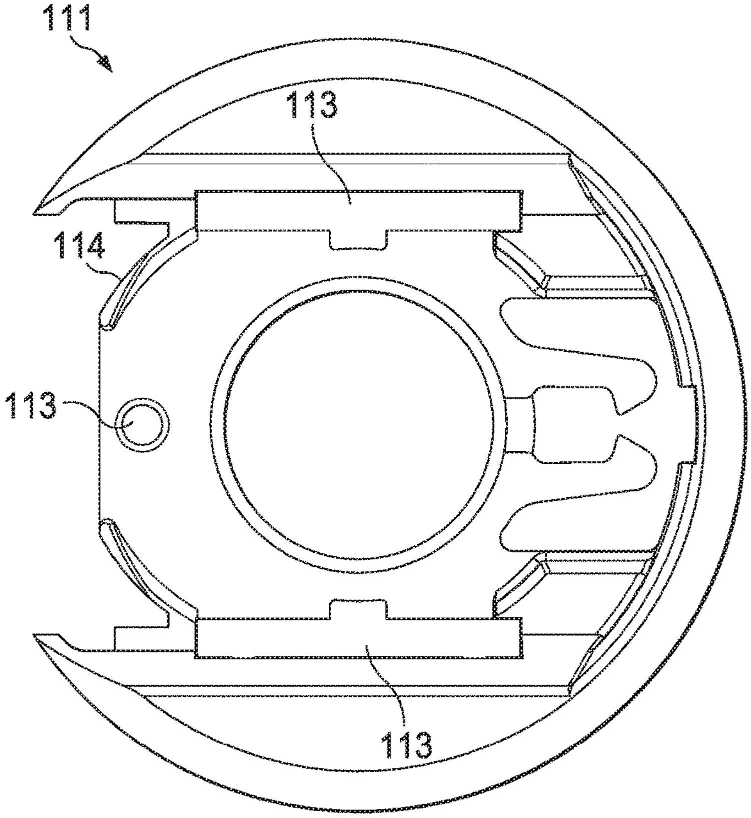
FIGS. 11A-11B depict an upper element of the movable member assembly of FIG. 9F.
Figure 11B:
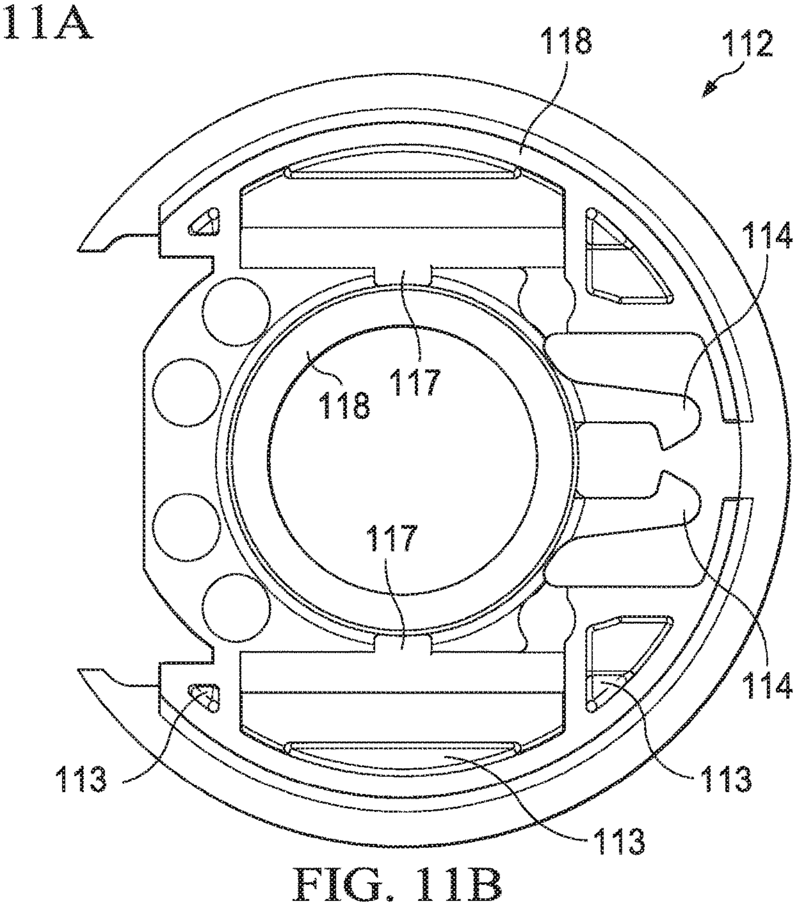

FIGS. 11A and 11B depict upper and lower surfaces 111 and 112, respectively, of first upper element 47*a* which is comprised of a base structure. These surfaces are comprised of one or more tracks 113, projections 114, recesses 116, notches 117, and rims 118.

Desirably, the upper and lower portions 44*a* and 44*b*, respectively, are coupled to each other. The engagement of the upper and lower portions may be achieved by mechanical engagement such as a snap-fit engagement, chemical engagement such as adhesive or glue, frictional engagement such as welding comprising ultrasonic welding such as energy director or pinch-off welding, or torsional, spin, laser or hot-plate (e.g., mirror-imaged) type welding, or by any other feasible manner or any combination of the foregoing, thereof.

Figure 12:
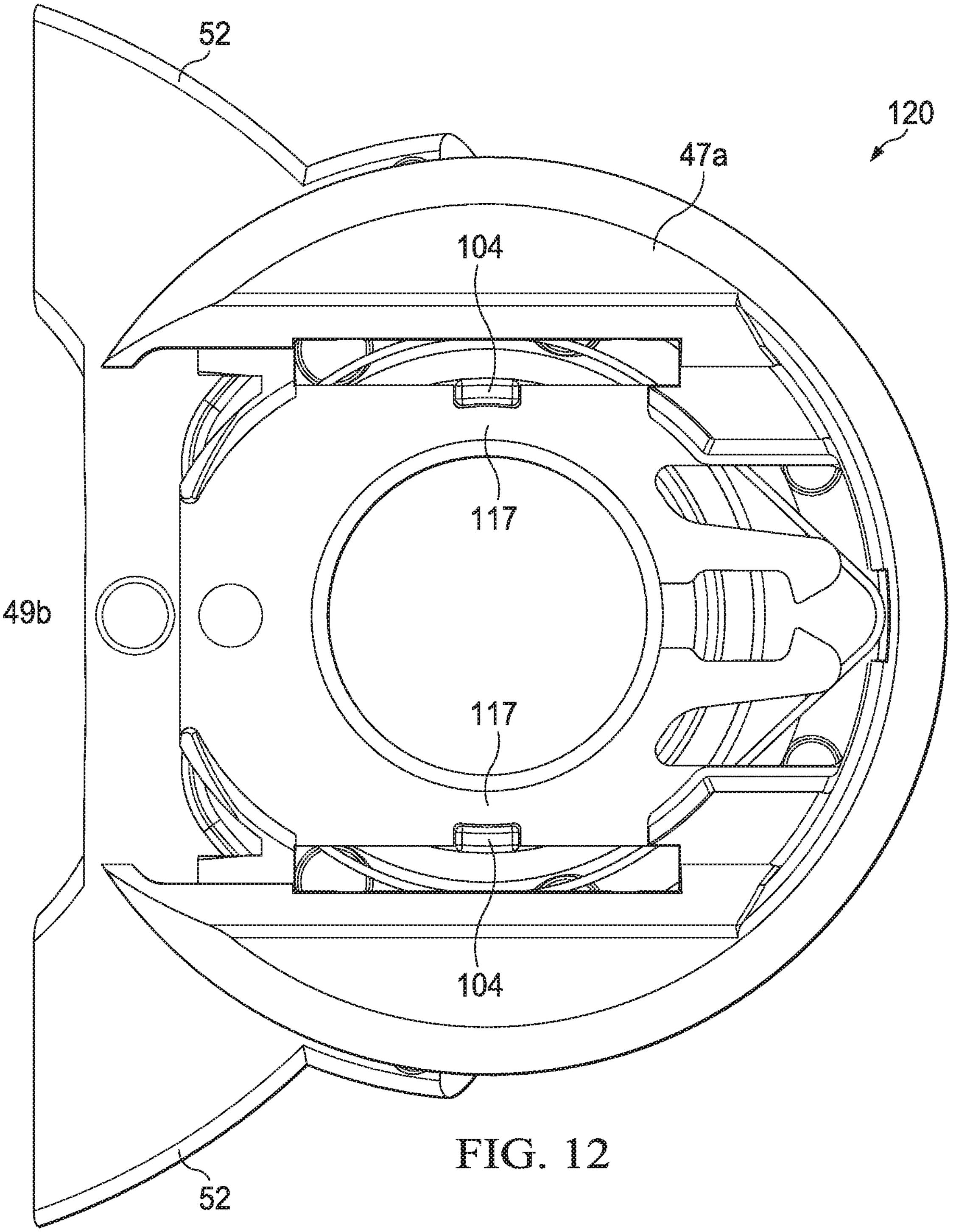
FIG. 12 depicts a portion of the movable member assembly of the present invention.

In one embodiment of the present invention, the coupling is preferably achieved by engaging one or more features of the lower surface of first upper element 47*a* with one or more features of the upper surface of the second lower element 49*b*. For instance, projections 104 on upper surface 101 of the second lower element 49*b* desirably engage with recesses or notches in the lower surface 112 of first upper element 47*a* as shown in a top view of a coupled arrangement 120 of second lower element 49*b* engaged with first upper element 47*a* in FIG. 12. Additionally, or alternately, a preferred embodiment of the present invention comprises welding, more preferably ultrasonic welding, and most preferably pinch off type ultrasonic welding.

The area of engagement (e.g., a welding area or a mechanical engagement area) can be located on external surfaces of upper and lower elements, can be located internal to the elements (as shown in FIG. 18 below), or can be a combination. In one embodiment, the area of engagement is not in contact with the frame 18. By not being in contact with the frame, the portions of the movable member assembly can move independently of the frame.

Once upper and lower portions are engaged and secured to each other, the movable member assembly 44 can substantially function as an integral unit.

In the present invention, a single component, such as the upper portion 44*a* or the lower portion 44*b* serves multiple functions. For instance, the lower portion 44*b* facilitates an axis of rotation in a razor handle, namely an axis of rotation substantially perpendicular to one or more blades when a razor is assembled and substantially perpendicular to a frame of a handle. When rotated from an at rest position, the lower portion 44*b* and for instance, the second lower element 49*b* can generate a return torque to return to the rest position by way of the spring member 49*a*, such shown as a loop shaped spring but may comprise a cantilever spring or a leaf spring. The return torque is generated by the spring member of the second lower element 49*b*. Additionally, the upper portion 44*a* also serves as a carrier for an ejector button assembly and may also serve as a carrier for other components of a razor such as a docking structure (not shown), and/or a blade cartridge unit (e.g., via the docking structure). In this embodiment, the first lower element 49*a* (the spring member), can be attached to the frame 18 providing optimal motion and clearances for the assembly.

In an alternate embodiment, the movable member assembly 44 is unitary and, optionally, formed from a single material.

Figure 13A:
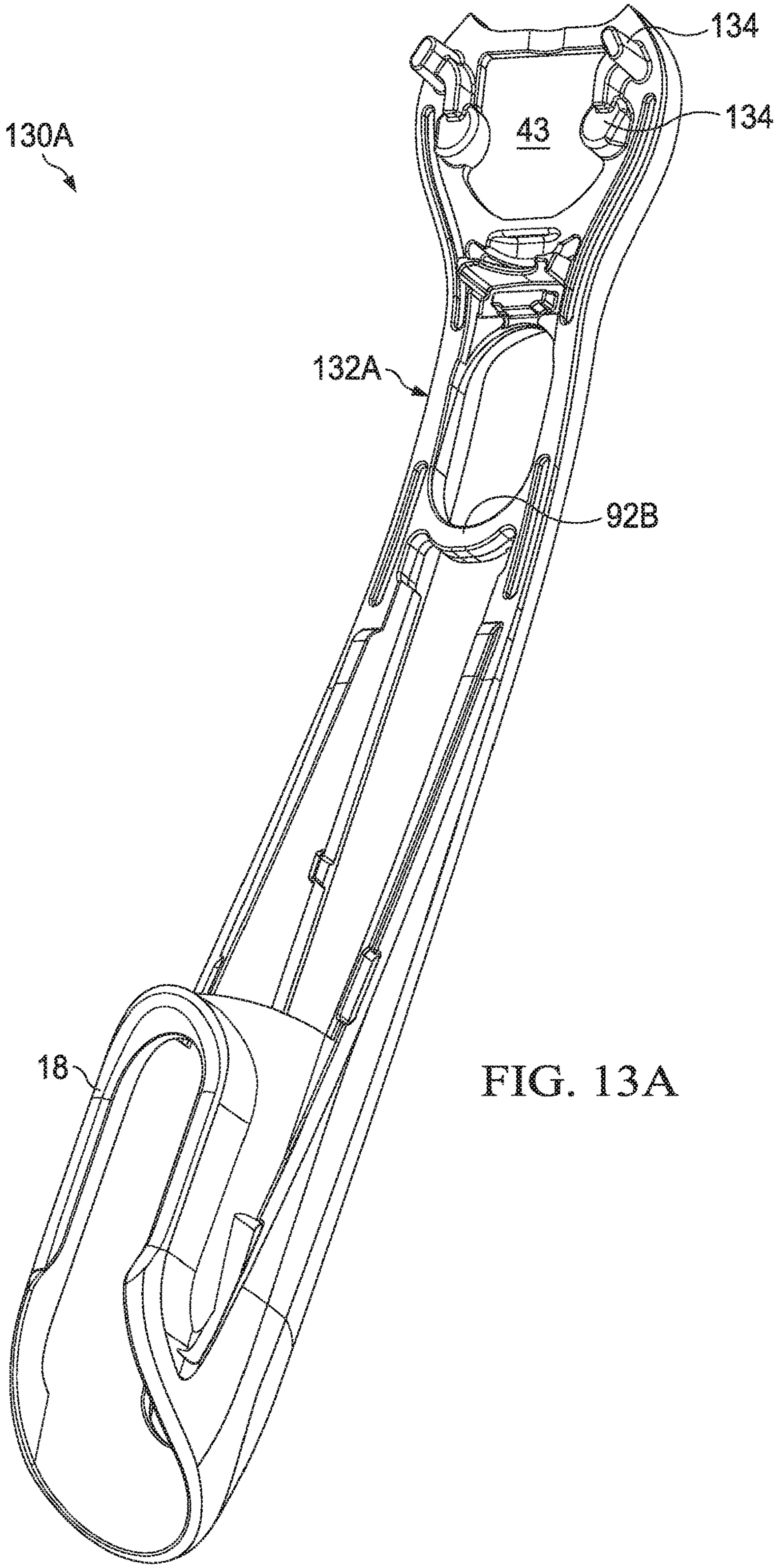
FIGS. 13A-13B depicts schematic views of embodiments of a frame of the present invention.
Figure 13B:
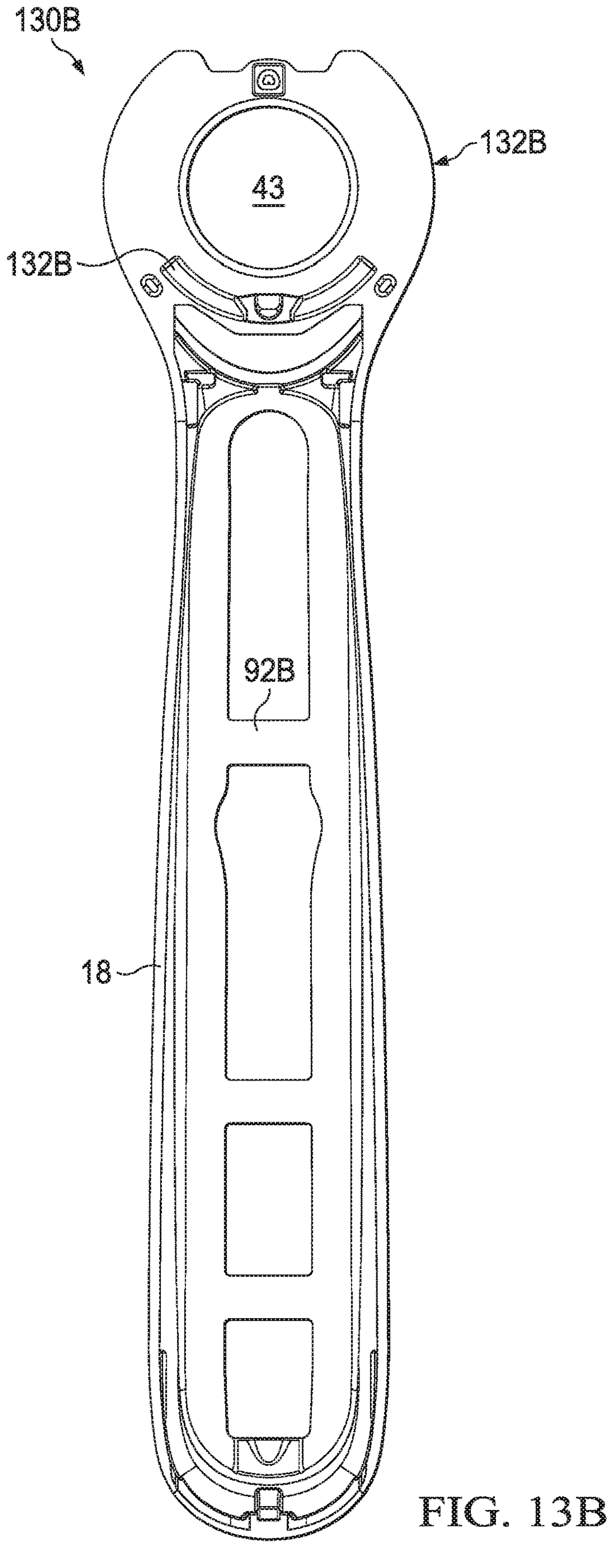

In FIGS. 13A and 13B, location features of two embodiments 130*a* and 130*b* of frame 18 of the present invention are shown. In embodiment 130*a*, a frame 18 comprises a rigid member platform 132*a* corresponding to the views shown in FIGS. 7A, 7B. In embodiment 130*a*, bottom side 92*b* of frame 18 comprises a rigid member platform 132*a* in the handle transition section 23. The location feature of rigid member or frame 18 is an opening 43 in the rigid member platform 132. Protrusions 134 are disposed in the rigid member platform 132. The protrusions can engage with other features such as arms 24 which can be made of metal. Protrusions 134 of frame 130*a* can be used to attach a secondary frame 20 to the frame 18.

As noted, the frame 18 of the present invention can be comprised of die-cast zinc such as ZAMACK3, ZAMACK5, and ZA8. Other suitable materials include glass fiber reinforced plastics such as IXEF 1032, stainless steel, aluminum, aluminum diecast, and magnesium diecast.

Arms 24 of the present invention are shown in FIGS. 6, 7A, 7B, 8A, 8B, and 16. With a rigid member or frame 18 made of hard metal such die-cast zinc having features which are coupled with hard metal arms (e.g., stainless steel), a robust product can be made especially for a heavy handle and damage can be mitigated in case of accidental drops.

Figure 8A:
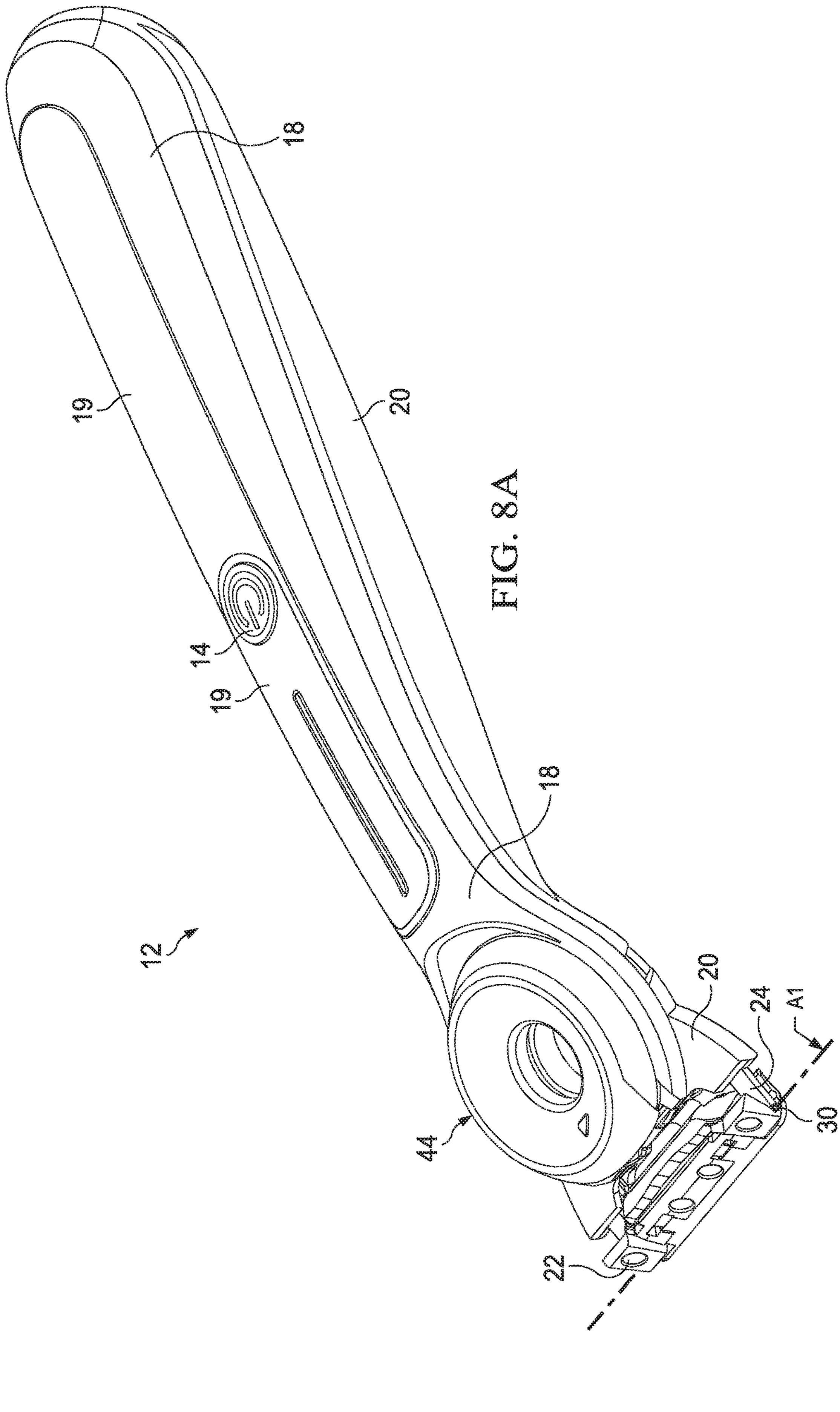
FIG. 8A is a perspective top view of an embodiment of a handle of the present invention.
Figure 8B:
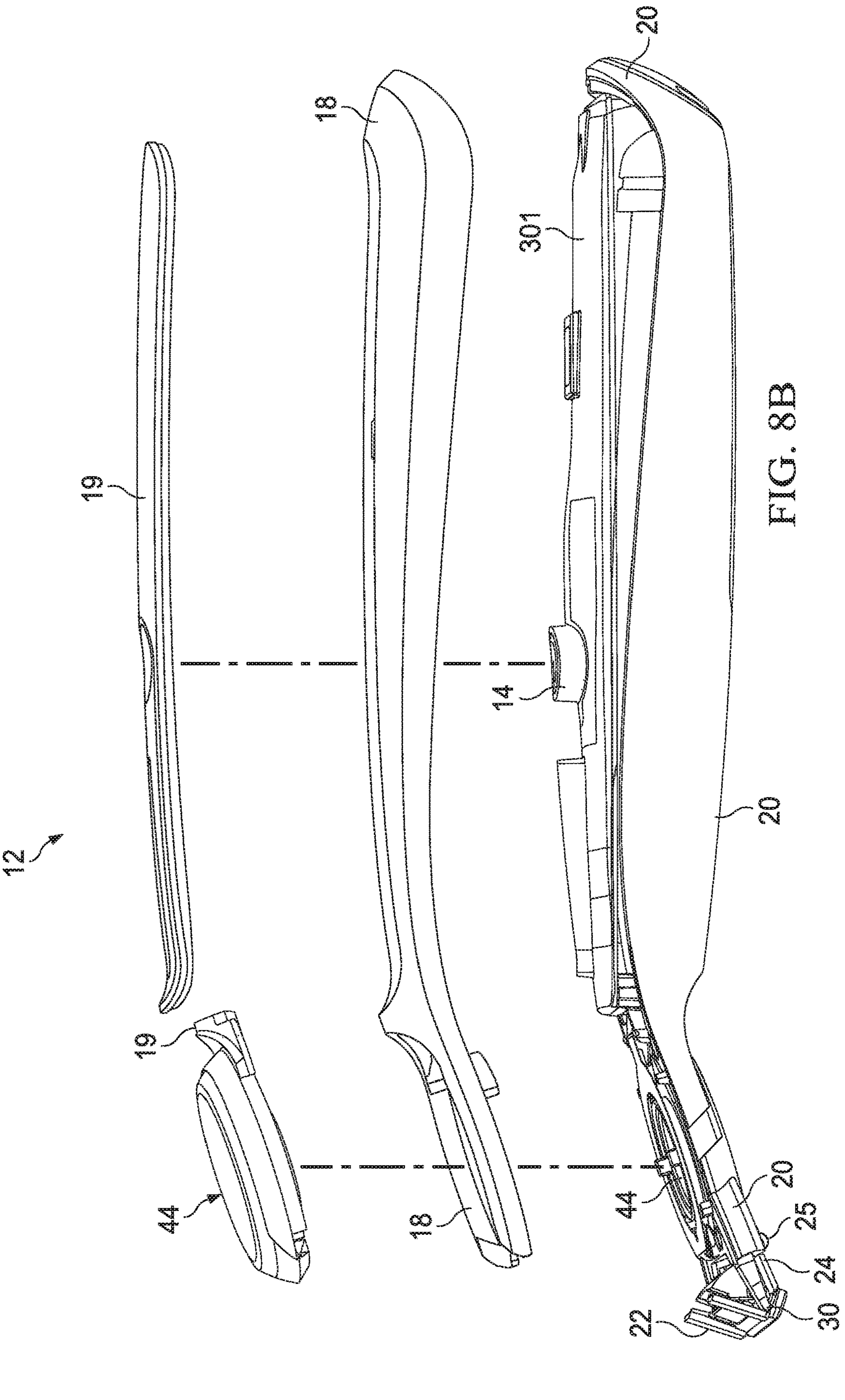
FIG. 8B is an exploded view of a razor of FIG. 8A.

In embodiment 130*b*, a frame 18 comprises a rigid member platform 132*b* corresponding to the views shown in FIGS. 8A, 8B. In embodiment 130*b*, bottom side 92*b* of frame 18 comprises a rigid member platform 132*b* in the handle transition section 23. The location feature of rigid member or frame 18 is an opening 43 in the rigid member platform 132. Protrusions 134 are disposed in the rigid member platform 132. Protrusions 134 of frame 130A can attach to a secondary frame 20 or components such as circuits or benefit delivery systems. FIG. 15A-G shows close-up views of the rigid member platforms 132*a* and 132*b*.

In FIGS. 14-15, perspective and cross-sectional views of the rigid member platforms 132*a* and 132*b* of frame 130*a* and 130*b*, respectively, of FIG. 13 showing the thickness and width of the rigid member platform of the present invention is depicted.

Figure 14A:
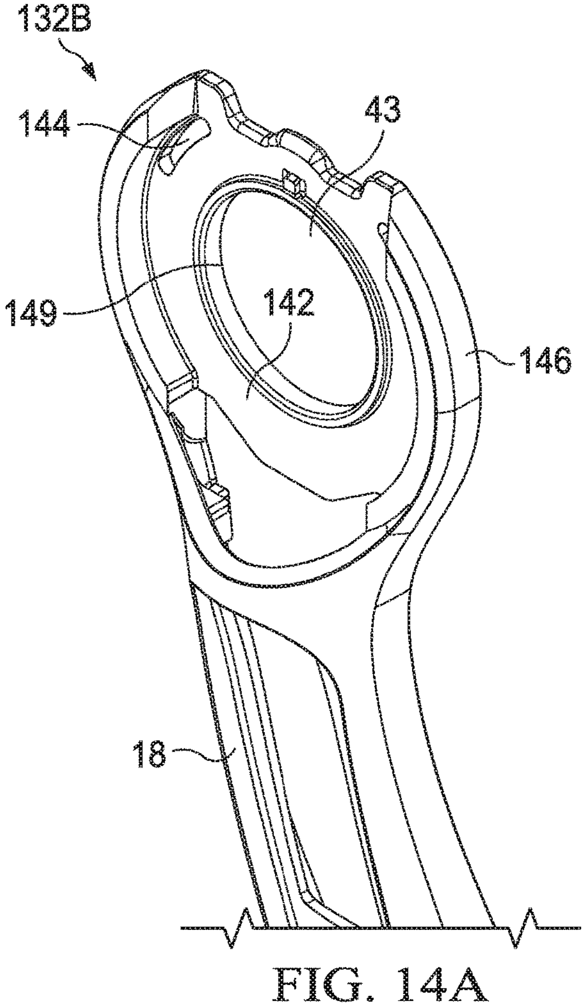
FIGS. 14A-14F depicts schematic views of an embodiment of a rigid member platform of FIGS. 7A and 7B.
Figure 14B:
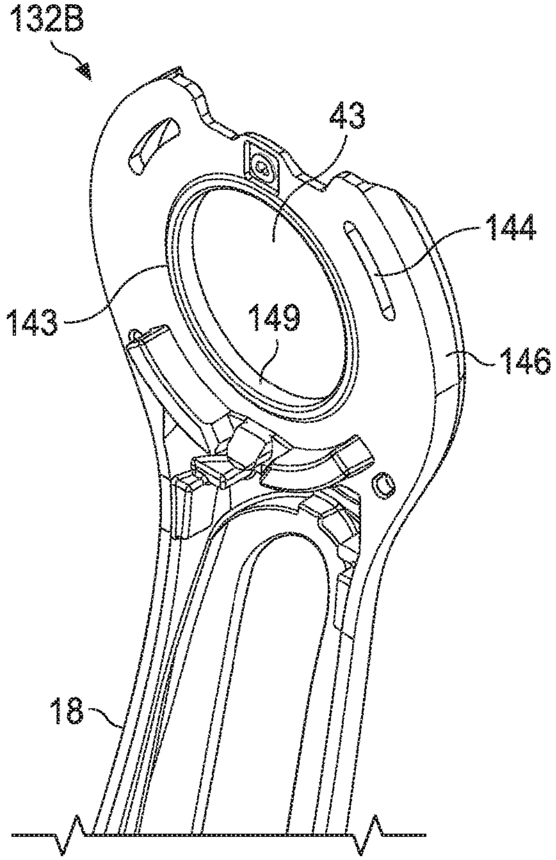
Figure 14C:
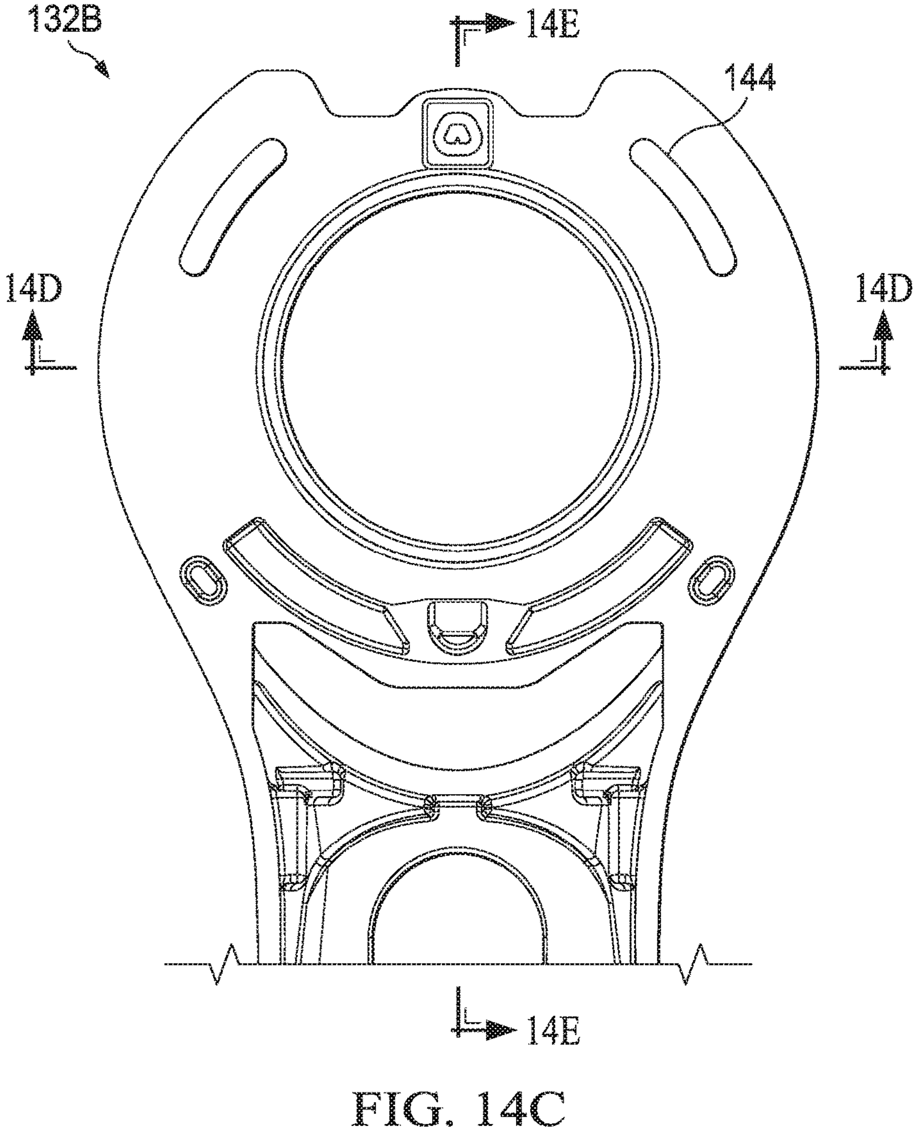
Figure 14D:
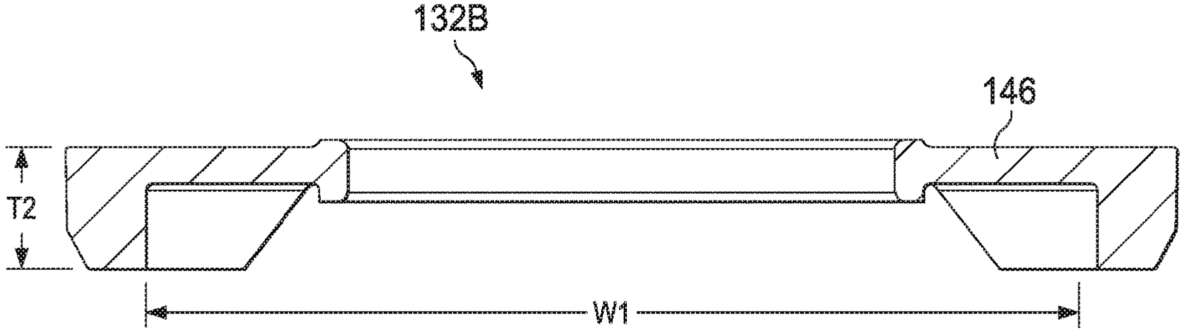
Figure 14E:
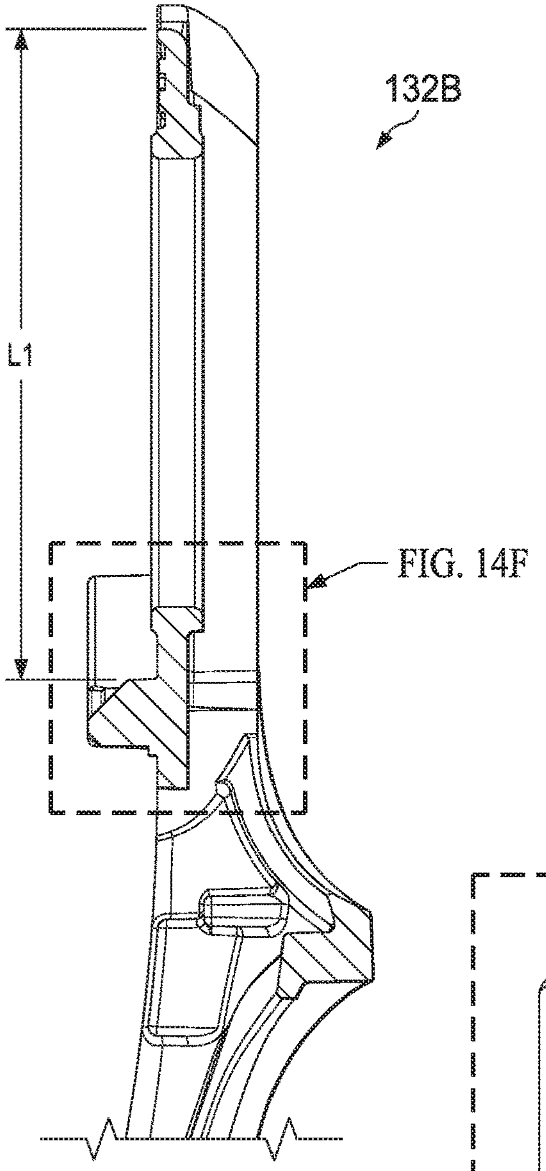
Figure 14F:
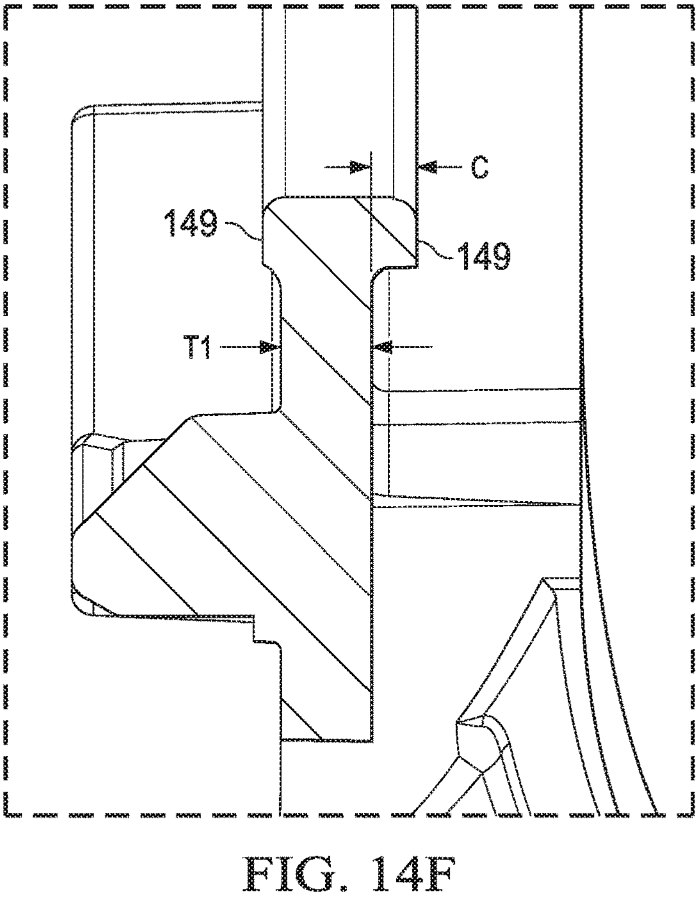
Figure 15A:
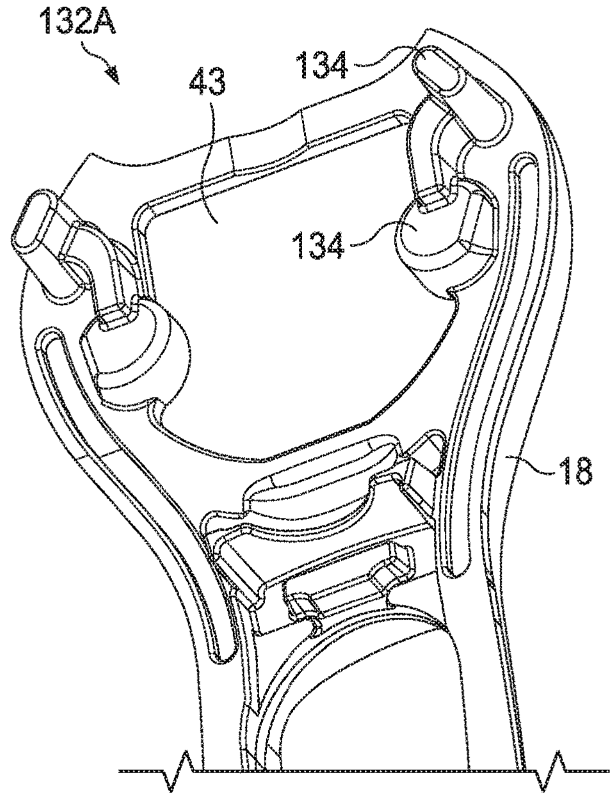
FIGS. 15A-15G depicts schematic views of an embodiment of a rigid member platform of FIGS. 8A and 8B.
Figure 15B:
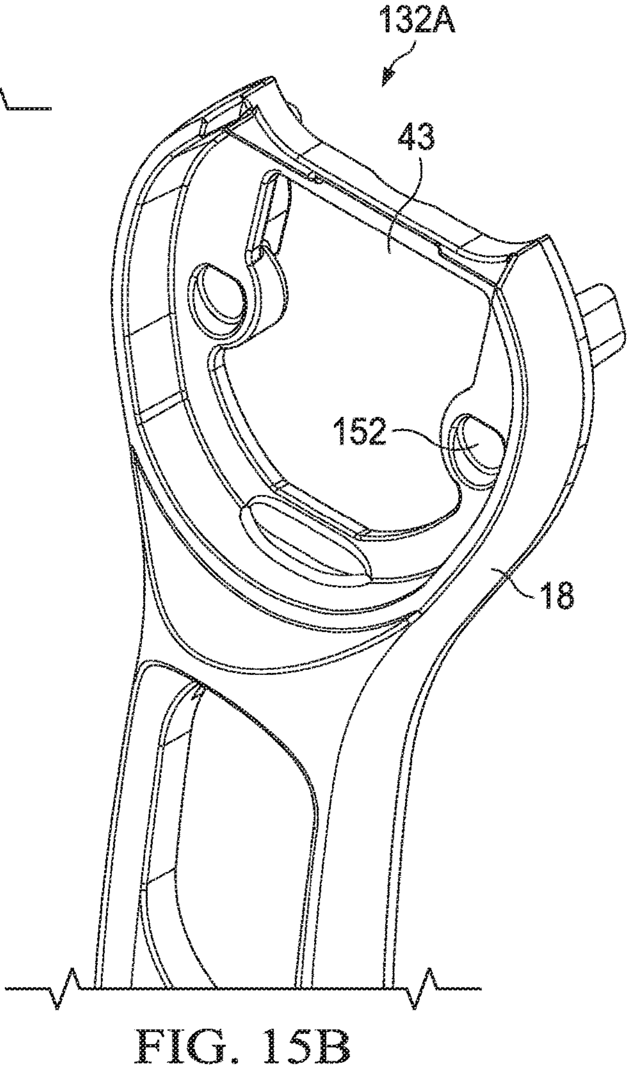
Figure 15C:
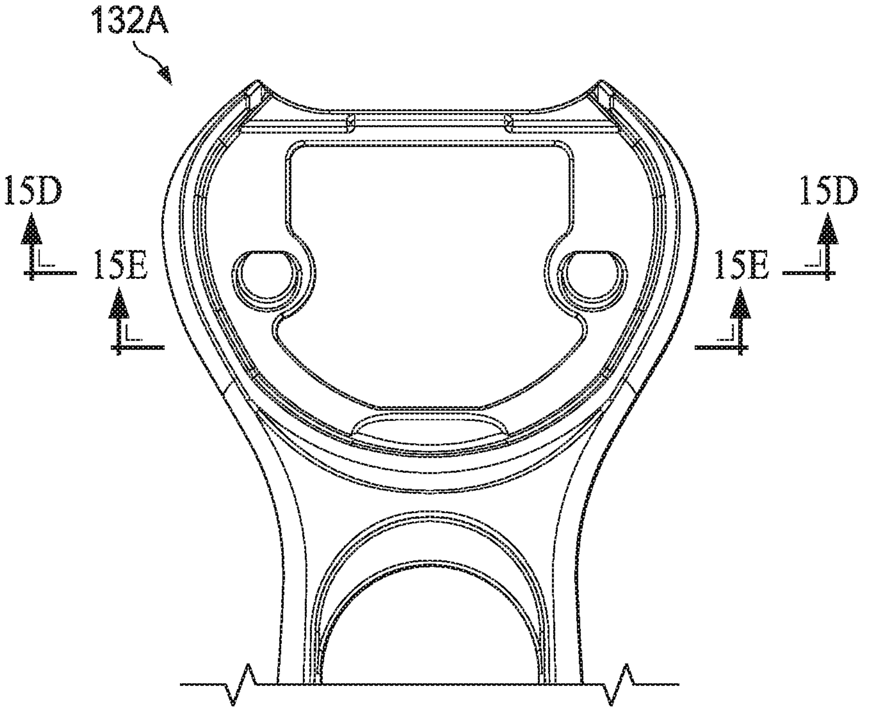
Figure 15D:
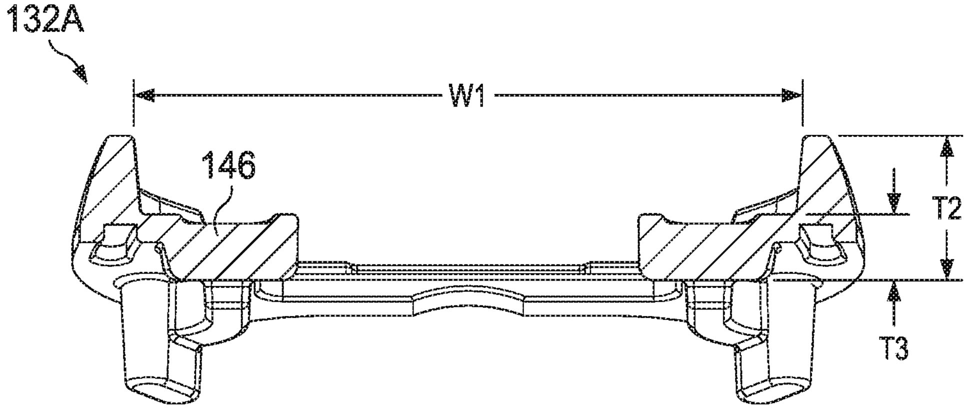
Figure 15E:
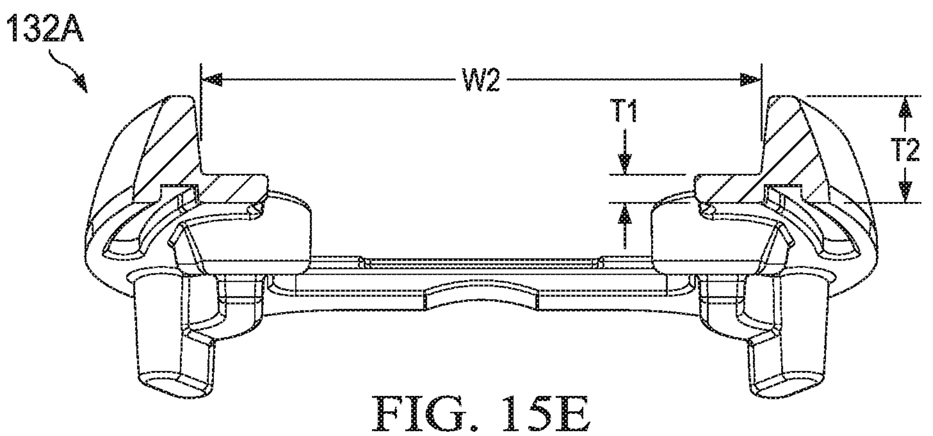
Figure 15F:
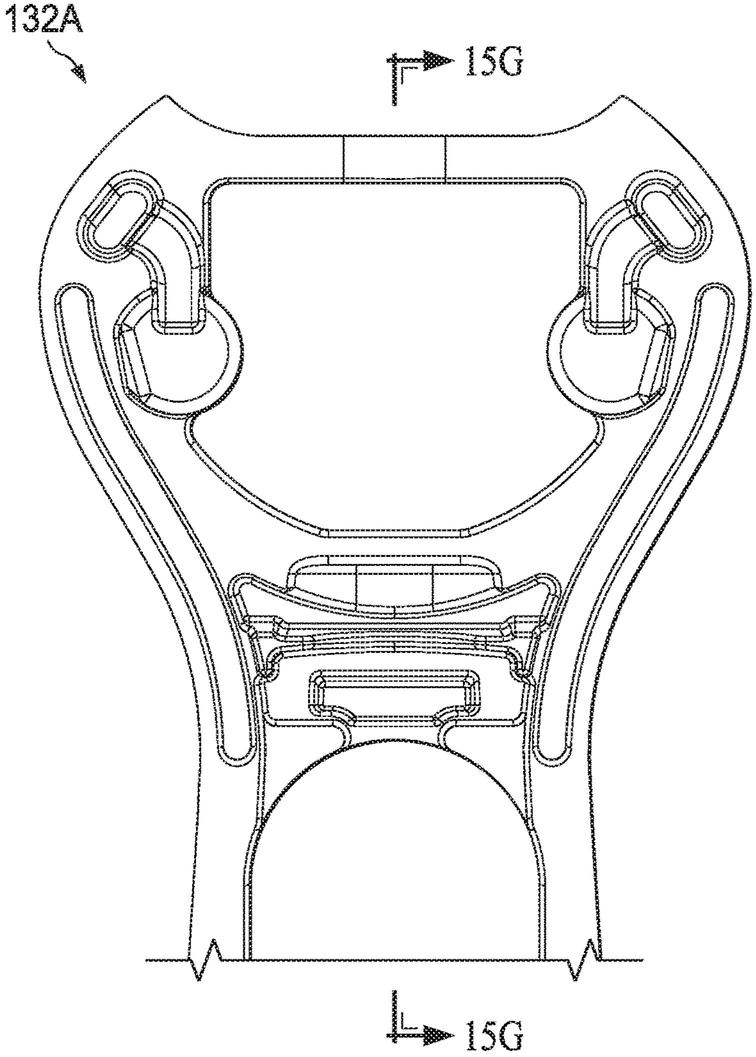
Figure 15G:
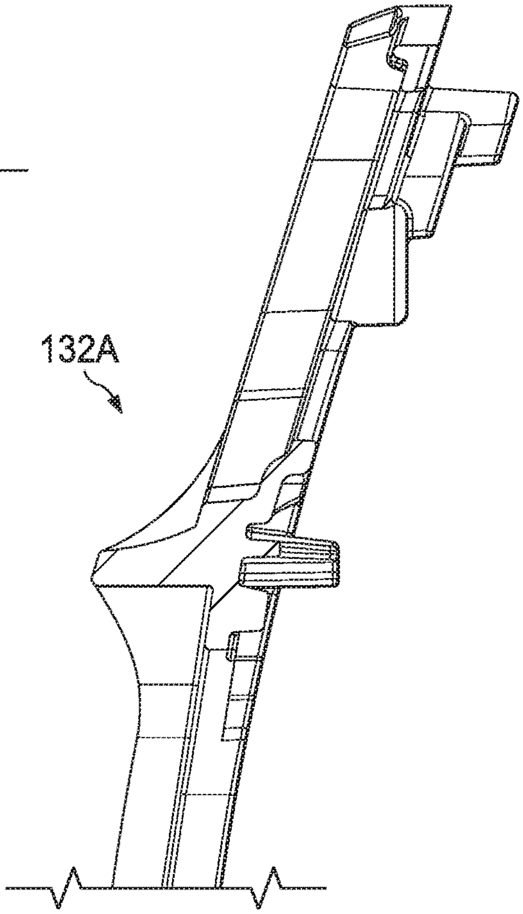

As shown in FIG. 14A, rigid member platform 132*b* has a top surface 142, bottom surface 143, walls 146, and location features including opening 43 and one or more slots 144. The rigid member platform can be enclosed or partially enclosed by walls 146 (e.g., side walls).

As shown in FIG. 15, rigid member platform 132*a* has a top surface 142, bottom surface 143, walls 146, and location features including opening 43, one or more pockets 152, and one or more protrusions 134. The rigid member platform can be enclosed or partially enclosed by walls 146 (e.g., side walls).

FIG. 14 detail A shows a median thickness T1 of top and bottom surfaces 142 and 143 of the rigid member platform 132*a* and 132*b*. T1 is depicted in cross-sectional view B-B taken down the midline of the rigid member platform as shown in detail A of FIG. 14.

FIG. 15 shows cross-sectional views A-A, C-C and D-D corresponding to the embodiments of FIGS. 8A and 8B. In views A-A and C-C, median thicknesses T1 and T2 can be seen, along with widths W1 and W2. In this embodiment, W1 represents the maximum width of the rigid member platform and W2 is smaller than W1. In both cases, the maximum width to median thickness ratio exceeds 20.

A maximum length L1 across the rigid member platform across cross-sectional view E-E is shown parallel to the longitudinal axis of the razor handle. A maximum width W1 across the rigid member platform is shown transverse to the longitudinal axis of the razor handle. The rigid member platform 132 can be partially surrounded by walls 146 having a height T2. These walls provide additional product integrity to the rigid member and allow for flexibility in design aesthetics. Embodiments of FIGS. 7A and 7B have a rotation pivot in the handle that passes or extends through the rigid member platform. Bearing surfaces 149 are also depicted in detail A of FIG. 14. A clearance C, of from about 0.1 mm to about 1 mm, is a distance between a bearing surface 149 and the top surface 142 or the bottom surface 143 of the rigid platform member. Bearing surfaces 149 are located within a distance of about 1 mm from the location feature such as slots, apertures, openings about which the movable member assembly travels.

Upper and lower portions of a movable member assembly are coupled together by passing through the aperture 43 of the rigid member platforms and are held in position and clearance by a spring member mounted to the rigid member. This spring member of the present invention, while flexible in the desired direction of motion, is stiff enough in other directions of motion to maintain sufficient clearance between portions of the movable member assembly and the rigid member and rigid member platform. The spring member may be preloaded as described herein.

In the present invention, a median thickness T1 of the platform 132*a* or 132*b* ranges from about 0.5 mm to about 2.5 mm, preferably about 1 mm A maximum width W1 to median thickness T1 ratio of the platform itself is about 7 to 60, and preferably about 20. The area of the rigid member platform including the area from features such as openings and pockets ranges from about 50 $mm^2$ to about 700 $mm^2$, and is preferably about 300 $mm^2$. A perimeter of the rigid member platform can be about 40 mm to about 90 mm, and preferably 63 mm. The rigid member platform has a hydraulic diameter, (e.g., in standard engineering this diameter can be defined as about four times the area divided by the perimeter) from about 8 mm to about 50 mm, and preferably about 20 mm. The maximum width W1 of the rigid member platform ranges from about 10 mm to about 50 mm. The maximum length L1 to median thickness T1 ratio of the rigid member platform itself is 7 to 60, and preferably about 20. The height T2 of the walls ranges from about 1.5 mm to about 18 mm, and preferably about 4 mm.

Thus, the present invention comprises a relatively thin rigid member platform which is beneficial because it provides a robust support for complex functional members above or below it, and an ease of manufacturing or assembly including flexibility for use of other manufacturing techniques such as additive manufacturing, while also providing space for benefit delivery system components.

Figure 16A:
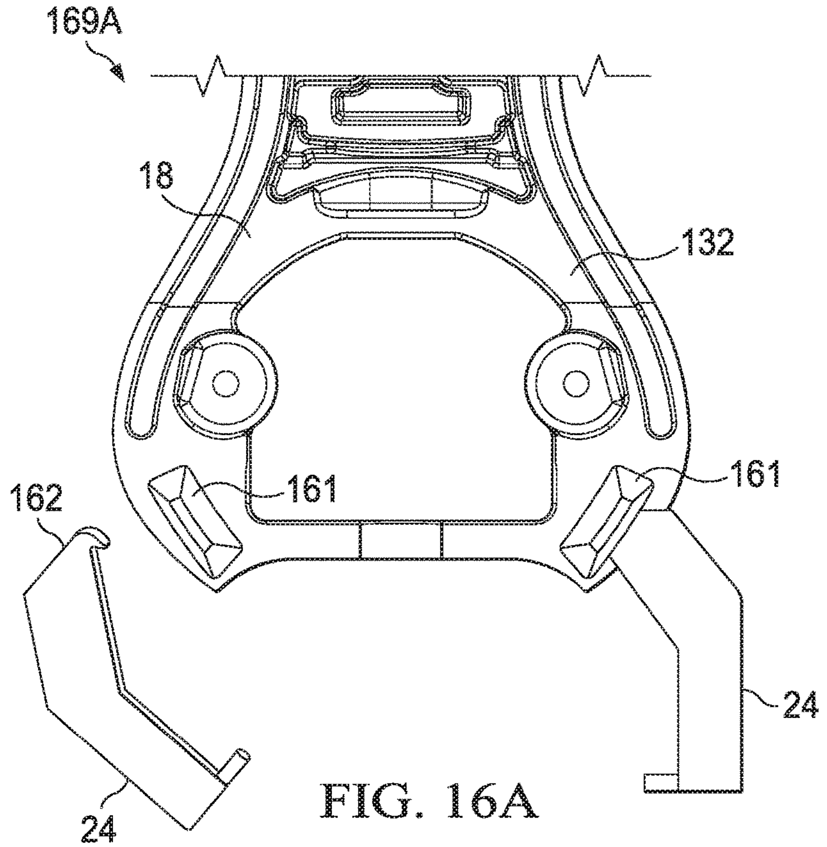
FIGS. 16A-16D depicts schematic views of embodiments of location features and their use in accordance with the present invention.
Figure 16B:
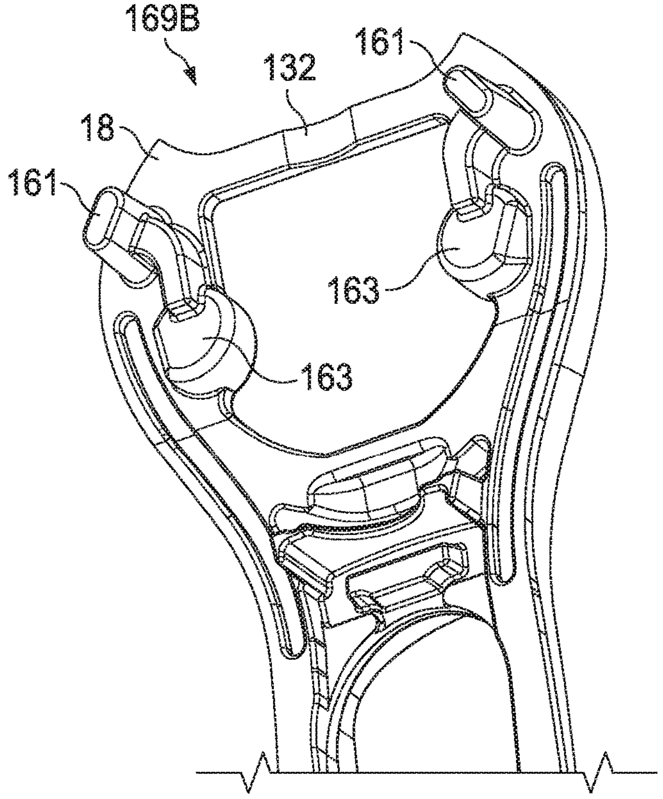
Figure 16C:
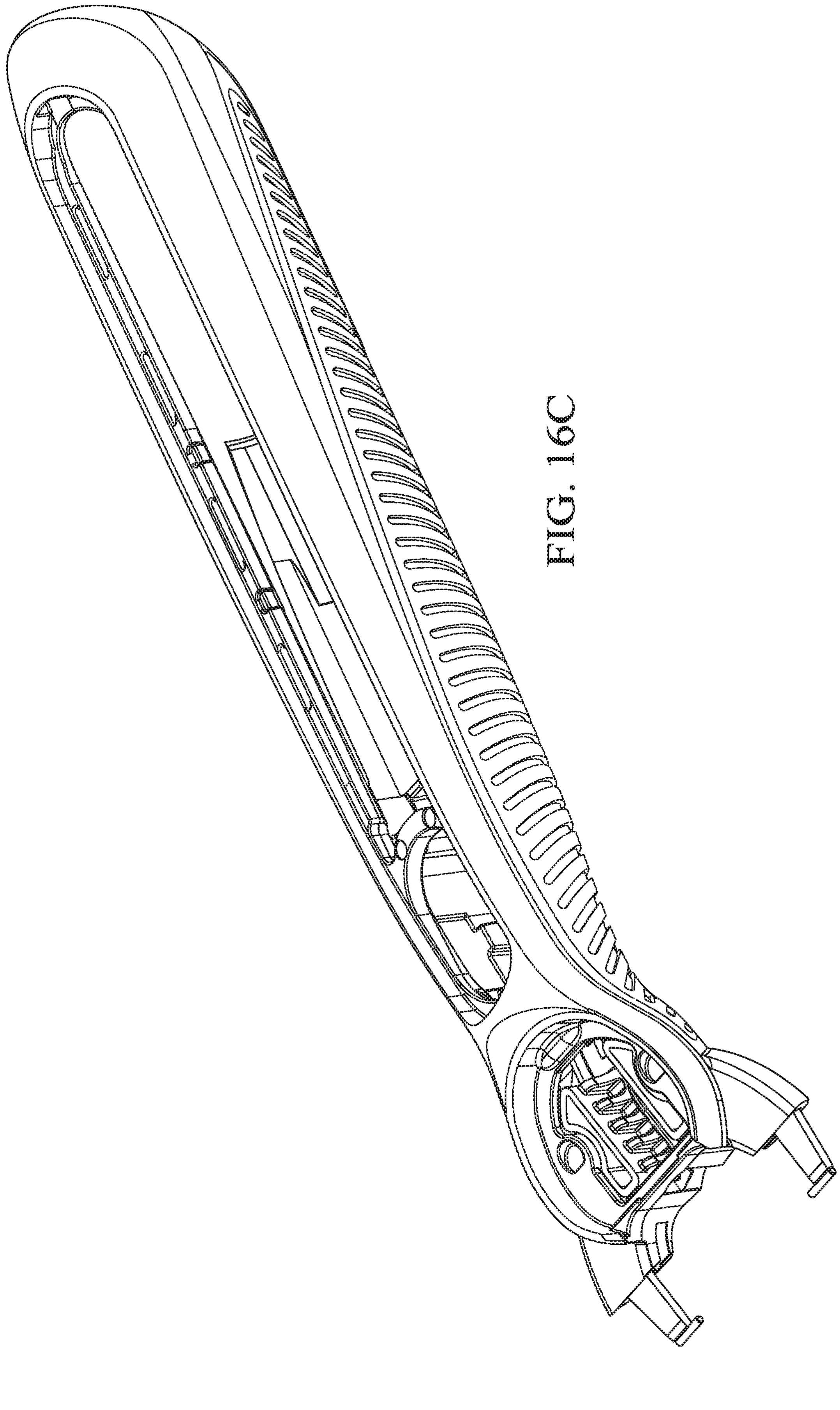
Figure 16D:
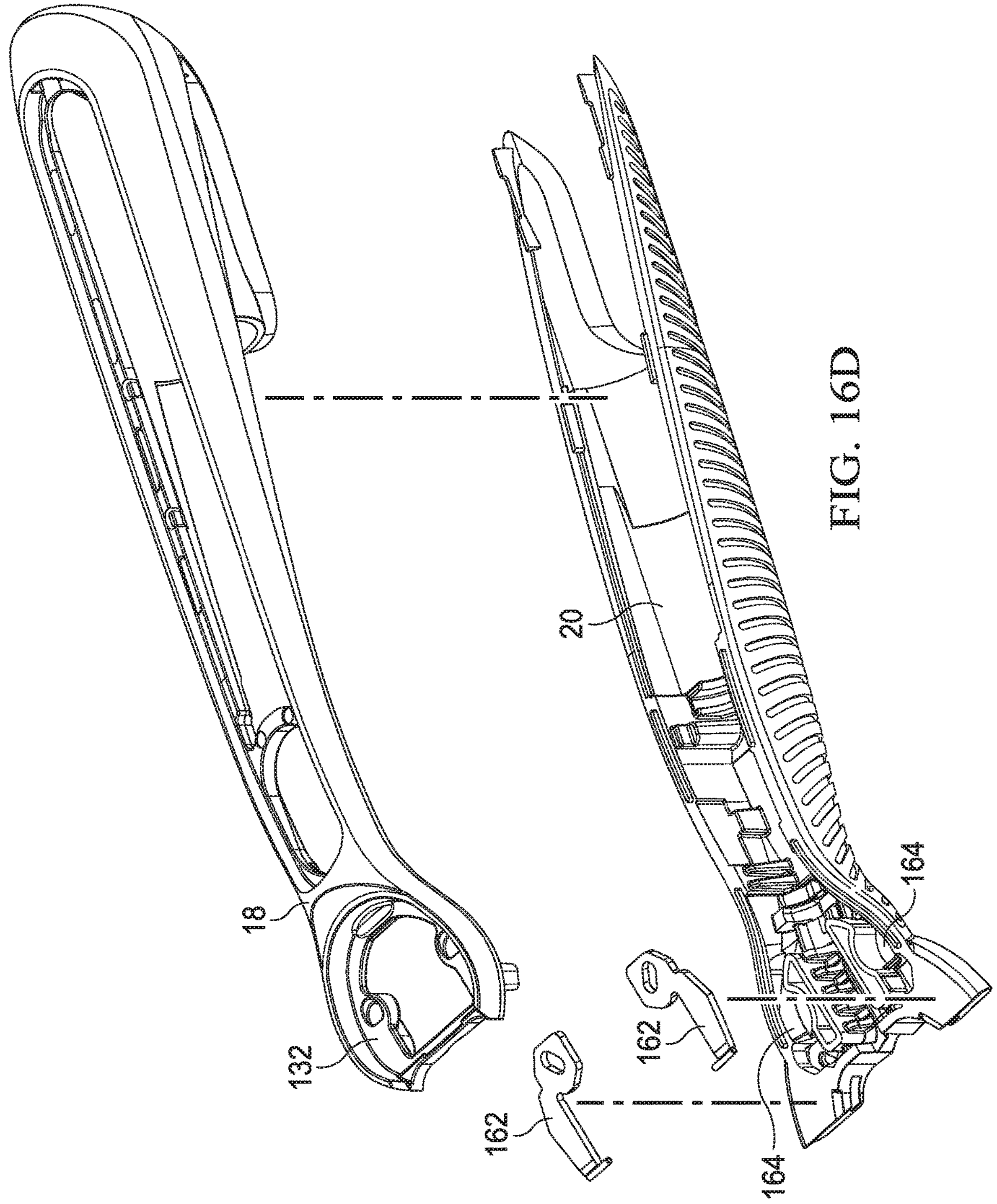

FIG. 16A-B show views 169*a* and 169*b* depict the use of location features to attach other components to the frame 18. Protrusion 161 in view 169*a* and 169*b* attach to locking structures 162 in rigid arms 24 extending the rigidity of the frame 18 beyond the main body 16. In view 169*b*, protrusions 163 of the rigid member platform assist in locating and locking the secondary frame 20 to the rigid member platform 132*a* or 132*b* utilizing secondary frame structures 164.

In a preferable embodiment of the present invention, these upper and lower elements are coupled together by securing one to the other with the rigid member location feature 43. This may desirably be achieved by utilizing the rigid member location feature aperture 43 of the frame 18 for alignment with the upper aperture 46 and lower aperture 48, as will be described in more detail below.

Referring to FIG. 17A-D, a process of the present invention for assembling the various razor portions described above with respect to FIGS. 1 to 16 are shown and described herein. Any of the mounting steps described can be achieved by any feasible methods including, but not limited to, mechanical engagement, frictional engagement (e.g., welding), and chemical engagement (e.g., adhesives). The mechanical engagement can include one or more structures or protrusions providing rest surfaces for a portion or snap-fitting. Chemical engagement comprises gluing or adhesives.

Figure 17B:
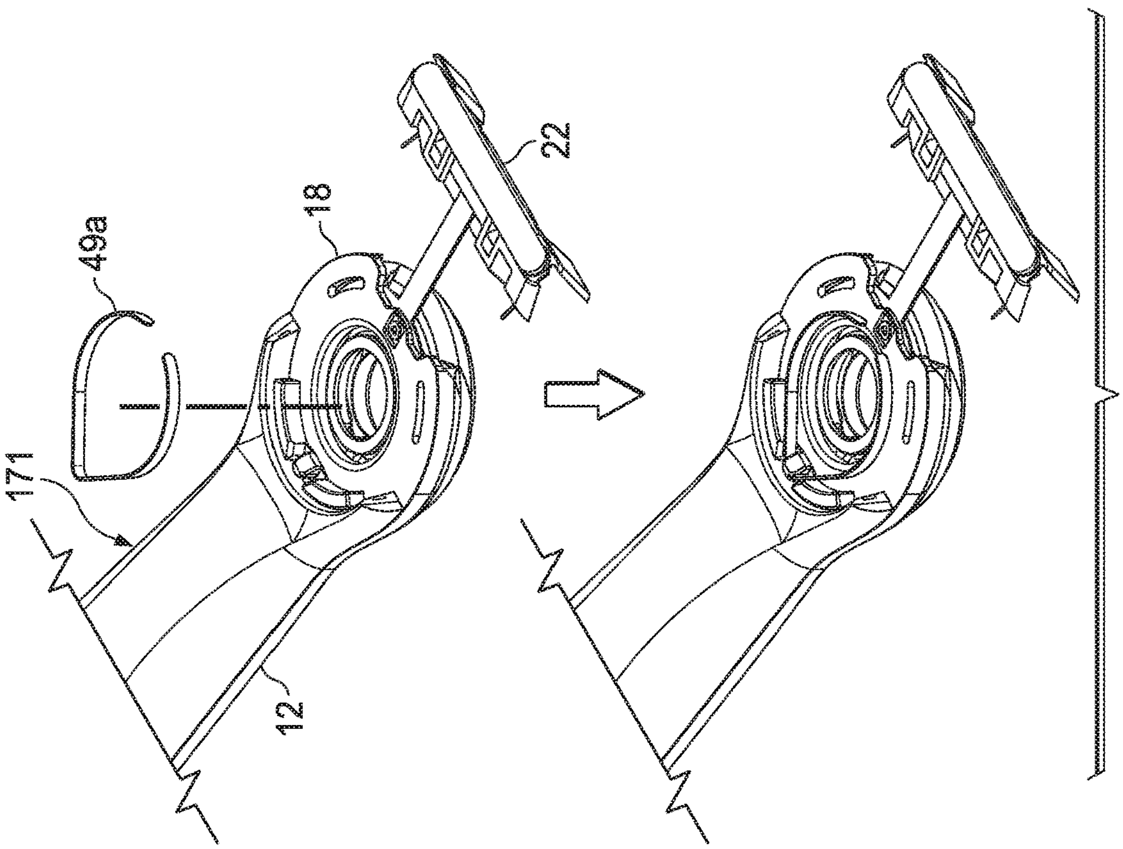
FIGS. 17A-24B depicts a process of assembly of a portion of a handle according to an embodiment of the invention.
Figure 17A:
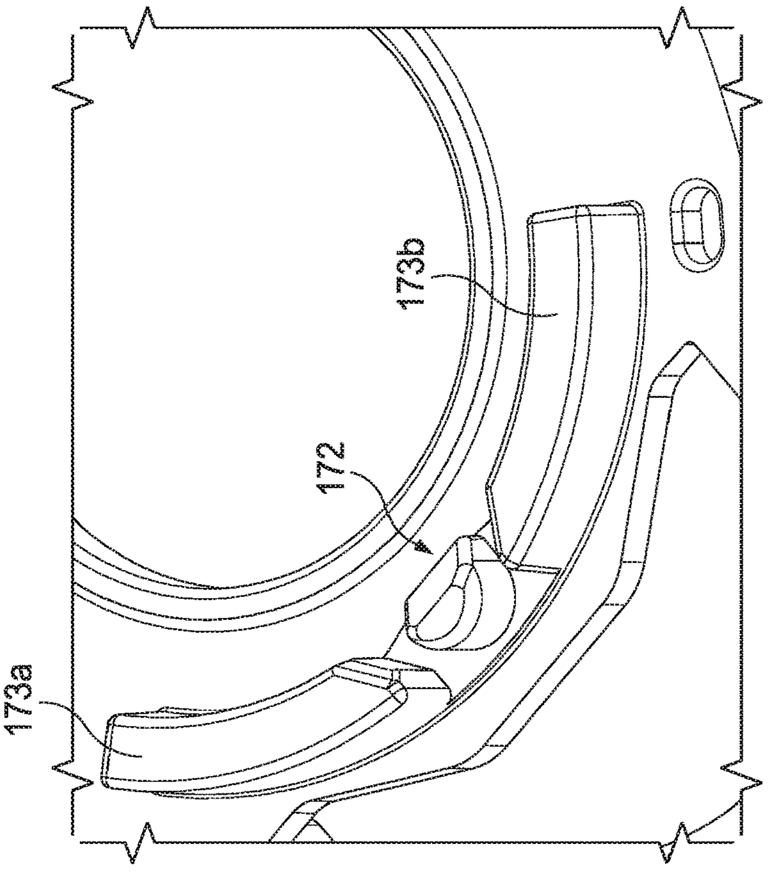
Figure 17D:
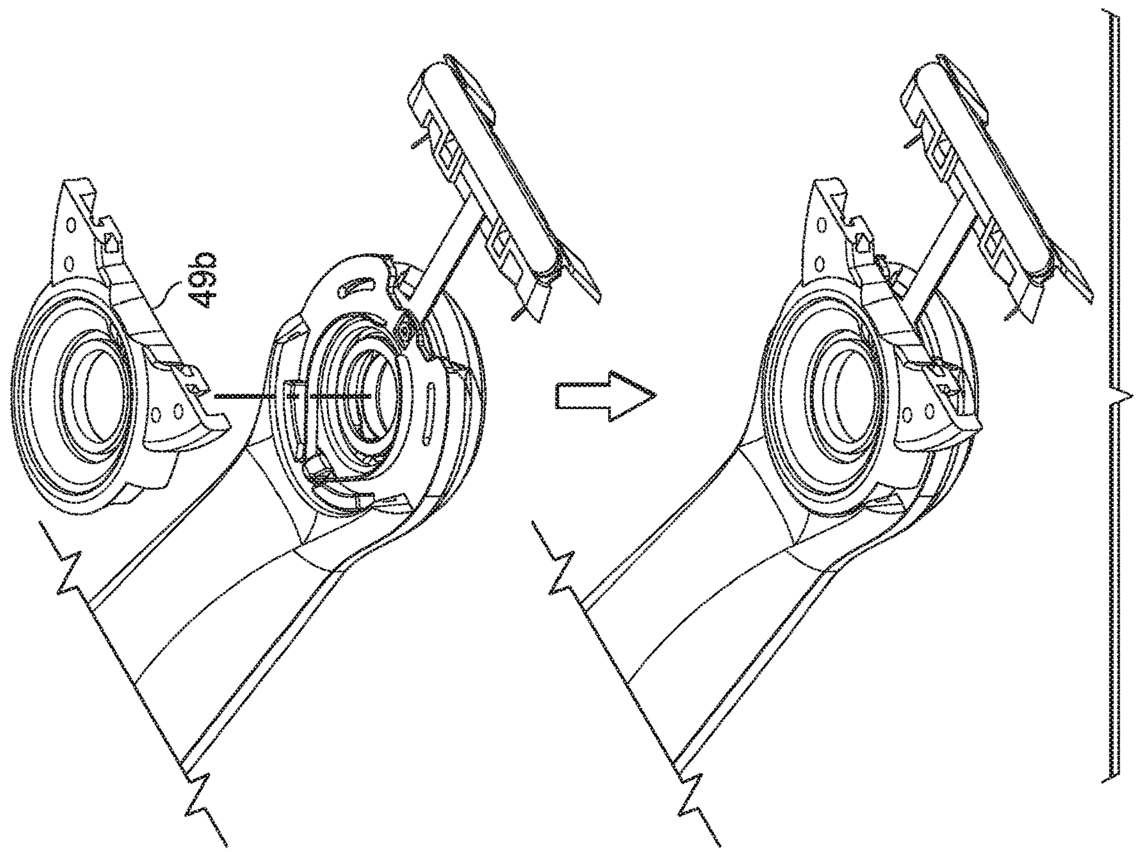
Figure 17C:
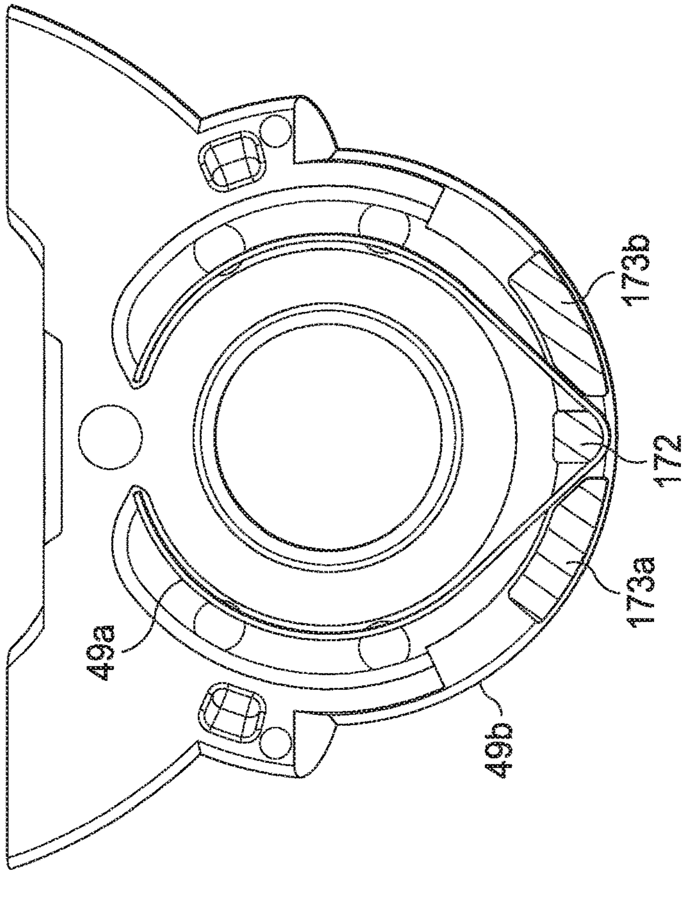
Figure 18A:
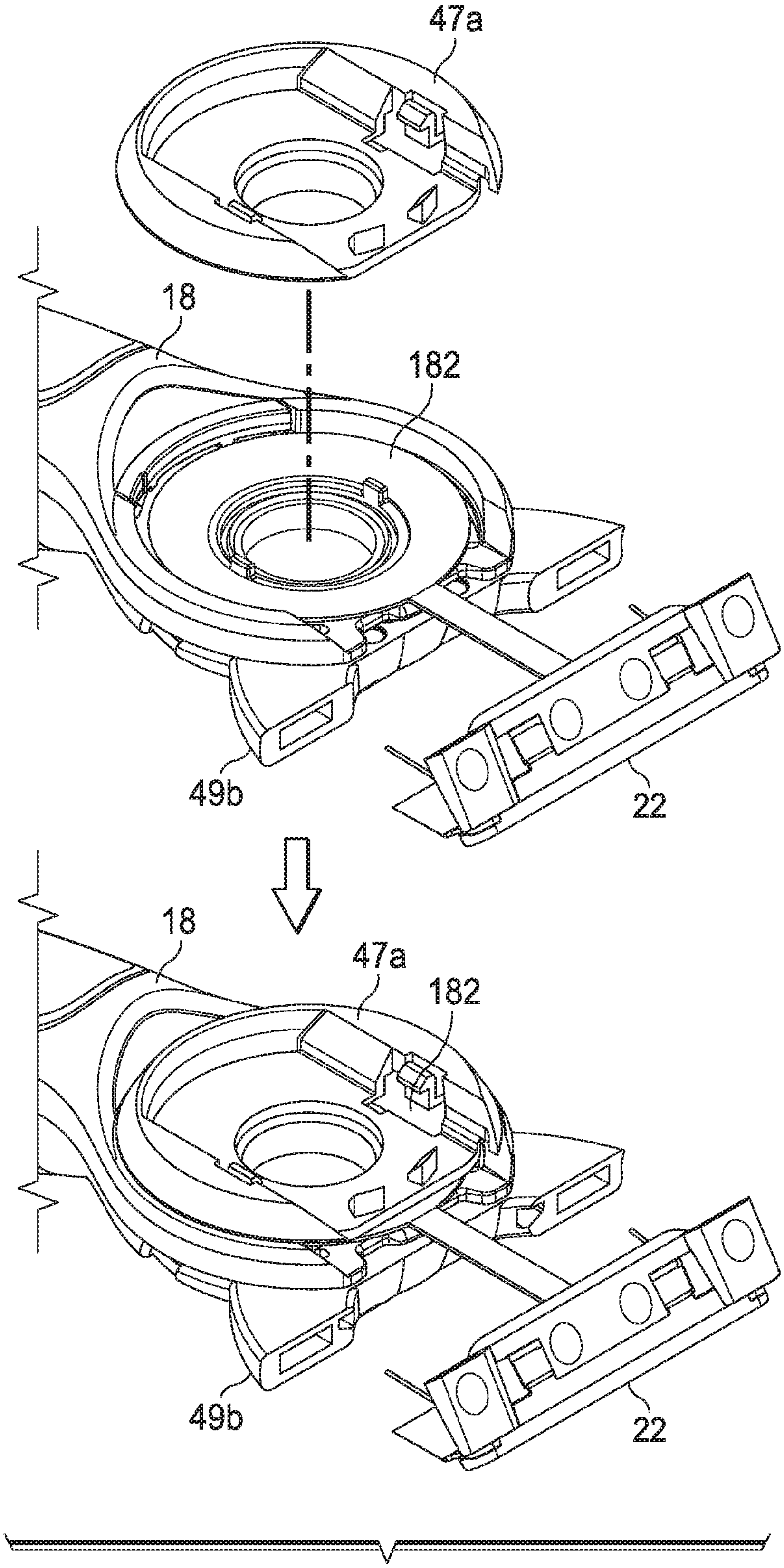
Figure 18B:
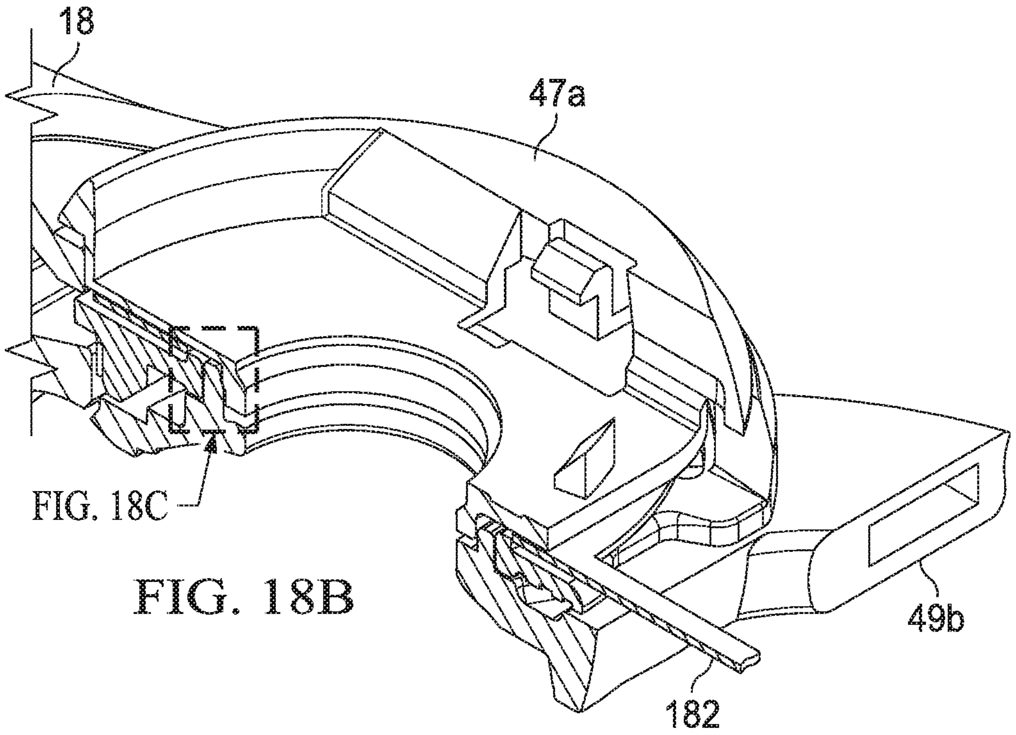
Figure 18C:
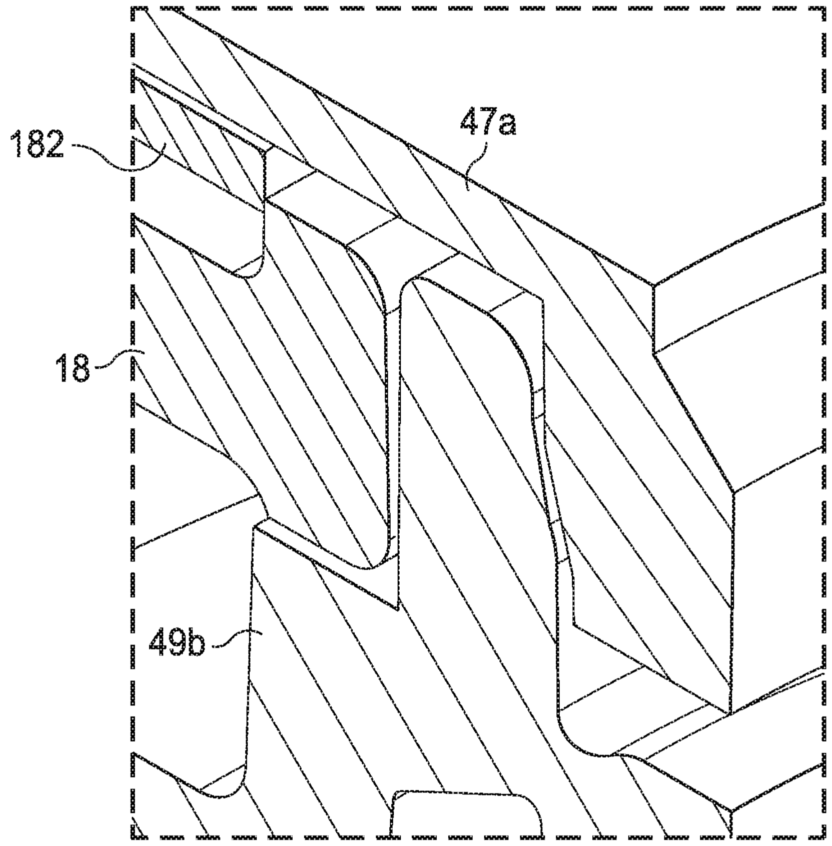
Figure 18D:
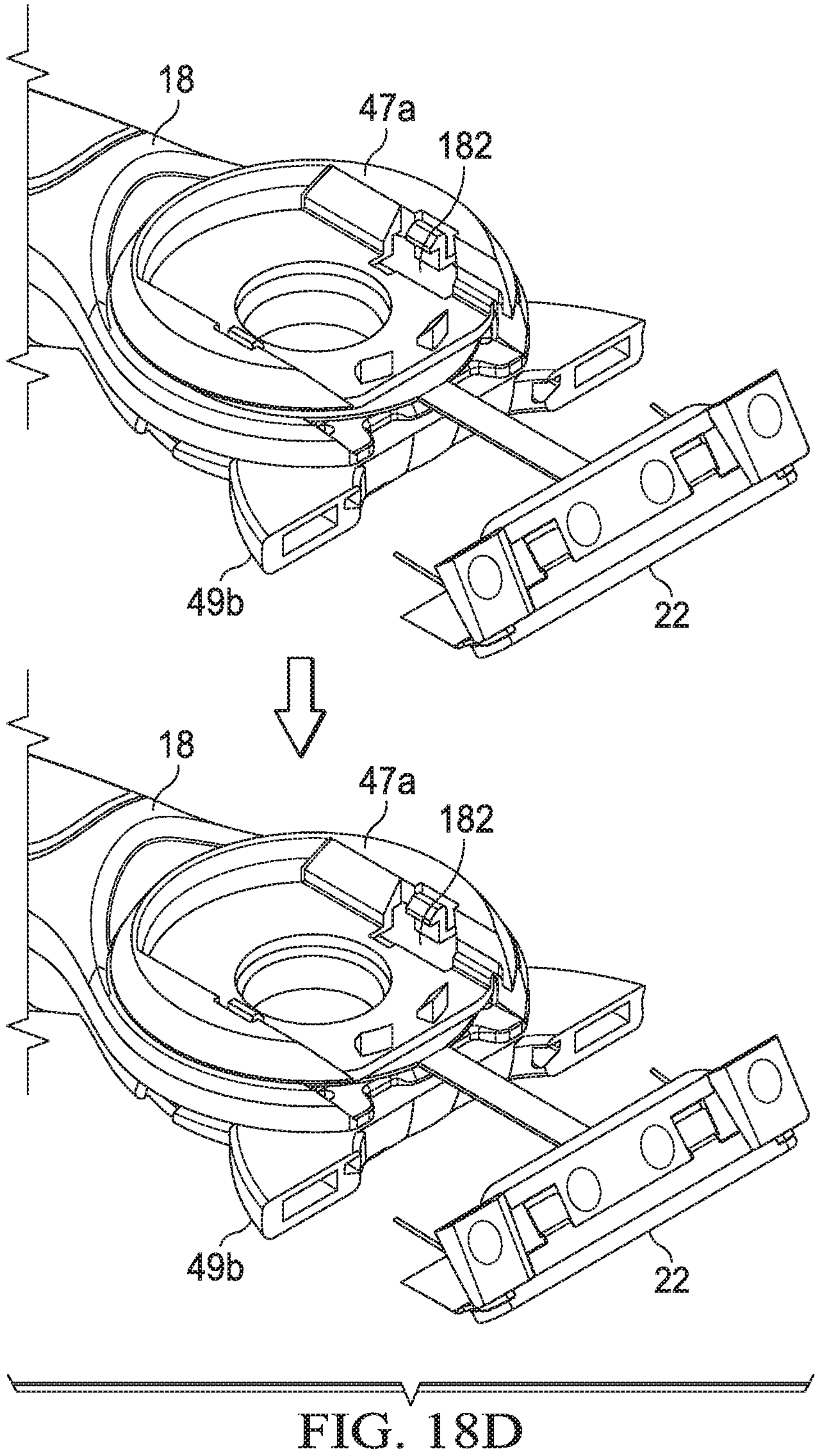
Figure 18E:
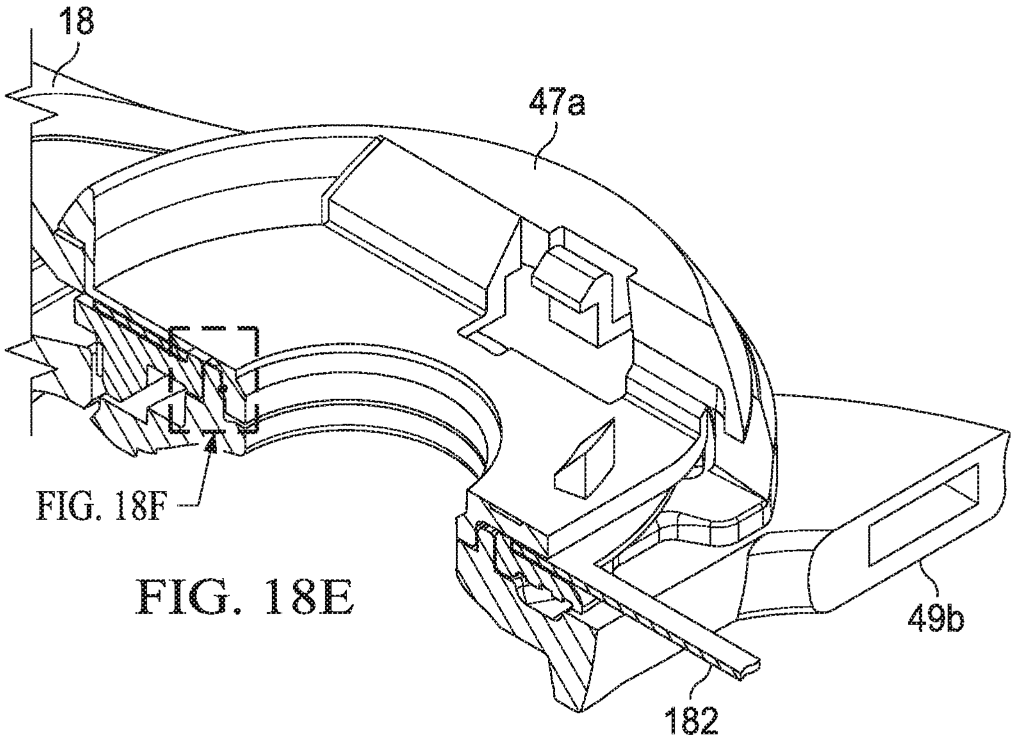
Figure 18F:
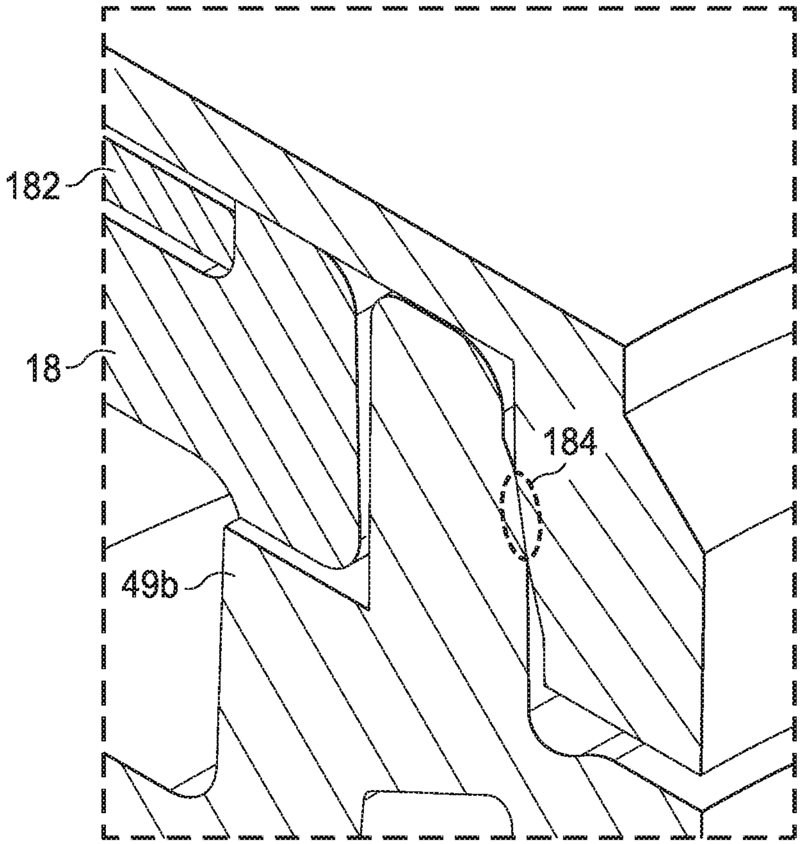
Figure 19A:
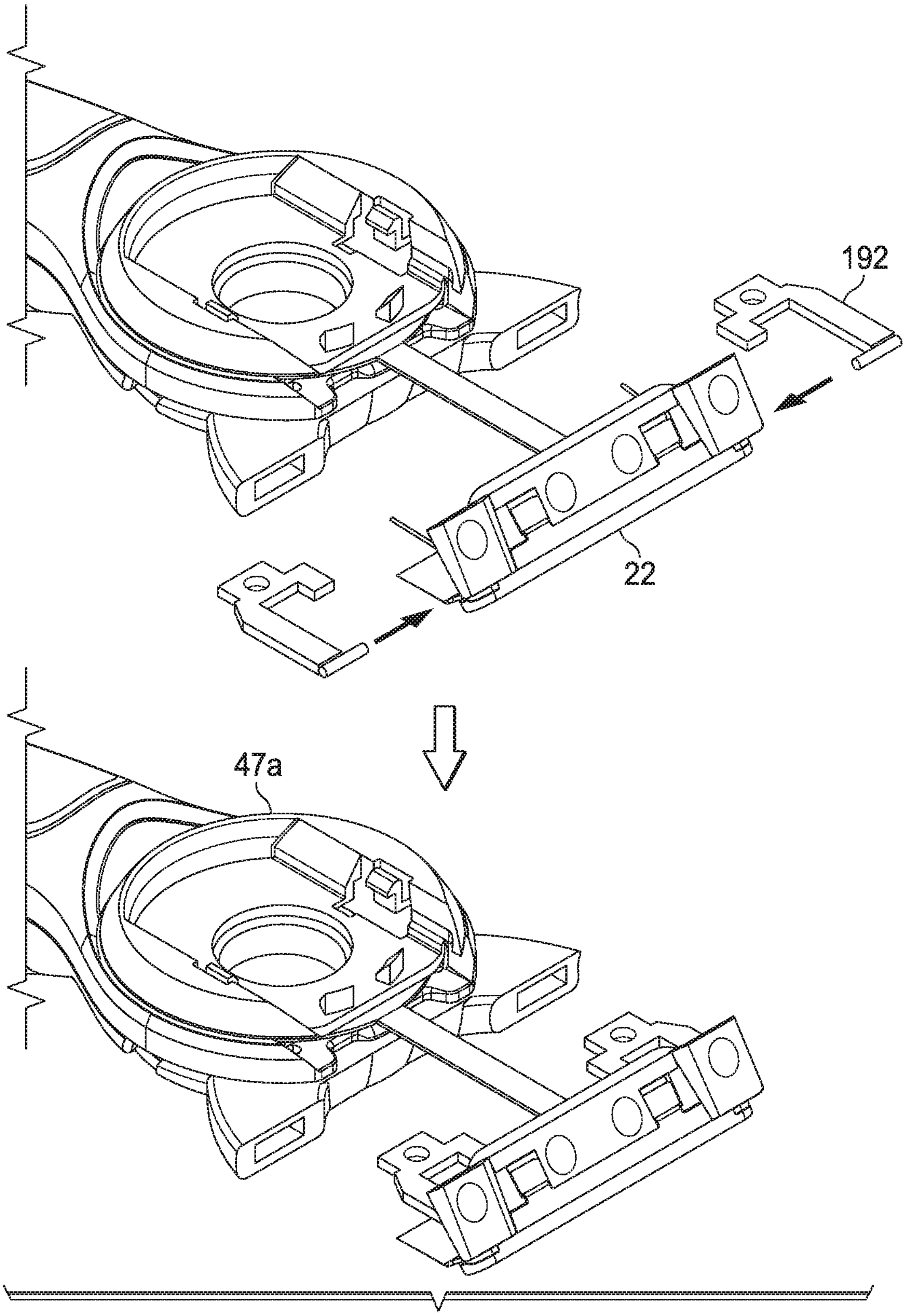
Figure 19B:
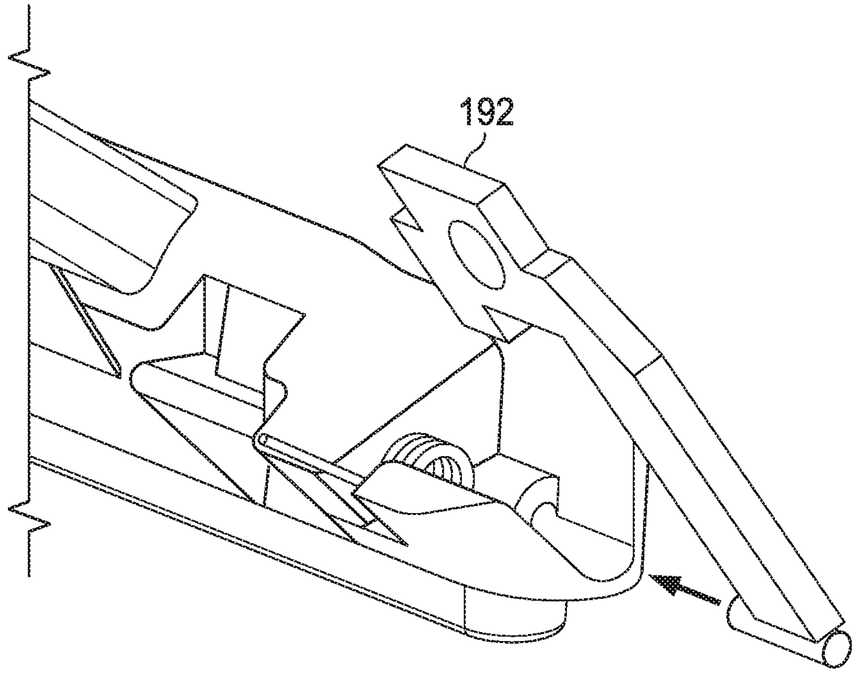
Figure 19D:
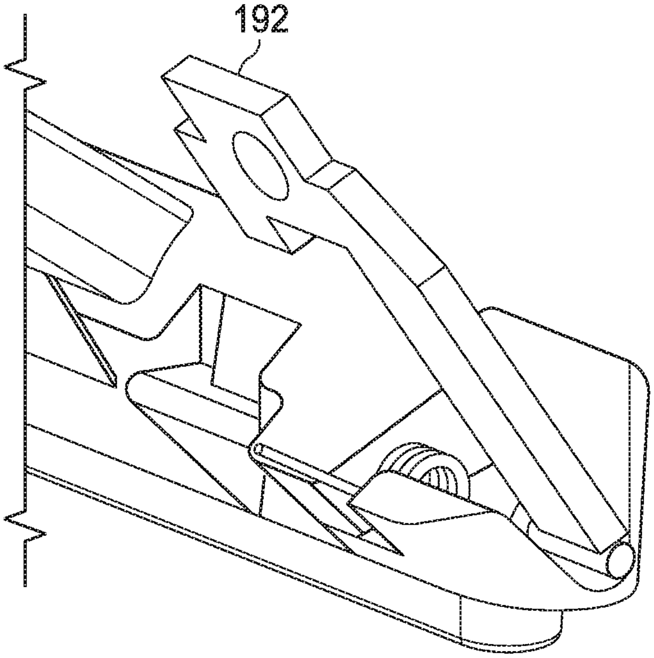
Figure 19C:
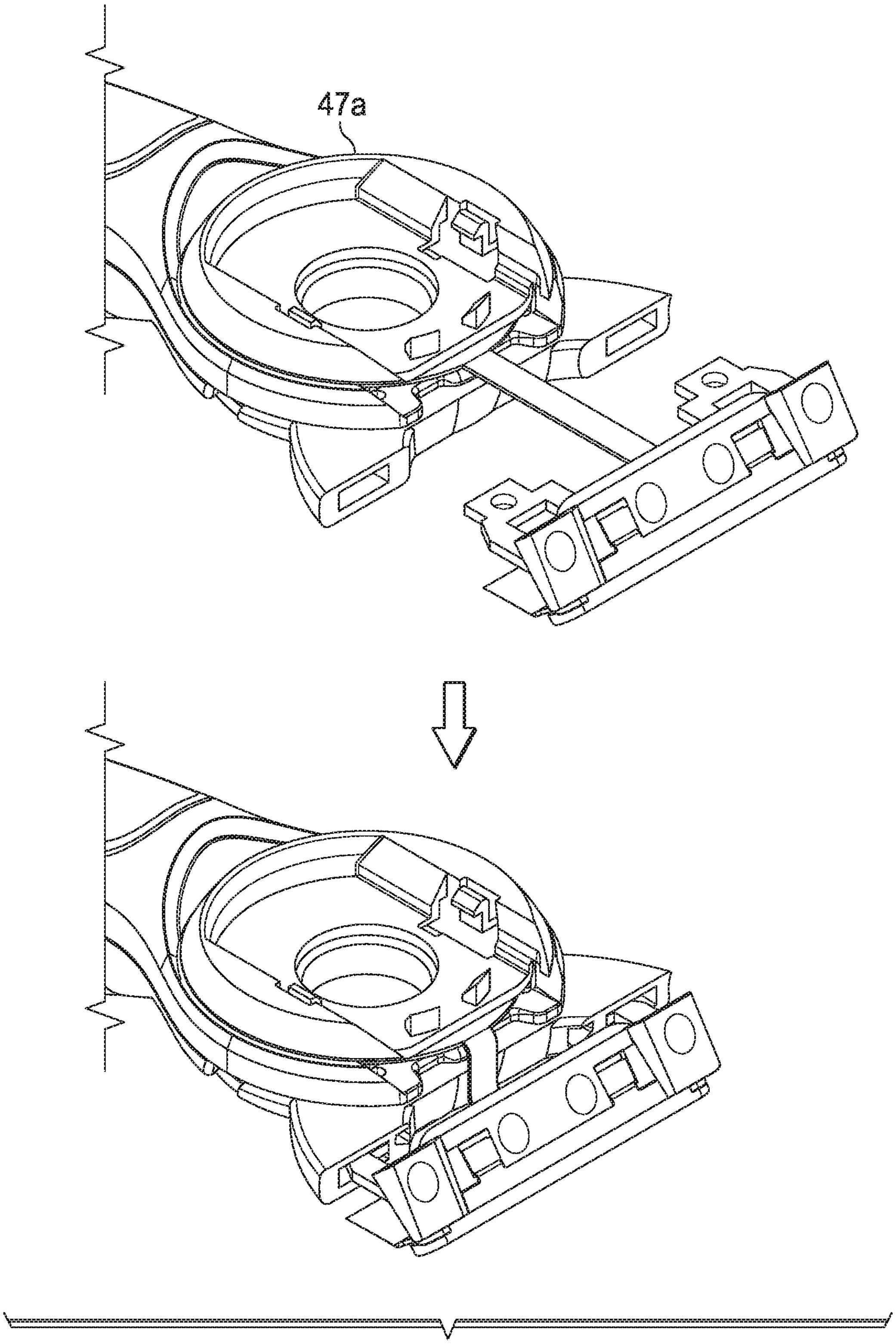

In a preferred embodiment, at Step 1 of FIG. 17B a first lower element 49*a* of lower portion 44*b* is first mounted to the main frame 18 of the handle 12. In a non-limiting embodiment, the lower element 49*a* is a spring member, and can be a loop shaped spring member as shown in FIG. 17. The loop shaped spring member can have a shape that is generally oval, circular, elliptical, ring shaped, modified V-shaped, tear drop shape or any combination thereof. In the embodiment shown, the loop shaped spring member can be considered a tear drop shape. The spring member has end portions. End portions can have distal ends which can be spaced apart. The mounting of the spring member to the frame 18 can be achieved by attaching one end of the spring member amidst rest surfaces on protrusions on the frame. In one embodiment, the loop spring member is not permanently attached to the frame. The mounting of the spring member to the frame may also be achieved by any feasible means including but not limited to, mechanical engagement. The spring member can be preloaded within the second lower element and the frame. In one embodiment, the spring member 49*a* comprises a knob or curved structure 171 which is placed around a center protrusion 172 such that an inner surface of the knob (e.g., into the loop) rests along the outer surface of the center protrusion 172 while outer surfaces of the spring member 49*a* rest along surfaces of two elongated protrusions 173*a* and 173*b* on either side of the center protrusion 172 as shown in close-up views in Step 1 and Step 2. Close-up view of Step 1 depicts the center and elongated protrusions of the frame. Close-up view of Step 2 depicts the underside of the second lower element 49*b*, and together with FIG. 10, provide two feasible embodiments for coupling the second lower element and the spring member. Also shown in FIG. 17 at Step 1, a skin interconnect member 22 is mounted to the main frame 18.

At Step 2 shown in FIG. 17, the second lower element 49*b* is mounted to the resultant structure which forms a part of the lower portion, from Step 1. In one embodiment, the second lower element 49*b* can provide a preload force on the spring member 49*a* after it is mounted. The second lower element 49*b* can include arms which connect to a razor cartridge as will be described herein. As noted above, the second lower element 49*b* can provide a rotational movement type for a razor cartridge relative to the handle. In one embodiment, spring member 49*a* is fully encompassed or covered within lower portion 44*b*.

Turning to FIG. 18, a Step 3 of the present invention process to assemble the movable member 44 is shown. Step 3 depicts first upper element 47*a* of the upper portion 44*a* disposed on top of the main frame 18 of handle 12. In one embodiment shown, a thermal element 182 in the form of a flex circuit can be disposed therebetween. As shown, the flex circuit has a circular shape with a centrally located aperture to align with the location features of the other elements of the movable member assembly. The flex circuit may provide a heat or cooling benefit to the skin interconnect member 22 which can be appreciated by the user when attached to a razor cartridge. Close-up cross-sectional views (A) of the structure resulting from Step 3 is shown in FIG. 18. There, it shows that the first upper element 47*a* is disposed on top of second lower element 49*b* and extends through the main frame 18. The main frame is disposed therebetween. Thermal element 182 is disposed between the first upper element and the main frame.

At Step 4, the first upper element 47*a* is secured to the second lower element 49*b*. This securing step is preferably comprised of welding between the two elements, more preferably ultrasonic welding, and most preferably pinch off type ultrasonic welding. The welded material 184 is shown in a close-up cross-sectional view (B) of Step 4. As can be seen, the welded material 184 is disposed in area in between the first upper element 47*a* and the second lower element 49*b*. Other methods for securing these elements are also contemplated (e.g., gluing).

These elements are coupled together through the main frame which as noted herein is preferably a rigid member, and more preferably comprised of a diecast material such as zinc. Since the first upper element is a part of the upper portion and the second lower element is a part of the lower portion, in this way, the upper portion 44*a* can be secured to the lower portion 44*b* through the main frame. In the embodiment, the main frame extends between the upper and lower portions. In the embodiment, the upper and lower portions are engaged within, pass through, or around the rigid member or main frame's location feature 43. The upper and lower elements of the upper and lower portions have location features 46, 48, respectively which are apertures of a similar size and shape as that of the rigid member, a generally circular aperture.

The upper and lower elements can also feasibly be coupled via mechanical engagement such as a snap-fit. Features on the upper surface of the second lower element 49*b* and features on the lower surface 47*a* can be engaged within, pass through or around, a rigid member location feature such as aperture 43 disposed within the rigid member. The one or more surface features can be recesses, projections, notches, or other attachment structures which can mate or engage, or any combination thereof.

Turning to FIG. 19, a Step 5 of the process of assembling of the movable member 44 is shown. At Step 5, distal ends of bracket arms 192 are mounted into skin interconnect member 22. At Step 6 shown in FIG. 19, proximal arms of bracket arms 192 are mounted to the second lower element 49*b*. After Step 6, the skin interconnect member 22 is mounted to the second lower element 49*b*. A pivot spring member (not shown) can be partially disposed within the skin interconnect member 22 to pivot in relation to arms 192. The pivot spring member can be preloaded.

Pivot spring member can be any spring member facilitating biasing and pivoting of the pivoting. Pivot spring member can be, for example, any of torsion coil springs, coil spring, leaf spring, helical compression spring, and disc spring. In one embodiment, spring member comprises one or more coil springs. In an embodiment, two coil springs can be coupled together in a spaced relationship by a main bar portion. Pivot spring members are described in co-owned co-pending US Docket Nos. 15136P, 15137P, 15138P, which are hereby incorporated herein by reference.

Figure 20A:
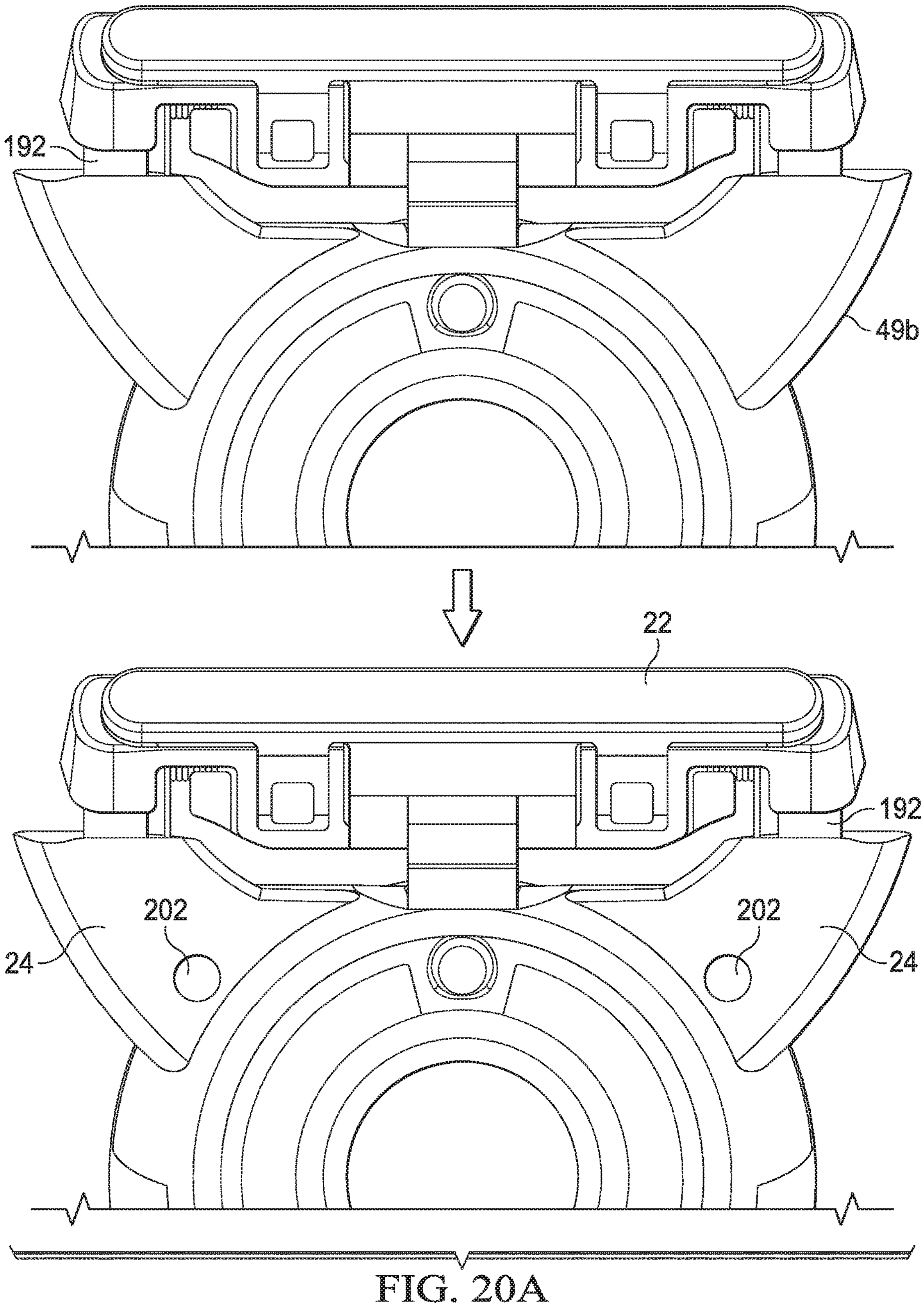

In FIG. 20A at Step 7, bracket arms 192 are fixed into position within the second lower element. In a non-limiting embodiment, as also shown by the direction of the arrows in the partial cut away perspective view of FIG. 20, a process of cold stamping, cold press fit, or cold heading can drive staking pins into the second lower element to fix the bracket arms 192 in position.

Figure 20B:
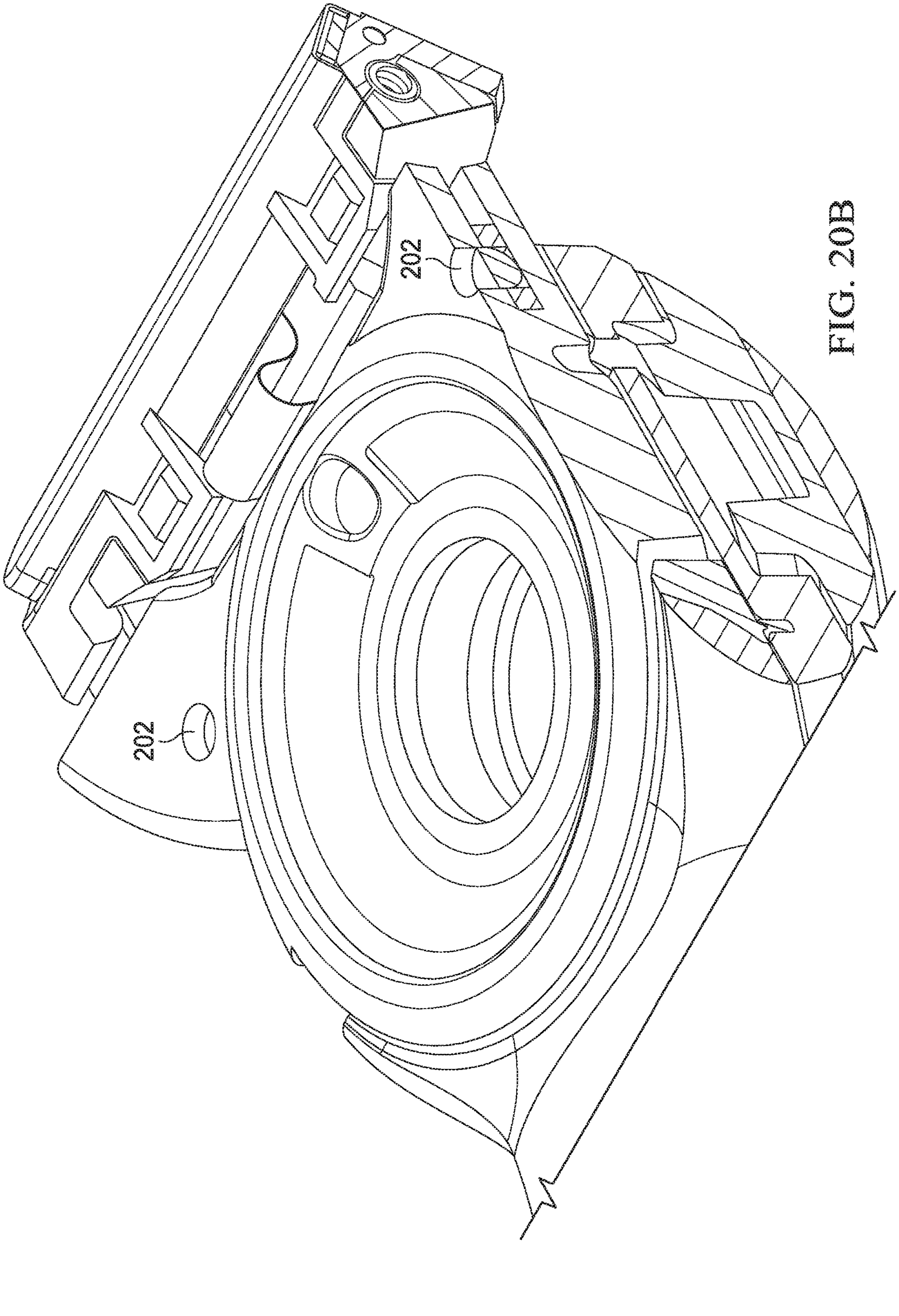
Figure 21A:
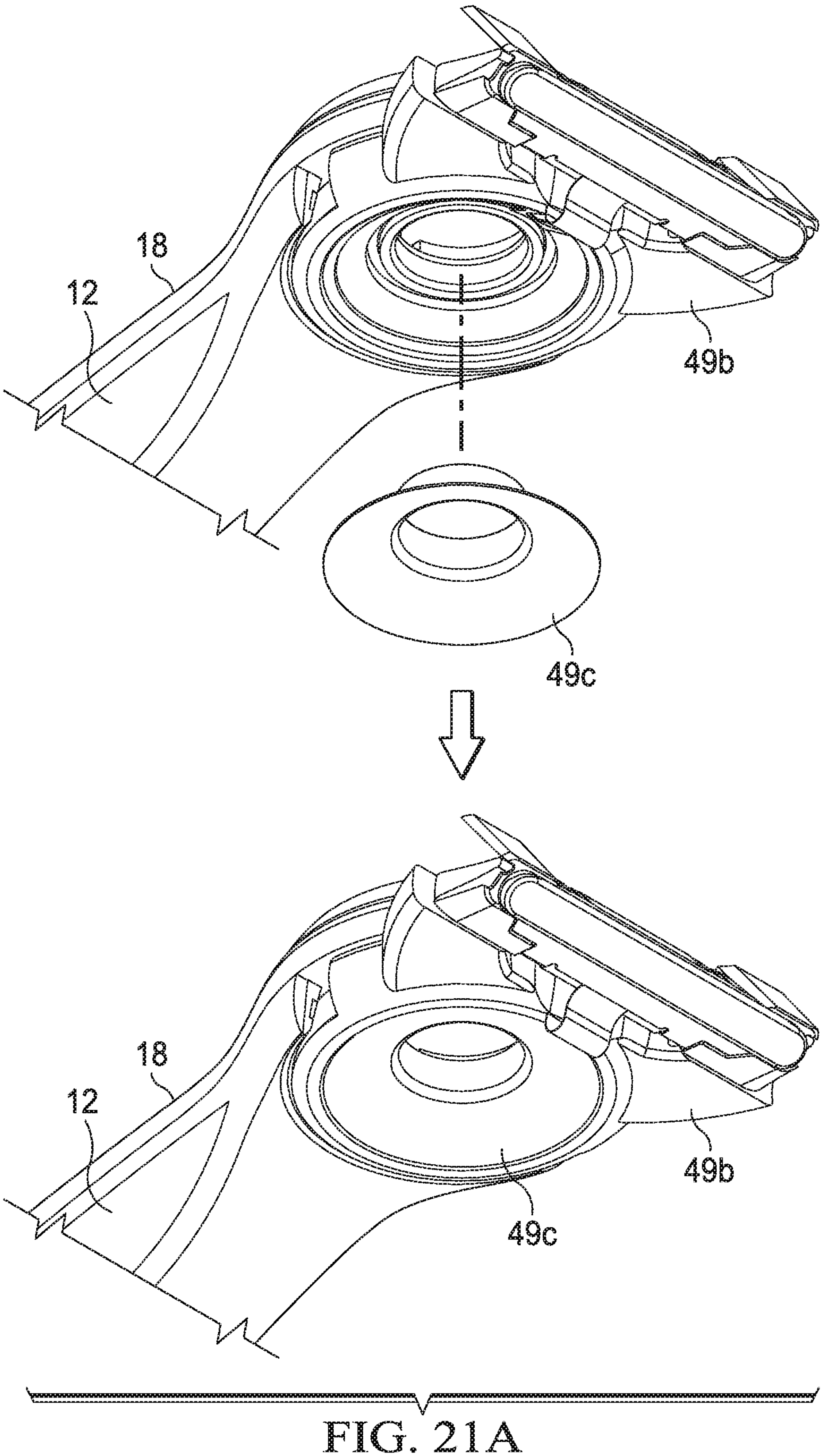
Figure 21B:
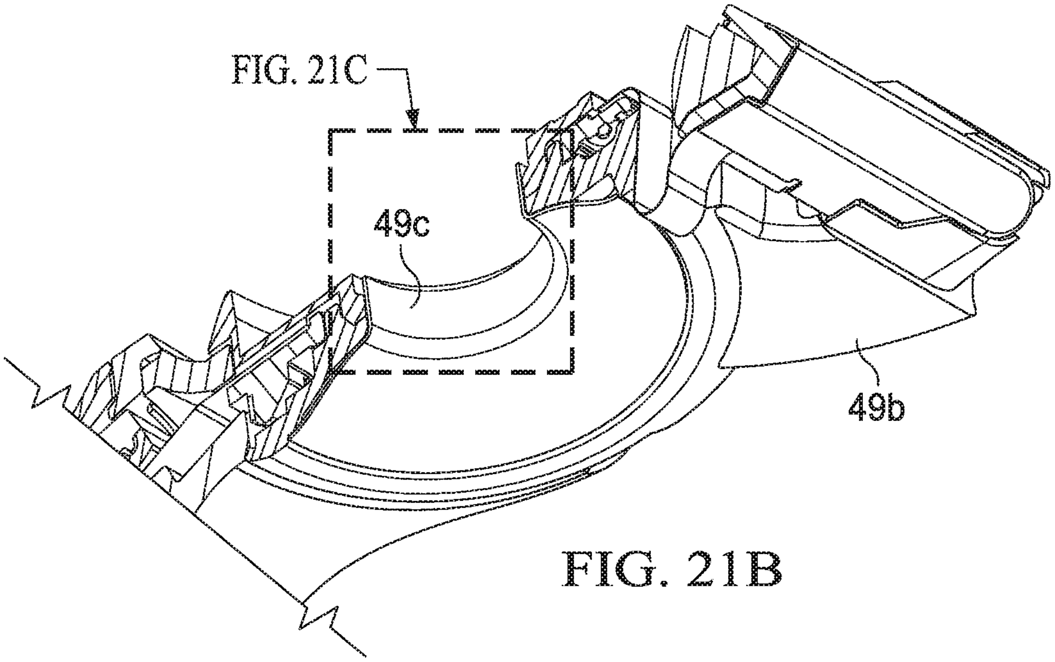
Figure 21C:
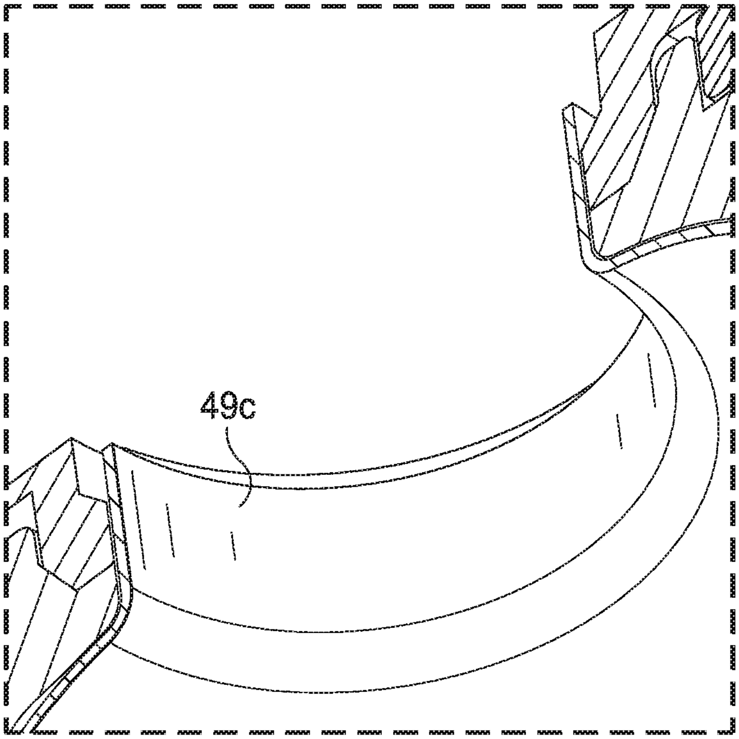
Figure 21D:
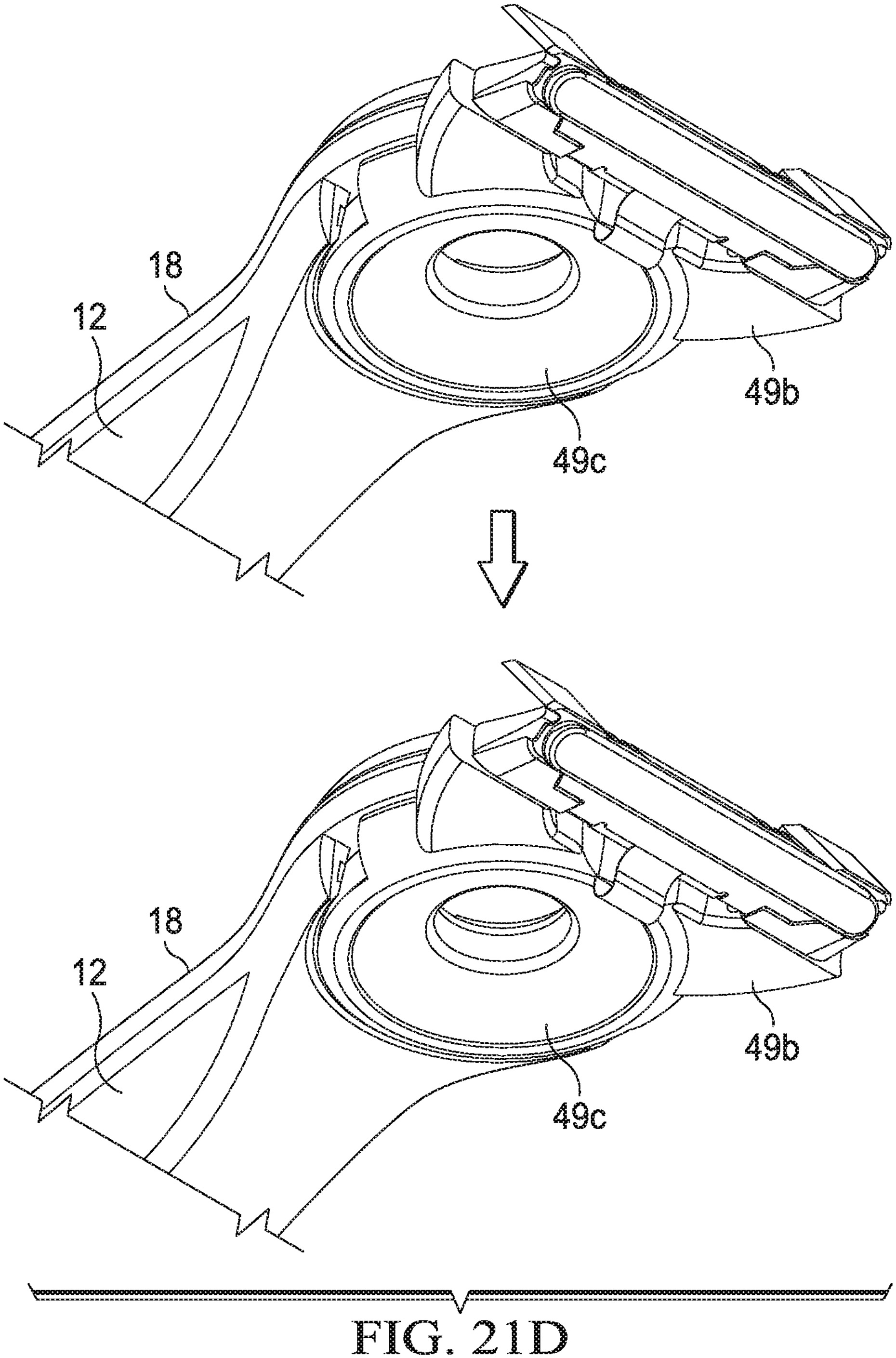
Figure 21E:
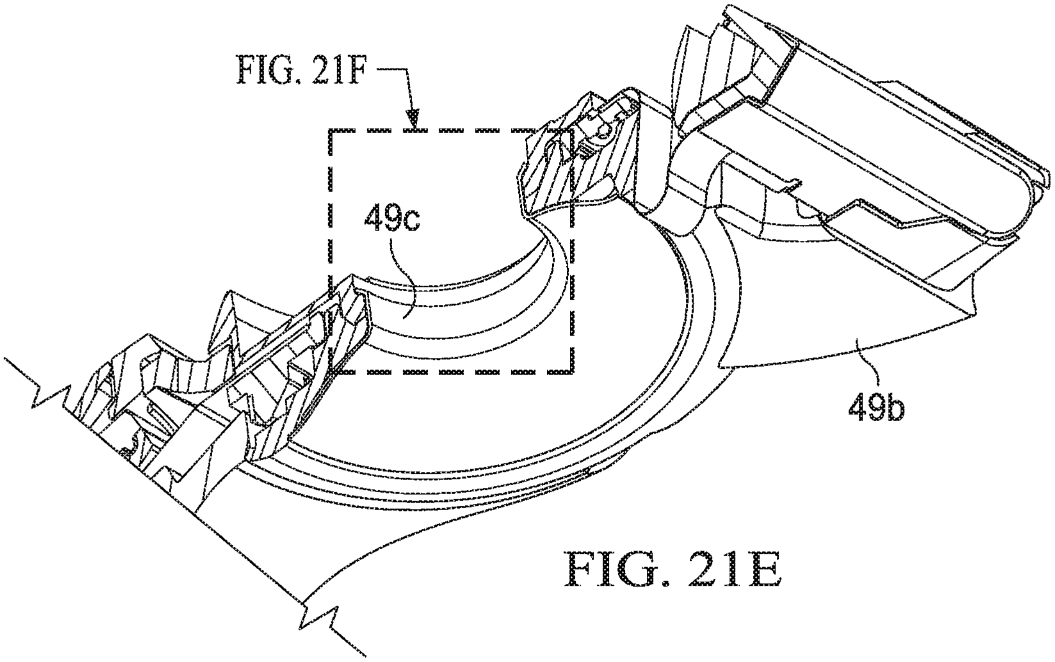
Figure 21F:
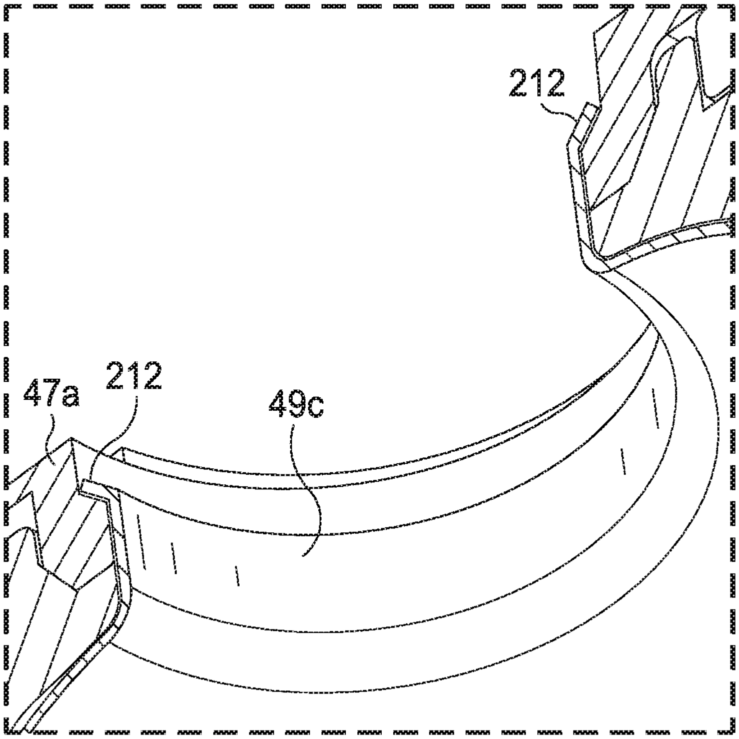
Figure 22A:
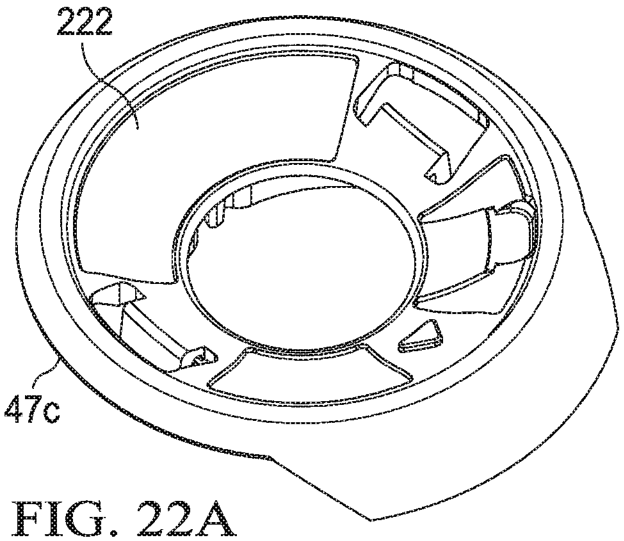
Figure 22B:
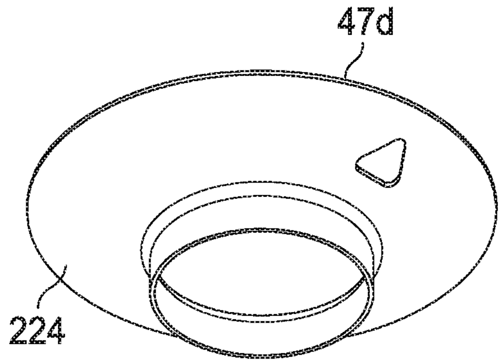
Figure 22C:
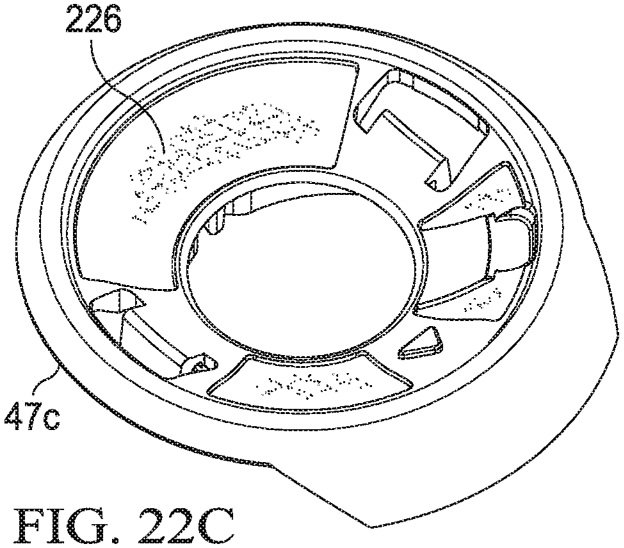
Figure 22D:
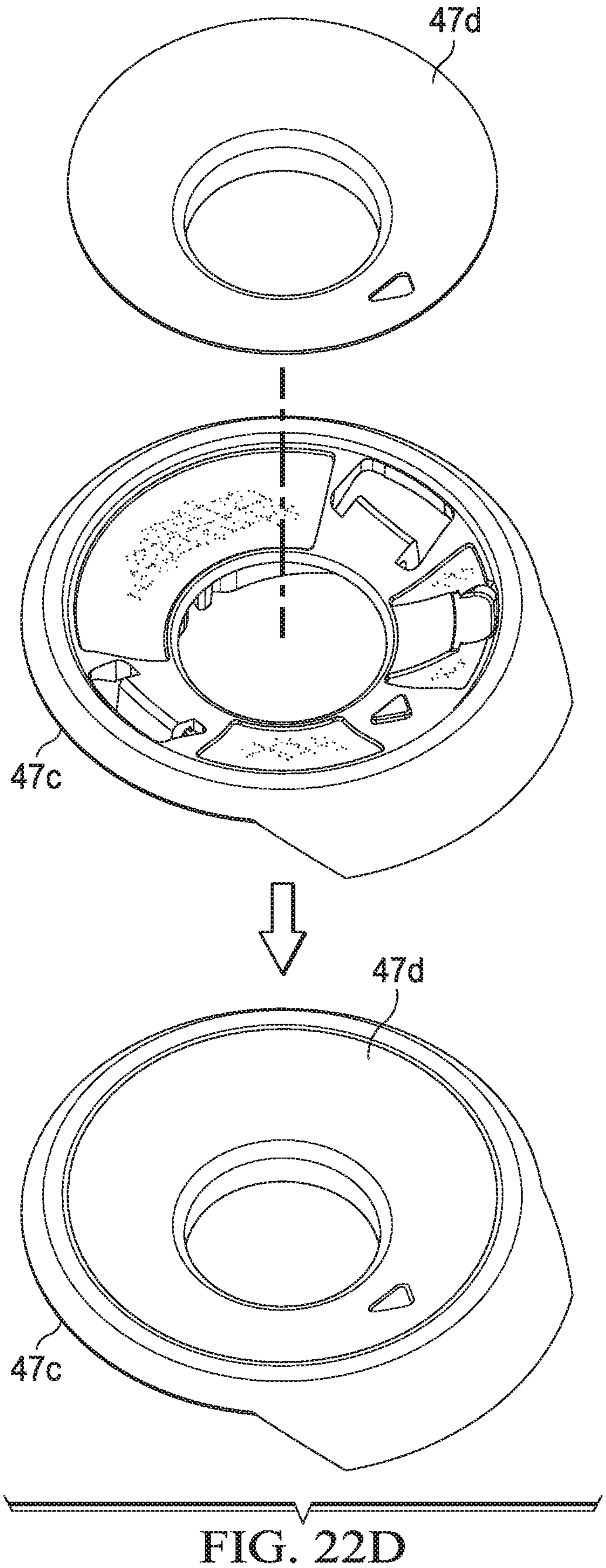

Portions of the main frame 18 corresponding to openings 194 of arms 192 can be permanently deformed by pressing into the openings 194. The operation, known as cold stamping or cold staking, permits secure coupling of arms 192, and therefore, skin interconnect member 22, to main frame 18 (and therefore, handle 12). Cold stamped pockets 202 can be formed after the cold stamping is completed as shown in FIG. 20.

In FIG. 21, Step 8 is shown to include the attachment of the third lower element 49*c* onto second lower element 49*b* and through the location features or apertures 48. The third lower element 49*c* is a dome shaped element having a rim 214 and a dome aperture 48. The dome aperture may or may not be the same size and shape as the other location features in the razor. The dome element 49*c* is disposed within and through location feature 48 of the second lower element 49*b* and the rim extends to the upper surface of the first upper element 47*a* as shown in cross-sectional cut out close-up view (A) in FIG. 21. At step 9, the upper rim 214 of the dome element 49*c* is crimped onto the first upper element 47*a*. Crimp areas 212 are shown by arrows in the cross-sectional cut out close-up view (B) of FIG. 21. Alternately, the rim may be crimped onto any element of the upper portion 44*a* or it may be otherwise attached to the frame 18.

FIG. 22 shows a third upper element 47*c* in the form of an eject button for a razor. The top side 222 of the eject button is cleaned at Step 10. In one non-limiting embodiment, the top side of the third upper element button is cleaned using plasma. At Step 11, the underside 224 of the fourth upper element 47*d* is also cleaned. In a non-limiting embodiment, the underside of the dome shaped element is cleaned with alcohol. At Step 12, the top side surface of the eject button element is prepared so that the underside of the dome shaped element can be mounted thereon. In a non-limiting embodiment, Step 12 comprises an adhesive or glue applied to a gluing area 226 on the top side 222 of the third upper element eject button 47*c* as shown in FIG. 22. At Step 13 the underside of the dome shaped element is mounted on the gluing area 226 and once the dome element is placed on the top side of the eject button, the glue secures elements 47*c* and 47*d* together. A lower rim portion of element 47*d* can extend through the aperture 46 of the eject button.

Figure 23A:
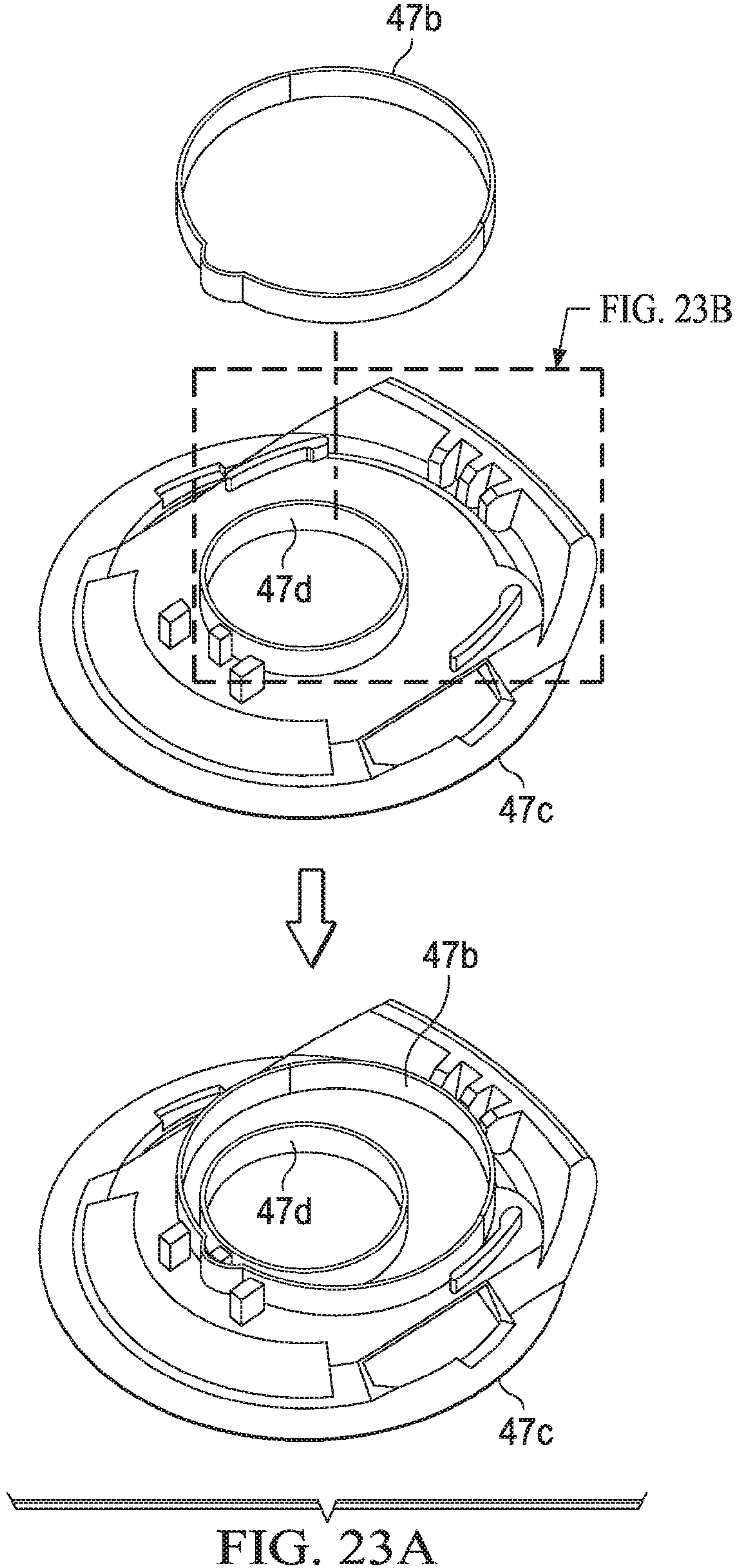
Figure 23B:
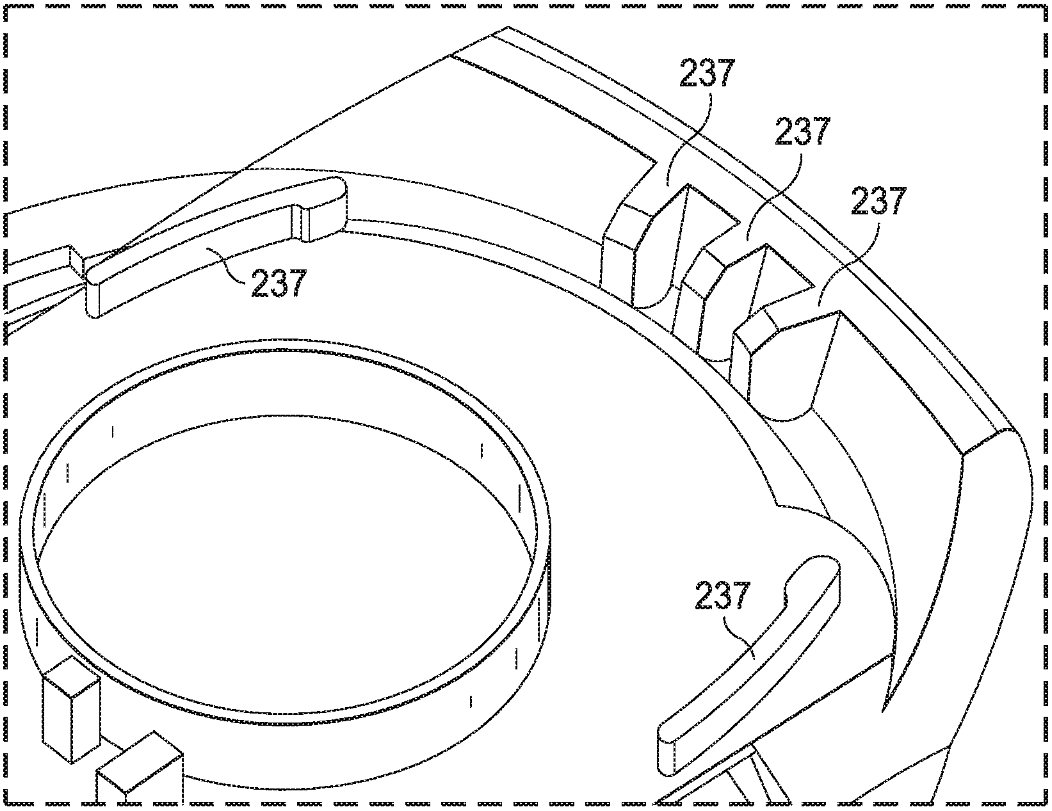
Figure 23C:
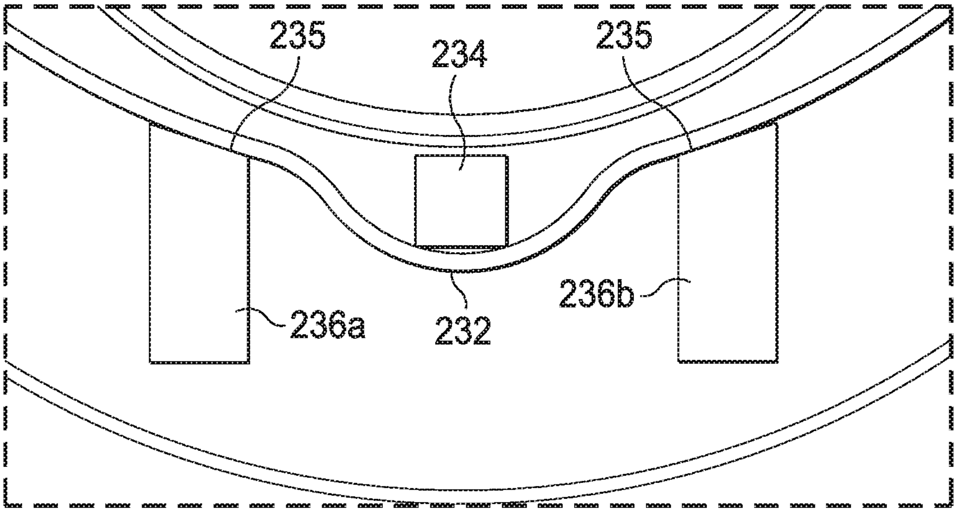

FIG. 23 depicts the mounting of second upper element 47*b* onto the underside of the third upper element 47*c*. Second upper element 47*b* is a spring member and third upper element 47*c* is an eject button element. In a non-limiting embodiment, the spring member can be a loop shaped spring member as shown in FIG. 23. The loop shaped spring member can have a shape that is generally oval, circular, elliptical, ring shaped, modified V-shaped, tear drop shape or any combination thereof. In the embodiment shown, the loop shaped spring member can be considered a circular shape. The spring member has end portions. End portions can overlap as shown. The mounting of the spring member to the eject button 47*b* at Step 14 can be achieved by attaching one portion of the spring member amidst rest surfaces on protrusions on the button. In one embodiment, the loop spring member is not permanently attached to the eject button. The mounting of the spring member to the button may also be achieved by any feasible means including but not limited to, other types of mechanical engagement. The spring member can be preloaded within the button. In one embodiment, the spring member 47*b* comprises a knob or curved structure 232 which is placed around a center protrusion 234 such that an inner surface of the knob (e.g., into the loop) rests along the outer surface of the center protrusion 234 while outer surfaces of the spring member 47*b* rest along surfaces 235 of two elongated protrusions 236*a* and 236*b* on either side of the center protrusion 234 as shown in close-up views (A) and (B) in FIG. 23. Close-up view (B) depicts the center and elongated protrusions of the underside of the button. Close-up view (A) depicts the other rest surfaces 237 on protrusions 238 of the underside of the button 47*c*. Together, FIG. 23 and FIG. 23 provide two feasible embodiments for coupling the third upper element (e.g., eject button) and the spring member.

Figure 24A:
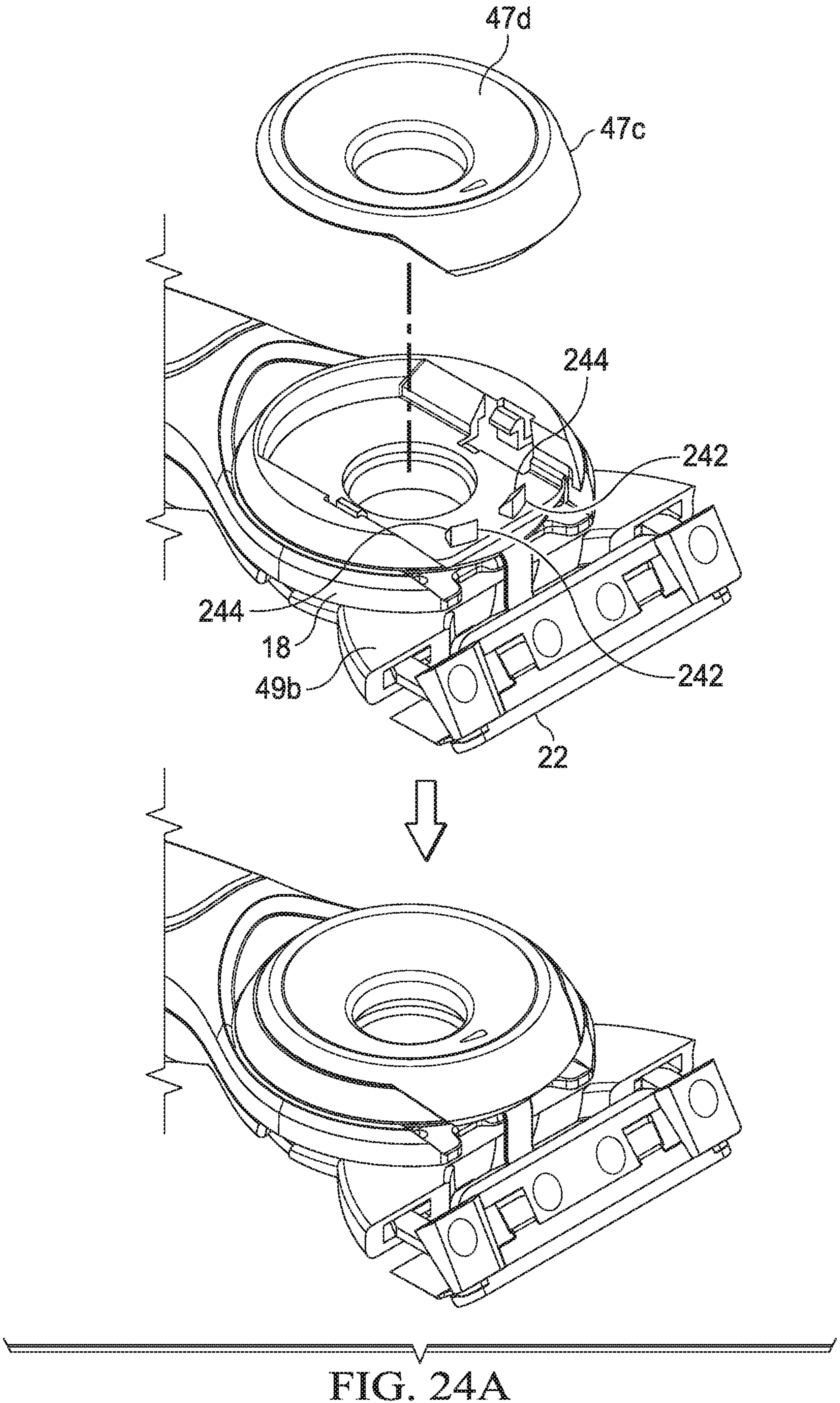
Figure 24B:
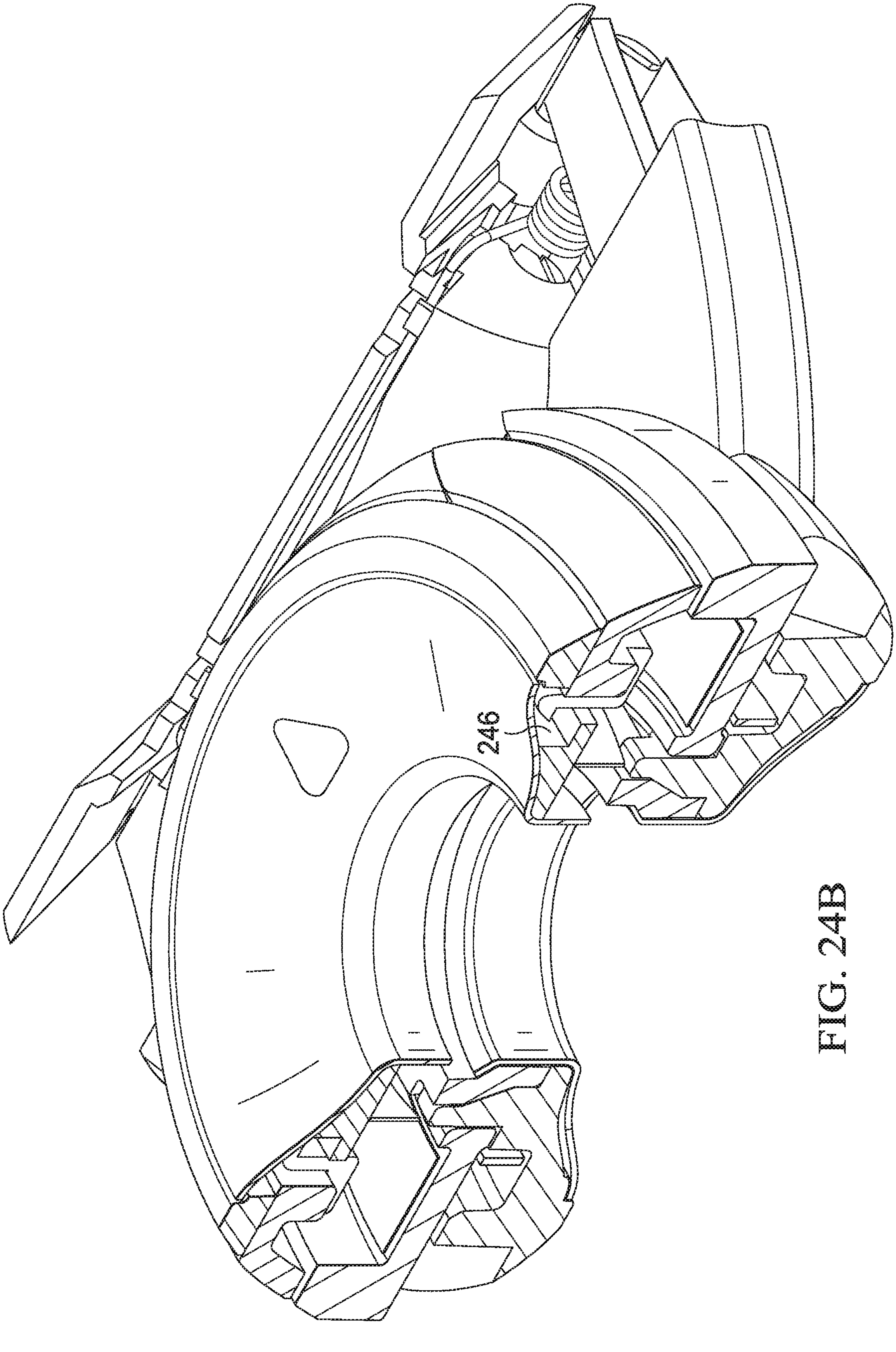
Figure 25A:
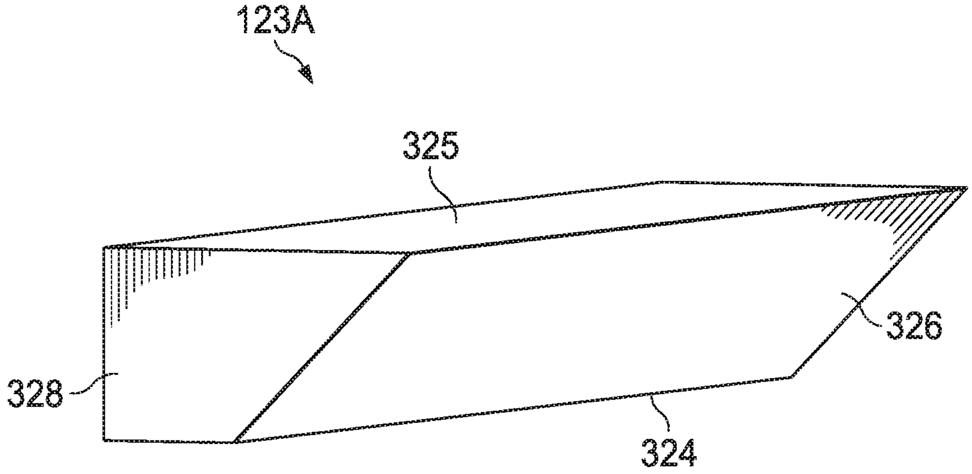
FIGS. 25A-25D shows schematic representations of a trapezoidal prism-shaped element of the present invention.
Figure 25B:
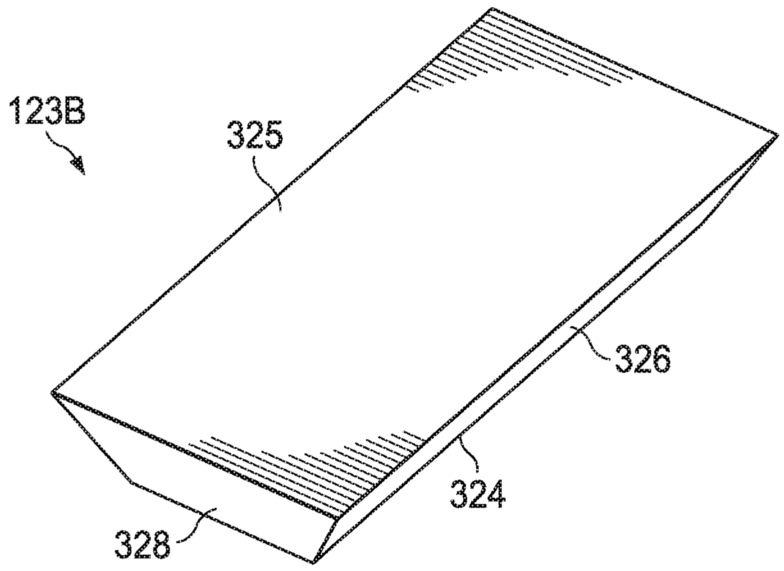
Figure 25C:
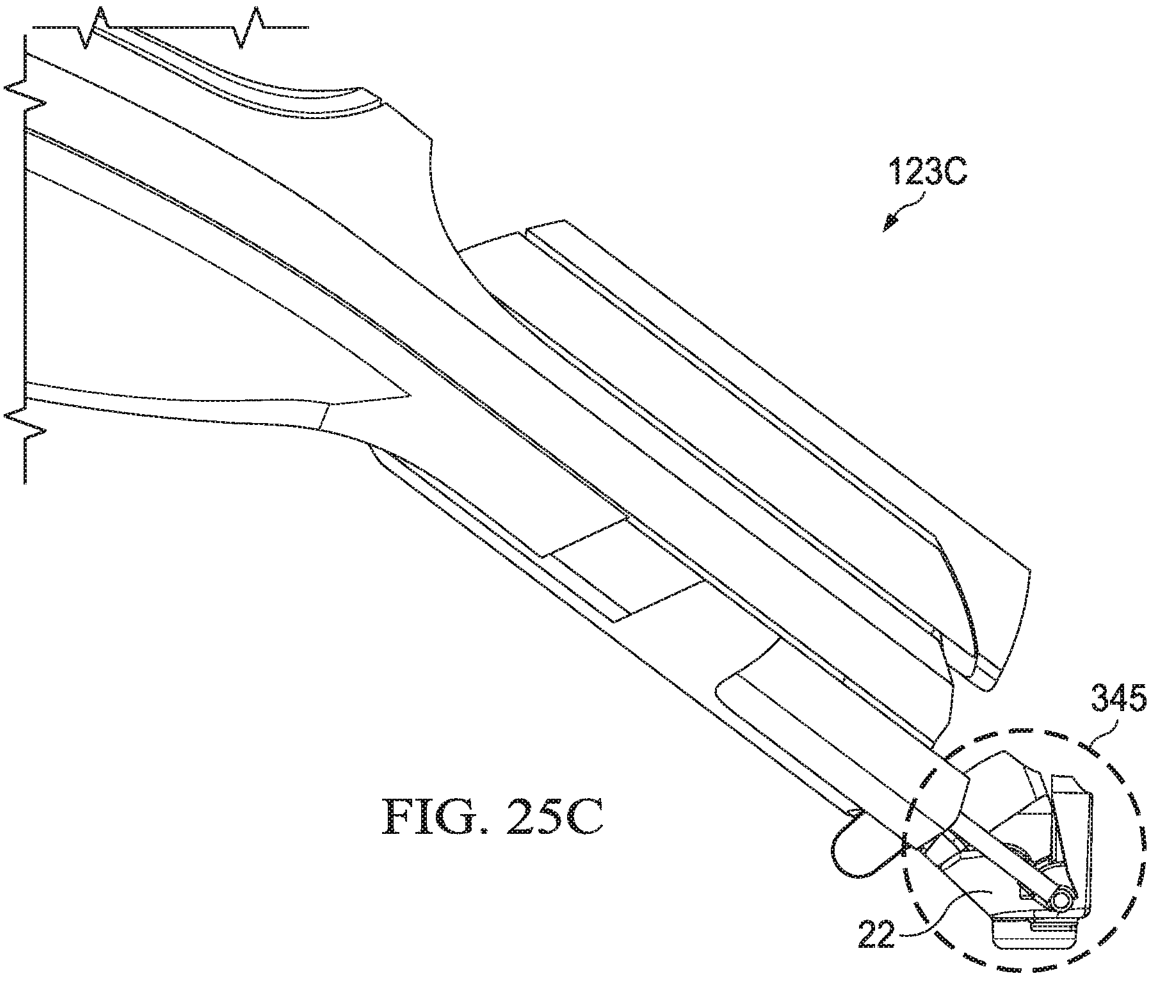
Figure 25D:
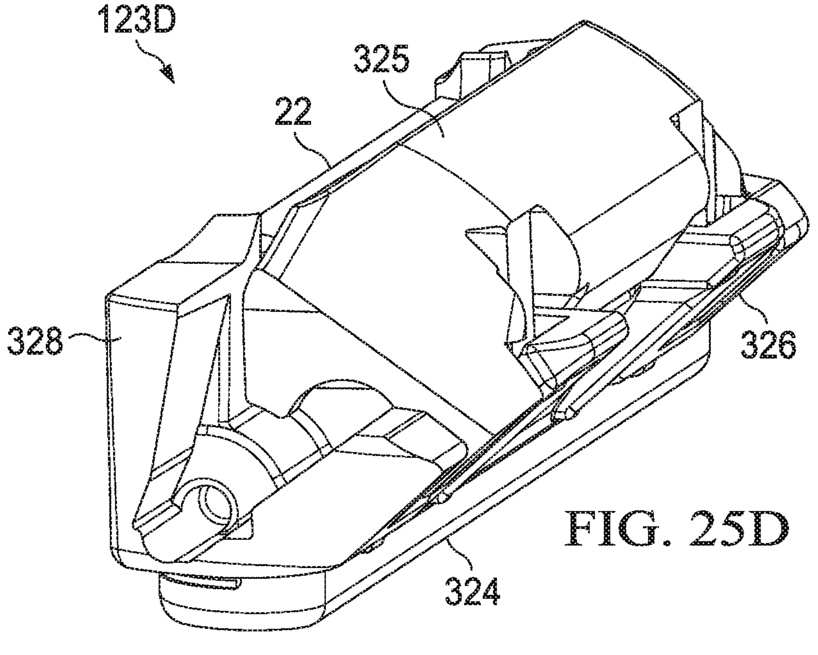

FIG. 24 depicts the Step 15, a last step for the assembly of the movable member assembly. In Step 15, the resultant coupled eject button assembly, inclusive of elements 47*b*, 47*c*, and 47*d*, of FIG. 23 are mounted to the upper surface of first upper element 47*a* which was previously mounted to the frame in Steps 3 and 4 of FIG. 18. In one embodiment, the mounting Step 15 is achieved via a snap fit mechanism between features on the lower surface of eject button 47*c* and features on the upper surface of first upper element 47*a*. These features can provide proper button assembly into the razor. For instance, protrusions 242 can include chamfer surfaces 244. These chamfers 244 can apply a pre-loading force to release the spring member from the eject button assembly rest position. Other surface features 246 on the lower side of the eject button assembly, as shown in the close-up view in FIG. 24, can limit vertical or sideways movement to guide the eject button. Once the last step 15 occurs, the spring member 47*b* can be fully encompassed within upper portion 44*a*.

It should be noted that at least one or more elements of the upper or lower portions do not move relative to the rigid member. For instance, the lower portion may include an element that does not move relative to the rigid member.

The frame, movable member assembly with upper and lower portions comprising an ejector button assembly, and a rotational movement unit (second lower element 49*b*) are configured for simplification of assembly, for example, in high-speed manufacturing. Each component is configured to automatically align and to securely seat. In an embodiment, each component engages to another component in only a single orientation such that the components cannot be inaccurately or imprecisely assembled. Further, each component does not need an additional step of dimensional tuning or any secondary adjustment in manufacturing to ensure proper engagement with other components. The design of the handle also provides control and precision. For example, when the razor is assembled, the movable member and/or the blade cartridge unit is substantially centered, the preload of the springs may be controlled precisely over time even after repeated use, and the performance of each spring, is controlled, consistent, and robust.

FIG. 25 show schematic representations of trapezoidal prism shapes of the skin interconnect member of the present invention. The shape of the at least one skin interconnect member 22 can alternatively be described as a "funnel," or as "tapered," or a "trapezoidal prism-shaped." As understood from the description herein, the description "trapezoidal prism" is general with respect to an overall visual impression the pivoting head. For example, FIG. 25 shows schematic representations 123A and 123B of trapezoidal prism-shaped elements and shows a shape having a relatively wide upper face (or opening) 325, a relatively narrow lower face 324, two long major faces 326, and two end faces 328 that are generally trapezoidal-shaped. FIG. 25 also shows a close-up side view 123C of one embodiment of the skin interconnect member 22 of the handle of the present invention showing a generally trapezoidal prism or prism-like shape 345 of the skin interconnect member 22 and an isolated view 124D of components of one embodiment of skin interconnect member 320 that create a general "trapezoidal prism" shape.

The various elements of the movable member assembly are desirably formed of plastics, including thermoplastic elastomers. The spring members can be made of plastic, impact-resistant plastic, metal, and composite materials. In an embodiment, the spring member can be made from materials that are resistant to stress relaxation such as metal, polyetheretherketone, and some grades of silicone rubber. Such an embodiment of spring member, comprised of stress relaxation resistant materials, can prevent the pivot head from undesirably taking a "set," a permanent deformation of the spring member that prevents the pivot head from returning to its rest position when unloaded. In an embodiment, spring member can be made of 200 Series or 300 Series stainless steel at spring temper per ASTM A313. In an embodiment, spring member can be comprised of stainless steel wire (e.g., 302 stainless steel wire) having an ultimate tensile strength metal greater than 1800 MPa or an engineering yield stress between about 800 MPa and about 2000 MPa.

Arms 24 or frame 18 can be made of plastic, impact-resistant plastic, metal, and composite materials. In an embodiment, arms 24 and frame 18 can be comprised of metal. Arms 24 and frame 18 can be made of a 200 or 300 Series stainless steel having an engineering yield stress measured by ASTM standard E8 greater than about 200 MPa, and preferably greater than 500 MPa and a tensile strength again measured by ASTM standard E8 greater than 1000 MPa.

Arms 24 and frame 18 can be made of a zinc die-cast with an engineering yield stress of about 200 MPa measured by ASTM standard E8 and a tensile strength again measured by ASTM standard E8 about 300 MPa.

Preferably, the assembly is formed from thermoplastic polymers. For example, nonlimiting examples of materials for the movable member with desirable properties, such as flexibility, durability (breakdown from drop impact), fatigue resistance (breakdown from bending over repeated use), and creep resistance (relaxing of the material), can include POLYLAC® 757 (available from Chi Mei Corporation, Tainan, Taiwan), HYTREL® 5526 and 8283 (available from E. I. DuPont de Nemours & Co., Wilmington, Delaware), ZYTEL® 122L (available from E. I. DuPont de Nemours & Co., Wilmington, Delaware), CELON® M90 (available from Ticona LLC, Florence, Kentucky), PEBAX® 7233 (available from Arkema Inc., Philadelphia, Pennsylvania), CRASTIN® 5500, S600F20, S600F40, and S600LF (available from E. I. DuPont de Nemours & Co., Wilmington, Delaware), CELENEX® 1400A (M90 (available from Ticona LLC, Florence, Kentucky), DELRIN® 100ST and 500T (available from E. I. DuPont de Nemours & Co., Wilmington, Delaware), HOSTAFORM® XT 20 (available from Ticona LLC, Florence, Kentucky), and SURLYN® 8150 (available from E. I. DuPont de Nemours & Co., Wilmington, Delaware). Furthermore, the selection of a material may affect the stiffness and yield stress of the movable member or a spring. For example, each material may have different stiffnesses depending on the temperature and rate of rotation of the upper or lower portions of the movable member relative to the frame. Dimensions of the spring elements can be varied to achieve a desired torque and/or a desired stiffness.

Other components of the handle, blade unit, and other rigid plastic parts of the shaving system can be made of any suitable material including, for example, polyethylene terephthalate (PET or PETE), high density (HD) PETE, acrylonitrile butadiene styrene (ABS), thermoplastic polymer, Polypropylene, oriented polypropylene, polyurethane, polyvinyl chloride (PVC), polytetrafluoroethylene (PTFE), polyester, high-gloss polyester, or combinations thereof.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A razor handle comprising:

a movable member assembly comprising an upper portion and a lower portion, said upper portion extending in a first direction parallel to a longitudinal axis of said razor handle and said lower portion extending lengthwise parallel to the upper portion in the first direction;

a rigid member disposed below said upper portion in a second direction transverse to the first direction, said rigid member comprising a rigid member platform, said rigid member platform extending lengthwise parallel to the upper portion in the first direction and extending widthwise in a third direction transverse to the first and second directions, said rigid member platform having a width and a thickness, wherein said thickness is in the second direction, wherein said rigid member platform comprises a width to thickness ratio from 7 to 60, said rigid member being disposed between said upper portion of said movable member and said lower portion of said movable member; and a skin interconnect member in pivotal relationship to said razor handle, wherein said rigid member platform comprises a top surface and a bottom surface, wherein said upper portion is adjacent to said top surface and said lower portion is adjacent to said bottom surface;

said upper portion, said rigid member platform, and said lower portion each comprise at least one location feature comprising an aperture; and at least a portion of said upper and lower portions are positioned adjacent the at least one location feature, wherein said aperture of each of said upper portion, said rigid member platform, and said lower portion are aligned such that an opening extends through said upper portion, said rigid member platform, and said lower portion, wherein said rigid member comprises a material that is harder than a material comprising said upper and lower portions, wherein said rigid member comprises a proximal end and a distal end opposite said proximal end, wherein said rigid member platform is disposed at said proximal end of said rigid member, wherein said proximal end of said rigid member, said rigid member platform, and said skin interconnect member are located in a handle transition section of said razor handle, wherein said distal end of said rigid member is located in a handle main section of said razor handle, and wherein when the razor handle is assembled, said upper portion and said lower portion of said movable member assembly are movable relative to said rigid member platform.

2. The razor handle of claim 1, wherein a portion of said upper portion and a portion of said lower portion are disposed within said rigid member platform.

3. The razor handle of claim 1, wherein said rigid member platform has a length to thickness ratio from about 7 to about 60 and an area from about 50 $mm^2$ to about 700 $mm^2$.

4. The razor handle of claim 1, wherein said rigid member platform has a hydraulic diameter from about 8 mm to about 50 mm.

5. The razor handle of claim 1, wherein said upper portion or said lower portion comprise one or more movable elements.

6. The razor handle of claim 1, wherein said rigid member platform has a width transverse a longitudinal axis of said razor handle greater than 12 mm.

7. The razor handle of claim 1, wherein said rigid member platform is partially enclosed by a wall, said wall having a height ranging from about 1.5 mm to about 18 mm.

8. The razor handle of claim 1, further comprising at least one location feature formed on or in (i) said rigid member platform and (ii) at least one of said upper portion or said lower portion.

9. The razor handle of claim of claim 8, wherein said at least one location feature comprises protrusions, pockets, slots, openings, circular holes, or combinations thereof.

10. The razor handle of claim 8, wherein said at least one location feature provides at least one or more attachment point for a product integrity feature.

11. The razor handle of claim 1, wherein said rigid member comprises (i) metal; or (ii) metal and one or more of alloys, glass, polymer, plastic, or combinations thereof.

12. The razor handle of claim 1, wherein said upper portion and said lower portion are coupled together at an interface.

13. The razor handle of claim 12, wherein said coupling is through said rigid member platform, about said rigid member platform, or a combination thereof.

14. The razor handle of claim 1, wherein a shape of said skin interconnect member comprises a trapezoidal prism shape.

15. The razor handle of claim 1, further comprising a secondary frame that overlies at least a portion of the rigid member, wherein said secondary frame is fixed to said rigid member, wherein said upper and lower portions comprise bearing surfaces to support a motion of said movable member assembly, and wherein said movable member assembly is movable relative to said rigid member and said secondary frame.

16. The razor handle of claim 1, wherein said rigid member platform comprises a thickness of from 0.5 mm to 2.5 mm.

17. The razor handle of claim 15, wherein said bearing surfaces are located within about 1 mm from at least one location feature.

18. The razor handle of claim 1, wherein said razor handle comprises a spring member.

19. The razor handle of claim 18, wherein said spring member is attached to said rigid member.

* * * * *